(12) United States Patent
Yano et al.

(10) Patent No.: US 7,082,317 B2
(45) Date of Patent: Jul. 25, 2006

(54) COMMUNICATION APPARATUS AND OUTER-LOOP POWER CONTROL METHOD

(75) Inventors: Tetsuya Yano, Kawasaki (JP); Kazuhisa Obuchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/956,535

(22) Filed: Sep. 30, 2004

(65) Prior Publication Data

US 2005/0085256 A1    Apr. 21, 2005

Related U.S. Application Data

(63) Continuation of application No. PCT/JP02/03413, filed on Apr. 5, 2002.

(51) Int. Cl.
*H04B 7/00* (2006.01)
*H04Q 7/20* (2006.01)

(52) U.S. Cl. .................... 455/522; 455/69; 455/226.3; 455/67.13

(58) Field of Classification Search ................ 455/522, 455/69, 67.13, 63.1, 68, 507, 517, 524, 62, 455/226.1, 70, 574, 226.3, 67.11; 370/318, 370/320, 335; 714/780, 746
See application file for complete search history.

(56) References Cited

U.S. PATENT DOCUMENTS

| | | | |
|---|---|---|---|
| 5,924,043 A | * | 7/1999 | Takano .................... 455/522 |
| 6,771,978 B1 | * | 8/2004 | Kayama et al. ............. 455/522 |
| 2002/0012383 A1 | * | 1/2002 | Higuchi et al. ............. 375/141 |
| 2003/0031135 A1 | * | 2/2003 | Itoh .......................... 370/252 |

FOREIGN PATENT DOCUMENTS

| JP | 2000-138633 | 5/2000 |
|---|---|---|
| JP | 2000-252917 | 9/2000 |
| JP | 2000252917 A * | 9/2000 |

OTHER PUBLICATIONS

International Search Report dated Jul. 16, 2002.
Akihito Morimoto et al. Fast Transmit Power Control Using 2-Step Outer Loop Control with Variable Step Size in Inter-Cell Site Diversity for W-CDMA Reverse Link. The Institute for Electronics, Information and Communication Engineers vol. 100 No. 82 May 25, 2002.

\* cited by examiner

*Primary Examiner*—Edward F. Urban
*Assistant Examiner*—John J. Lee
(74) *Attorney, Agent, or Firm*—Katten Muchin Rosenman LLP

(57) ABSTRACT

An outer-loop power control method and a communication apparatus having an outer-loop power control function for increasing target SIR if an error is detected in a block-error observation interval and decreasing target SIR if not a single error is detected in the block-error observation interval. At least one of the block-error observation interval, an incrementing step for when target SIR is increased and a decrementing step for when target SIR is decreased is varied based upon the number of erroneous blocks among error-detecting blocks contained in a transmission time interval TTI.

13 Claims, 42 Drawing Sheets

(a)
DOWNLINK FRAME FORMAT (b)
COMBINATIONS OF DOWNLINK SYMBOL RATES AND DATA BIT COUNTS

| SYMBOL RATE [ksps] | Data1 [bits] | Data2 [bits] | Data1+Data2 [bits] | TPC [bits] | TFCI [bits] | pilot [bits] | DATA LENGTH PER FRAME [bits] |
|---|---|---|---|---|---|---|---|
| 7.5 | 0 | 4 | 4 | 2 | 0 | 4 | 60 |
| 7.5 | 0 | 2 | 2 | 2 | 2 | 4 | 30 |
| 15 | 2 | 14 | 16 | 2 | 0 | 2 | 240 |
| 15 | 2 | 12 | 14 | 2 | 2 | 2 | 210 |
| 15 | 2 | 12 | 14 | 2 | 0 | 4 | 210 |
| 15 | 2 | 10 | 12 | 2 | 2 | 4 | 180 |
| 15 | 2 | 8 | 10 | 2 | 0 | 8 | 150 |
| 15 | 2 | 6 | 8 | 2 | 2 | 8 | 120 |
| 30 | 6 | 28 | 34 | 2 | 0 | 4 | 510 |
| 30 | 6 | 26 | 32 | 2 | 2 | 4 | 480 |
| 30 | 6 | 24 | 30 | 2 | 0 | 8 | 450 |
| 30 | 6 | 22 | 28 | 2 | 2 | 8 | 420 |
| 60 | 12 | 48 | 60 | 4 | 8 | 8 | 900 |
| 120 | 28 | 112 | 140 | 4 | 8 | 8 | 2100 |
| 240 | 56 | 232 | 288 | 8 | 8 | 16 | 4320 |
| 480 | 120 | 488 | 608 | 8 | 8 | 16 | 9120 |
| 960 | 248 | 1000 | 1248 | 8 | 8 | 16 | 18720 |

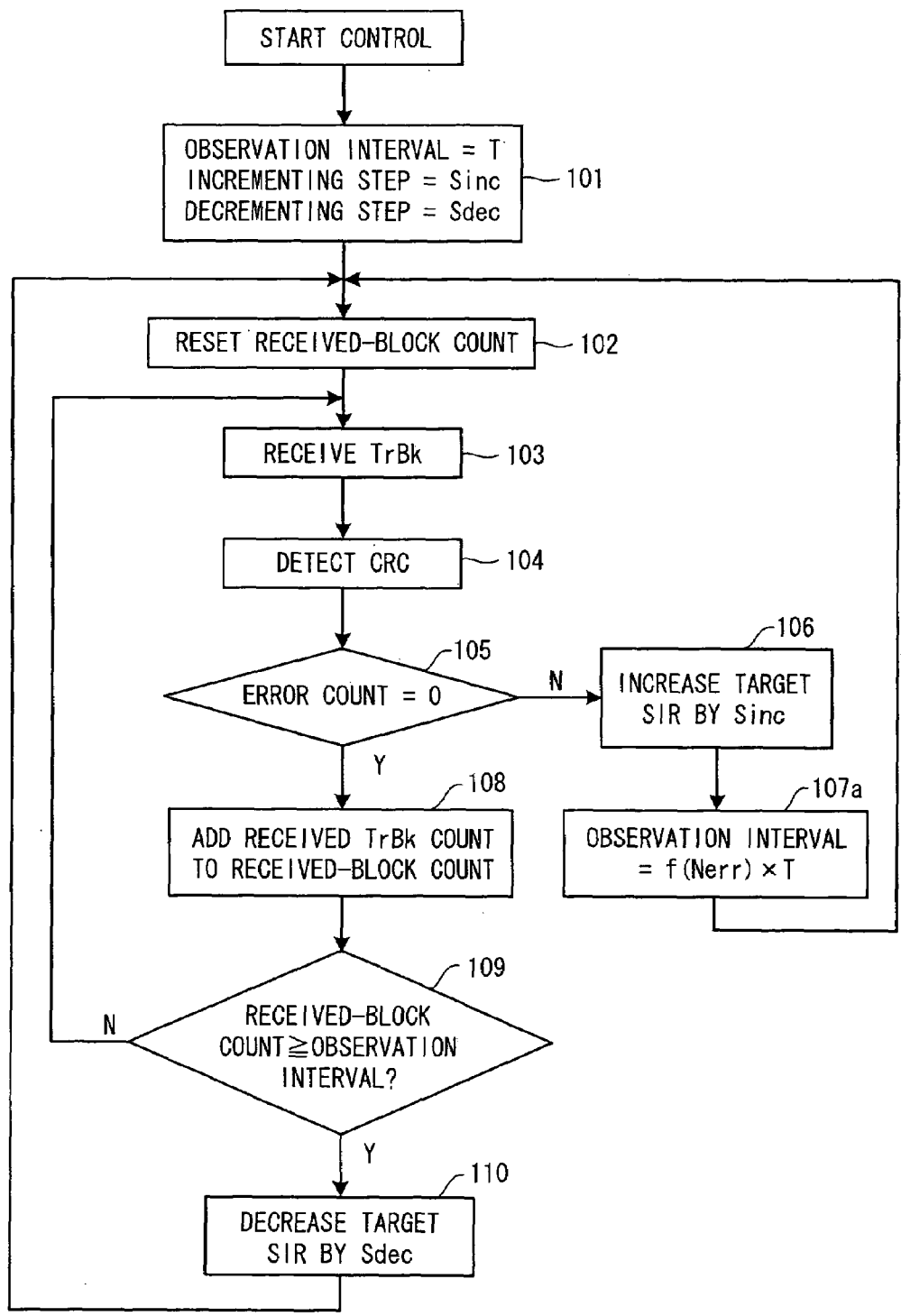

FIG. 7

(A)
TFIs OF 384-kbps PACKETS AND
TrBk COUNT x TrBk BIT COUNT (TrCH#1)

| PACKET TFI | TrBk OF PACKET |
|---|---|
| 0 | 0 × 336 |
| 1 | 1 × 336 |
| 2 | 2 × 336 |
| 3 | 4 × 336 |
| 4 | 8 × 336 |
| 5 | 12 × 336 |

(B)
DCCH TFIs AND
TrBk COUNT x TrBk BIT (TrCH#2)

| DCCH TFI | TrBk OF DCCH |
|---|---|
| 0 | 0 × 148 |
| 1 | 1 × 148 |

(C) TFI COMBINATIONS

| TFIs OF TrCH#1 | TFIs OF TrCH#2 | CTFC |
|---|---|---|
| 0 | 0 | 0 |
| 0 | 1 | 6 |
| 1 | 0 | 1 |
| 1 | 1 | 7 |
| 2 | 0 | 2 |
| 2 | 1 | 8 |
| 3 | 0 | 3 |
| 3 | 1 | 9 |
| 4 | 0 | 4 |
| 4 | 1 | 10 |
| 5 | 0 | 5 |
| 5 | 1 | 11 |

(D) CORRESPONDENCE BETWEEN TFCIs AND CTFCs

| TFCI | CTFC |
|---|---|
| 0 | 0 |
| 1 | 6 |
| 2 | 1 |
| 3 | 7 |
| 4 | 2 |
| 5 | 8 |
| 6 | 3 |
| 7 | 9 |
| 8 | 4 |
| 9 | 10 |
| 10 | 5 |
| 11 | 11 |

(E) TFI STRUCTURE AND TFCIs AT TIME OF TrCH MULTIPLEXING

| FRAME | TFI | | TFCI |
| | TrCH#1 | TrCH#2 | |
|---|---|---|---|
| FIRST FRAME | 2 | 1 | 5 |
| SECOND FRAME | 2 | 1 | 5 |
| THIRD FRAME | 1 | 1 | 3 |
| FOURTH FRAME | 1 | 1 | 3 |

COMMUNICATION APPARATUS AND OUTER-LOOP POWER CONTROL METHOD

CROSS-REFERENCE TO RELATED APPLICATION

The present application is a continuation of International Application No. PCT/JP02/03413 which was filed on Apr. 5, 2002, which is herein incorporated by reference.

BACKGROUND OF THE INVENTION

This invention relates to a communication apparatus having an outer-loop power control function and to an outer-loop power control method. More particularly, the invention relates to a communication apparatus having an outer-loop power control function and to an outer-loop power control method for increasing target SIR if an error is detected in a block-error observation interval and decreasing target SIR if not a single error is detected in the block-error observation interval.

In CDMA mobile communications, multiple channels are distinguished from one another by spreading codes that are assigned to the channels, whereby a plurality of channels perform communication sharing a single frequency band. In an actual mobile communications environment, however, a received signal is susceptible to interference from its own channel and from other channels owing to delayed waves ascribable to multipath fading and radio waves from other cells, and this interference has an adverse influence upon channel separation. Further, the amount of interference sustained by a received signal varies with time owing to momentary fluctuations in reception power ascribable to multipath fading and changes in the number of users communicating simultaneously. In an environment in which a received signal is susceptible to noise that varies with time in this fashion, it is difficult for the quality of a received signal in a mobile station linked to a base station to be maintained at a desired quality in a stable manner.

In order to follow up such a change in number of interfering users and a momentary fluctuation caused by multipath fading, inner-loop transmission power control is carried out for exercising control in such a manner that signal-to-interference ratio (SIR) is measured on the receiving side and the measured value is compared with a target SIR, whereby SIR on the receiving side will approach the target SIR.

FIG. 37 is a diagram for describing inner-loop transmission power control. Here only one channel is illustrated. A spread-spectrum modulator 1a of a base station 1 spread-spectrum modulates transmit data using a spreading code conforming to a specified channel. The spread-spectrum modulated signal is subjected to processing such as orthogonal modulation and frequency conversion and the resultant signal is input to a power amplifier 1b, which amplifies this signal and transmits the amplified signal toward a mobile station 2 from an antenna. A despreading unit 2a in the receiver of the mobile station applies despread processing to the received signal and a demodulator 2b demodulates the received data. A SIR measurement unit 2c measures the power ratio between the received signal and an interference signal and a comparator 2d compares target SIR and measured SIR. If the measured SIR is greater than the target SIR, the comparator 2d creates a command that lowers the transmission power by TPC (Transmission Power Control) bits. If the measured SIR is less than the target SIR, the comparator 2d creates a command that raises the transmission power by the TPC bits. The target SIR is a SIR value necessary to obtain, e.g., $10^{-3}$ (error occurrence at a rate of once every 1000 times). This value is input to the comparator 2d from a target-SIR setting unit 2e. A spread-spectrum modulator 2f spread-spectrum modulates the transmit data and TPC bits. After spread-spectrum modulation, the mobile station 2 subjects the signal to processing such as a DA conversion, orthogonal modulation, frequency conversion and power amplification and transmits the resultant signal toward the base station 1 from an antenna. A despreading unit 1c on the side of the base station applies despread processing to the signal received from the mobile station 2, and a demodulator 1d demodulates the received data and TPC bits and controls the transmission power of the power amplifier 1 in accordance with a command specified by the TPC bits.

FIG. 38 is a diagram showing an uplink frame structure standardized by the $3^{rd}$ Generation Partnership Project (referred to as "3GPP" below). There is a DPDCH data channel (Dedicated Physical Data Channel) on which only transmit data is transmitted, and a DPCCH control channel (Dedicated Physical Control Channel) on which a pilot and control data such as TPC bit information, described above with reference to FIG. 37, are multiplexed. After each of these is spread by an orthogonal code, they are mapped onto real and imaginary axes and multiplexed. One frame of the uplink has a duration of 10 ms and is composed of 15 slots (slot #0 to slot #14). The DPDCH data channel is mapped to an orthogonal I channel of QPSK modulation and the DPCCH control channel is mapped to an orthogonal Q channel of QPSK modulation. Each slot of the DPDCH data channel (I channel) consists of n bits, and n varies in accordance with the symbol rate. Each slot of the DPCCH control channel (Q channel) that transmits the control data consists of ten bits, has a symbol rate of 15 ksps and transmits a pilot PILOT, transmission power control data TPC, a transport format combination indicator TFCI and feedback information FBI.

Owing to changes in traveling velocity during communication and changes in the propagation environment ascribable to travel, the SIR that is necessary to obtain a desired quality (the block error rate, or BLER) is not constant. In order to deal with these changes, block error is observed and control is exercised to increase the target SIR if the observed value is inferior to the target BLER and decrease the target SIR if the observed value is superior to the target BLER. Control that thus changes the target SIR adaptively in order to achieve the desired quality is well known as outer-loop transmission power control (outer-loop TPC). Schemes indicated in [1] 2001 Electronic Information Communications Society Convention, B-5-56, [2] *Shingaku Giho* RCS 98-18 pp. 51–57, [3] 1999 Electronic Information Communications Society Convention, B-5-145, and [4] 2000 Electronic Information Communications Society Convention, B-5-72, are available as outer-loop control schemes.

FIG. 39 is a block diagram of outer-loop control proposed in Reference [1]. According to this scheme, a signal that has been transmitted from the base station 3 is decoded by an error correcting decoder 4b after it is demodulated by a demodulator 4a. The decoded signal is then divided into transport blocks TrBk by a CRC detector 4c and subsequently subjected to CRC error detection on a per-TrBk basis. The result of error detection applied to each transport block TrBk is sent to target-SIR controller 4d.

In W-CDMA as currently standardized, encoding is performed on the transmitting side in the manner shown in FIG. 40. Specifically, if a plurality (N) of transport blocks TrBk exist in a unit transmission time (Transmission Time Interval: TTI), a CRC add-on circuit generates a CRC (Cyclic Redundancy Code) error-detecting code for every transport block TrBk and adds this onto the transmit data. An encoder joins the N-number of transport blocks TrBk having the attached CRCs and encodes the blocks by error-correcting encoding such as convolutional coding or turbo coding. On the receiving side the error correcting decoder 4b subjects the received data to error-correction decoding processing and inputs the result of decoding to the CRC detector 4c. The CRC detector 4c performs CRC error detection for every transport block TrBk constituting the result of decoding and inputs the results of error detection to the target-SIR controller 4d.

As shown in FIG. 41, the target-SIR controller 4d controls the target SIR through a procedure of the kind shown in FIG. 41. Specifically, at the start of control of the target SIR, the target-SIR controller 4d reads in parameters (observation interval T, incrementing step Sin c and decrementing step Sdec), which conform to the target BLER, from a parameter conversion table 4e, stores the parameters in an internal storage register 5a and resets the content (received-block count N) of a received-block counter 5b (steps S01, S02). It should be noted that a number of the observation intervals T, incrementing steps Sin c and decrementing steps Sdec have been stored in the parameter conversion table 4e beforehand in accordance with various target BLERs and therefore the parameters conforming to the currently set target BLER are read out and stored in the storage register 5a.

If the CRC detector 4c receives a decoded result (consisting of one or more transport blocks TrBk) from the error correcting decoder 4b under these conditions (step S03), it subjects the decoded result to CRC error detection every transport block TrBk and inputs the result of error detection to the target-SIR controller 4d (step S04). Upon receiving the result of CRC error detection, the target-SIR controller 4d determines whether an error has been detected (step S05).

If the number or erroneous blocks in CRC detection is one or more, then the target-SIR controller 4d uses a target-SIR increase/decrease controller 5c to increase the target SIR by Sin c (step S06). The target-SIR controller 4d subsequently returns control to step S02, resets the number of received blocks and repeats processing from step S03 onward.

If the number or erroneous blocks in CRC detection is zero, then the target-SIR controller 4d adds a TrBk count $N_{BLK}$ in the current transmission time interval TTI to the received-block count N (the initial value of which is zero) (step S07). Next, the target-SIR controller 4d determines whether the received-block count is equal to or greater than the block count that corresponds to the observation interval T (step S08).

If the received-block count N is equal to or greater than the block count corresponding to the observation interval T, then this means that not a single error was detected in the observation interval. Accordingly, the target-SIR controller 4d uses the target-SIR increase/decrease controller 5c to decrease the target SIR by Sdec (step S09), returns control to step S02, resets the count of received blocks and repeats processing from step S03 onward.

The target-SIR controller 4d outputs the target SIR, which has been updated at steps S06, S09, to a comparator 4f. The latter compares the measured SIR obtained by a SIR measurement unit 4g with the target SIR and, on the basis of the result of the comparison, creates a TPC command that is transmitted to the base station 3.

In this conventional outer-loop power control method, the target SIR is increased or decreased as indicated in FIG. 42(A) if the number of TrBks in the TTI is one, and the target BLER can be attained. However, if the number of TrBks in the TTI is two or more and an error occurs is a plurality of TrBks, the target BLER can no longer be attained. The reason for this will be described. If the number of TrBks in the TTI is plural (N in number), then the CRC detector 4c separates the results of decoding on a per-TrBk basis and subjects each TrBk to CRC error detection, as described in accordance with FIG. 40. From the viewpoint of the nature of the error-correcting code, there are many cases where all N-number of transport blocks TrBk contain an error if an error exists in decoded data. The reasons for this are as follows:

1̂ error in the transmission path is dispersed over all of the code blocks because interleaving is applied to the data after encoding is performed; and 2̂ interleaving is also applied internally of a turbo decoder in a case where turbo encoding is employed.

In a case where error occurs in the manner described above, error is detected in almost all of the transport blocks TrBk within the TTI. Therefore, in an arrangement in which the conventional outer-loop power control method is applied as is, control for updating the target SIR is performed in exactly the same manner as in the case where an error occurs in one TrBk [see FIG. 42(A)] even in a situation where error occurs in N (=4) TrBks within the TTI, as shown in FIG. 42B. Consequently, the BLER obtained as a result deteriorates in comparison with the target BLER and becomes approximately N times the target BLER.

Thus, with the conventional schemes, a problem which arises is that the target BLER cannot be attained in a case where a plurality of error-detecting blocks (transport blocks: TrBk) are contained the transmission time interval (TTI).

SUMMARY OF THE INVENTION

Accordingly, an object of the present invention is to so arrange it that the target BLER can be attained even in a case where the transmission time interval (TTI) includes a plurality of error-detecting blocks.

A first aspect of the present invention is an outer-loop power control method, as well as a communication apparatus having an outer-loop power control function, for increasing target SIR if an error is detected in a block-error observation interval and decreasing target SIR if not a single error is detected in the block-error observation interval, wherein at least one of the block-error observation interval T, the incrementing step Sin c when target SIR is increased and the decrementing step Sdec when target SIR is decreased is varied based upon number of erroneous blocks among error-detecting blocks contained in the transmission time interval TTI.

A second aspect of the present invention is an outer-loop power control method, as well as a communication apparatus having an outer-loop power control function, for increasing target SIR if an error is detected in a block-error observation interval and decreasing target SIR if not a single error is detected in the block-error observation interval, wherein at least one of the block-error observation interval T, the incrementing step Sin c when target SIR is increased and the decrementing step Sdec when target SIR is decreased is varied based upon number of error-detecting blocks TrBk contained in the transmission time interval TTI.

In accordance with the first and second aspects of the present invention, the target BLER can be attained correctly even in a case where the transmission time interval (TTI) includes a plurality of error-detecting blocks.

BRIEF DESCRIPTION OF THE DRAWINGS

FIG. 6 is a flowchart of processing for controlling target SIR according to this modification;

FIG. 7 is a diagram useful in describing TFI tables and combinations of TFIs, etc.;

DESCRIPTION OF THE PREFERRED EMBODIMENTS

(A) First Embodiment

Figure 1:
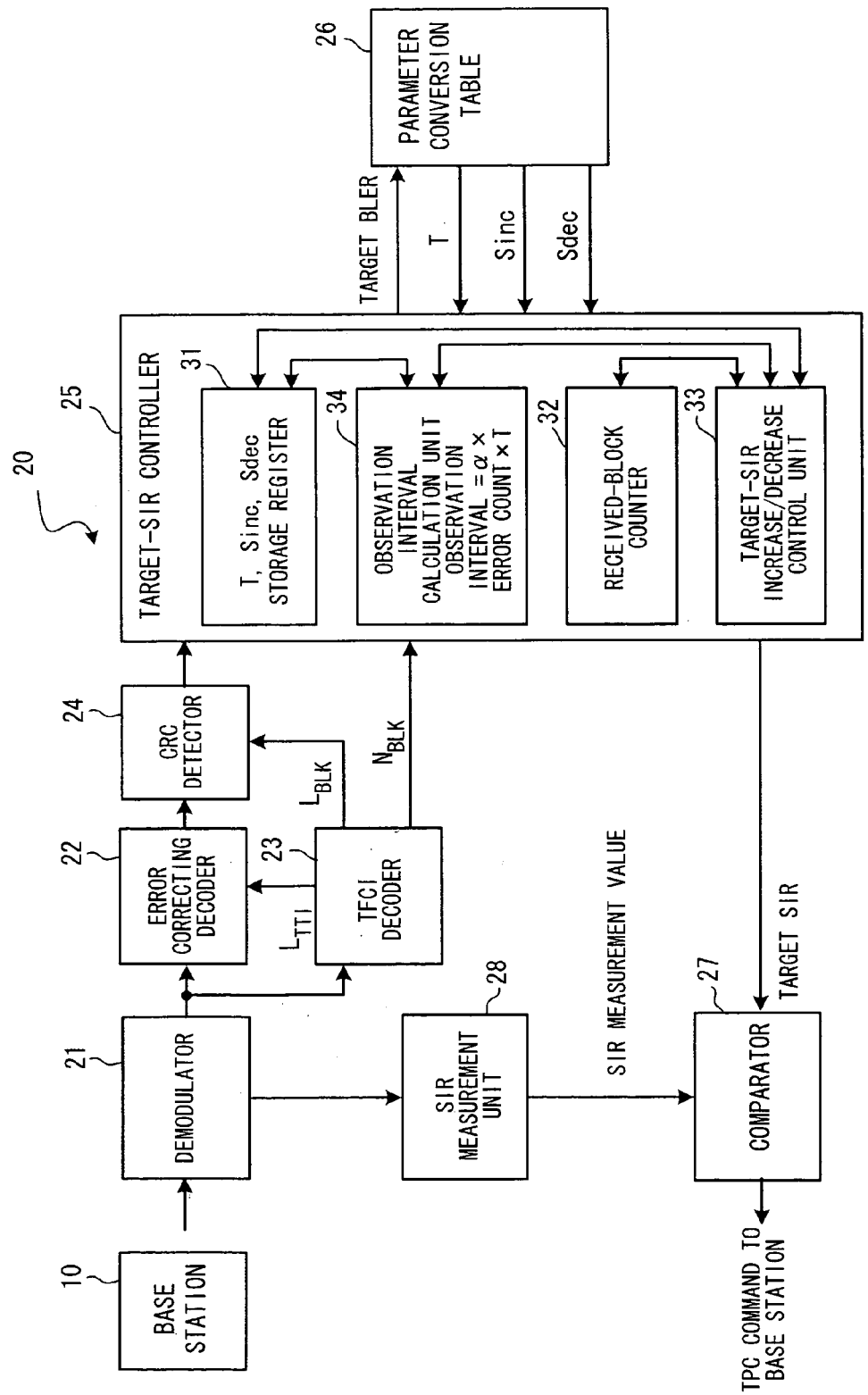
FIG. 1 is a block diagram of a first embodiment of the present invention.
Figure 2:
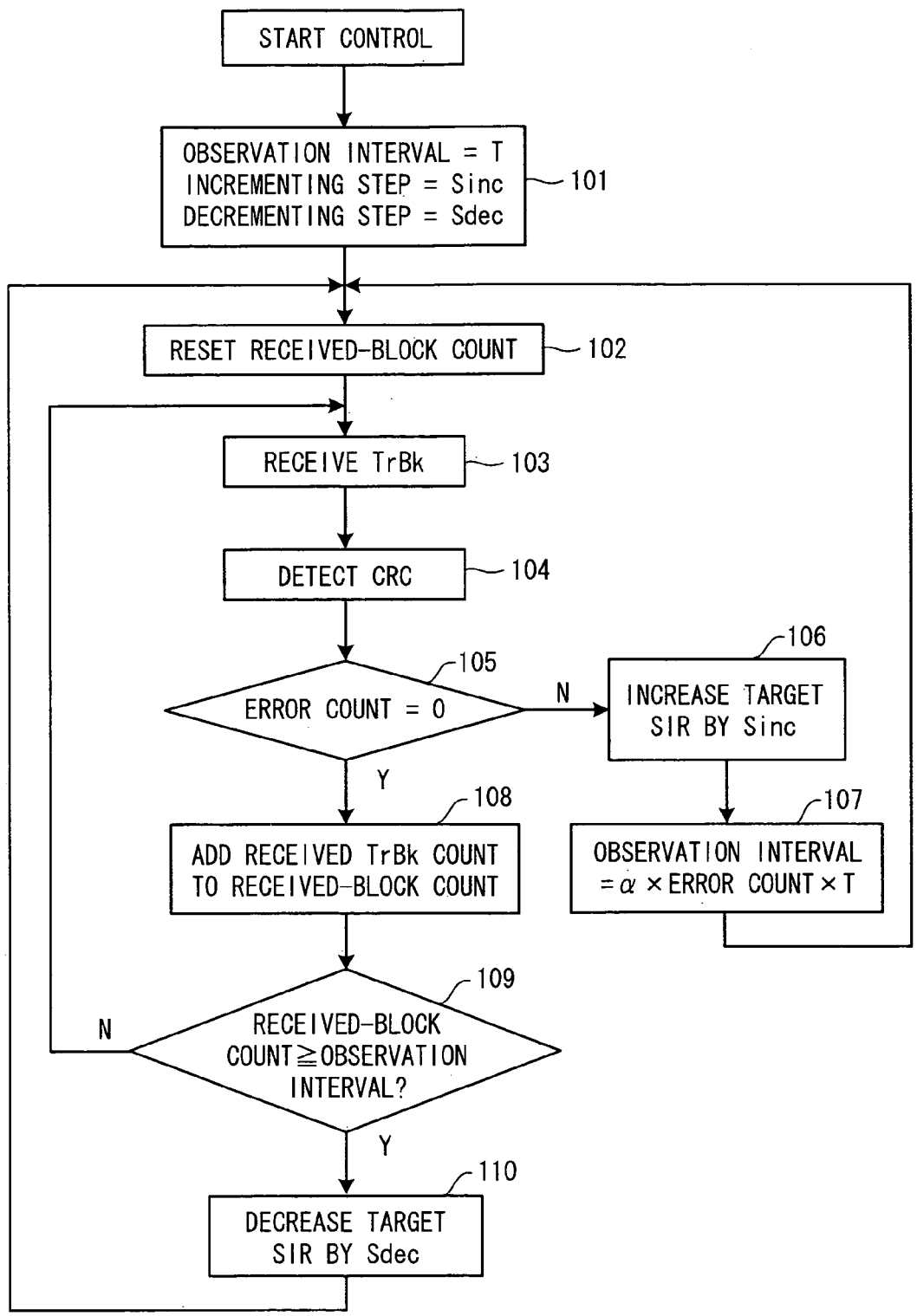
FIG. 2 is a flowchart of processing for controlling target SIR according to the first embodiment.

FIG. 1 is a block diagram of a first embodiment of the present invention and illustrates in detail the part of a mobile station that is for outer-loop power control. FIG. 2 is a flowchart of processing for controlling target SIR according to the first embodiment. The first embodiment is such that if error has been detected, $\alpha \times Nerr \times T$ is used instead of an initially set value T as the observation interval up to detection of the next error. More specifically, $\alpha \times Nerr \times T$, which is the result of multiplying the set value T by a coefficient ($\alpha \times Nerr$) that conforms to the error count Nerr, is used as the observation interval.

Figure 3:
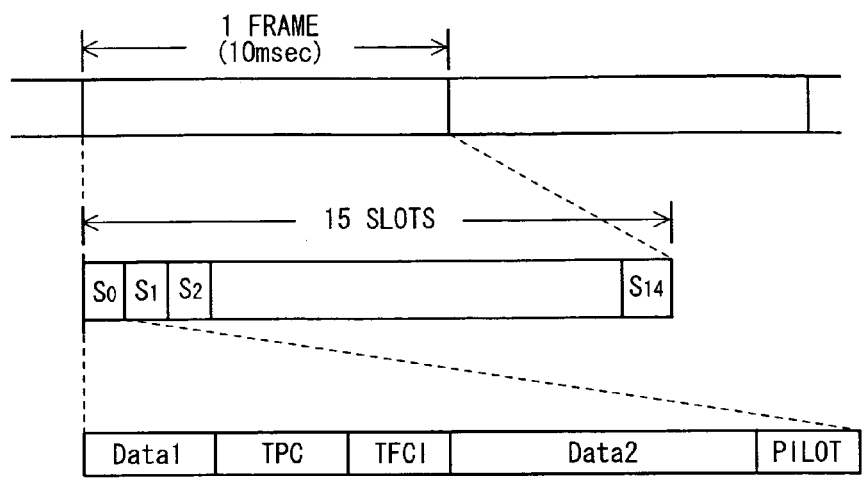
FIG. 3 is a diagram useful in describing frame format of a downlink signal.

In FIG. 1, a signal (a downlink signal) sent from a base station 10 is demodulated by a demodulator 21 in a mobile station 20 and then input to an error correcting decoder 22 and TFCI decoder 23. FIG. 3(a) is a diagram for describing the frame format of the downlink signal from the base station 10 to the base station 20. One frame has a duration of 10 ms and is composed of 15 slots $S_0$ to $S_{14}$. Each slot consists of k bits, and k varies in accordance with the symbol rate. Further, each slot transmits a first data section DATA1, a second data section DATA2, a pilot PILOT, TPC (Transmission Power Control) bits and a TFCI (Transport Format Combination Indicator). As shown in FIG. 3(b), the numbers of bits of the PILOT, TPC and TFCI vary in dependence upon the symbol rate, and the numbers of bits vary as necessary even when the symbol rates are the same. In W-CDMA, transmission time intervals TTI are defined as 10, 20, 40 and 80 ms, and one TTI in such case is constituted by one, two, four and eight frames, respectively. Data is encoded on a per-TTI basis. For example, if TTI=40 ms holds, then encoding is performed with four frames making up one unit. It should be noted that the TTI in a transport channel TrCH is reported from a network prior to communication. The TFCI indicates block count $N_{BLK}$ and block bit length $L_{BLK}$ of every frame in each transport channel TrCH and is encoded.

The TFCI decoder 23 accumulates and decodes one frame's worth of TFCI bits, obtains the total bit length $L_{TTI}$, block count $N_{BLK}$ and block bit length $L_{BLK}$ of the TTI and inputs these to the error correcting decoder 22, a CRC detector 24 and a target-SIR controller 25, respectively. The error correcting decoder 22 executes decoding processing every bit length LTTI and inputs the result of decoding to the CRC detector 24. The CRC detector 24 separates the result of decoding into transport block TrBks based upon the block bit length LBLK, performs CRC error detection every transport block TrBk and inputs the result of error detection of each TrBk to the target-SIR controller 25.

The target-SIR controller 25 controls the target SIR in accordance with the flowchart of FIG. 2. Specifically, at the start of control of the target SIR, the target-SIR controller 25 reads in parameters (observation interval T, incrementing step Sin c and decrementing step Sdec), which conform to the target BLER, from a parameter conversion table 26, stores the parameters in an internal storage register 31 and resets the content (receive-block count N) of a receive-block counter 32 (steps 101, 102). It should be noted that a number of the observation intervals T, incrementing steps Sin c and decrementing steps Sdec have been stored in the parameter conversion table 26 beforehand in accordance with various target BLERs and therefore the parameters conforming to the currently set target BLER are read out and stored in the storage register 31.

If the CRC detector 24 receives a decoded result (consisting of one or more transport block TrBks) from the error correcting decoder 22 under these conditions (step 103), it subjects the decoded result to CRC error detection every transport block TrBk and inputs the result of CRC error detection to the target-SIR controller 25 (step 104). Upon receiving the result of CRC error detection, the target-SIR controller 25 discriminates the error-block count Nerr on a per-TTI basis (step 105).

Figure 4:
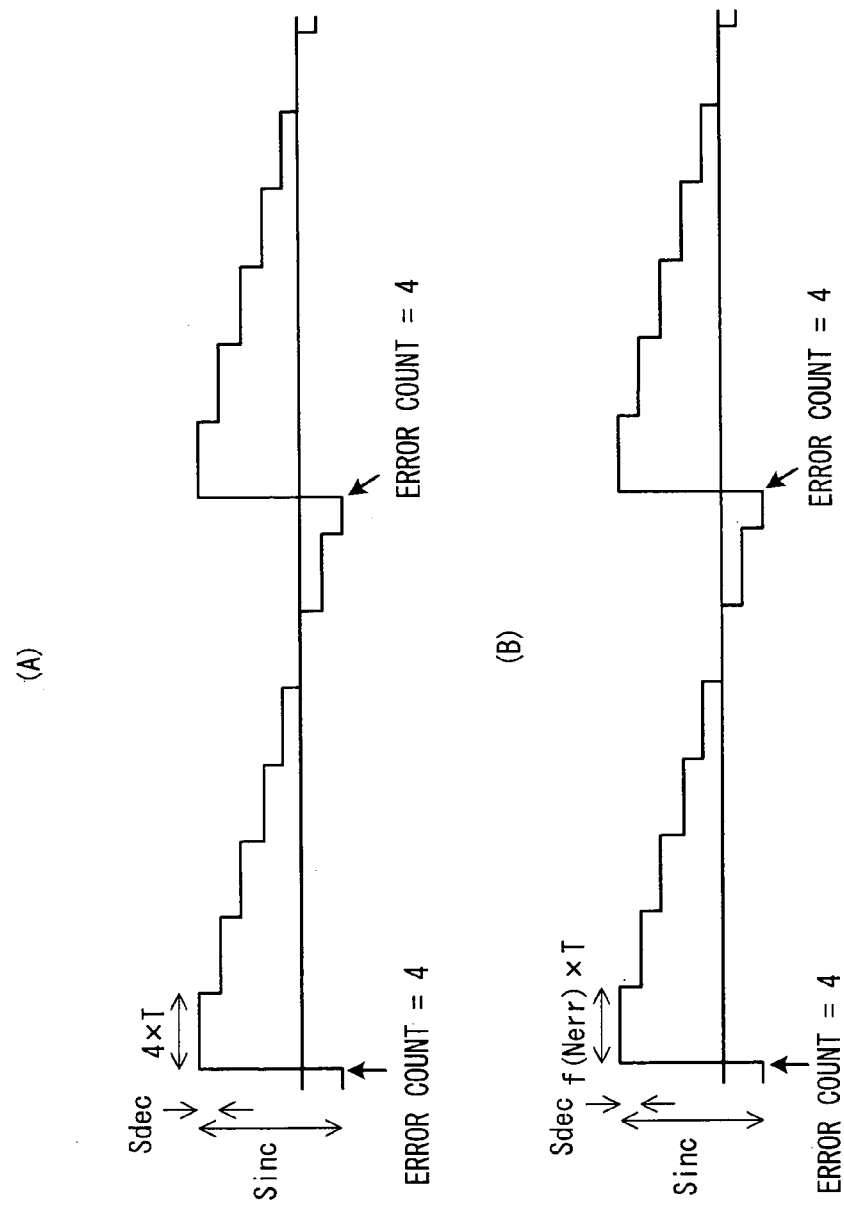
FIG. 4 is a diagram useful in describing operation of the first embodiment.

If the error-block count Nerr in one TTI is one or more, then a target-SIR increase/decrease control unit 33 of the target-SIR controller 25 increases the target SIR by Sin c (step 106). Further, an observation-interval calculation unit 34 of the target-SIR controller 25 updates the observation interval (step 107) according to the following equation:

$$\text{observation interval} = \alpha \times \text{Nerr} \times T \quad (1)$$

where $\alpha$ represents a constant, e.g., 1, and T is the observation interval of the initial measurement. FIG. 4A is a diagram useful in describing operation in a case where $\alpha=1$, Nerr=4 holds. Here the observation interval is extended from T to 4×T.

After the observation interval is updated, the target-SIR controller 25 returns control to step 102 and resets the number of receive blocks to zero, after which processing from step 103 onward is repeated.

On the other hand, if it is found at step 105 that the error count in CRC detection is zero, then the target-SIR controller 25 adds the TrBk count $N_{BLK}$ received in the present TTI to the receive-block count N (N=N+$N_{BLK}$; step 108). Next, the target-SIR controller 25 determines whether the receive-block count N has become equal to or greater than a block count $N_{OBS}$ that conforms to the observation interval (step 109).

If the receive-block count N has become equal to or greater than the block count $N_{OBS}$ conforming to the observation interval, then this means that not a single error was detected in this observation interval. Accordingly, the target-SIR increase/decrease control unit 33 decreases the target SIR by Sdec (step 110). Thereafter, the target-SIR controller 25 returns control to step 102 and resets the receive-block count N to zero, after which processing from step 103 onward is repeated. Further, if it is found at step 109 that the receive-block count N is less than the observation interval $N_{OBS}$, then control returns to step 103 and processing from this step onward is executed.

The target-SIR controller 25 outputs the target SIR updated at steps 106, 110 to a comparator 27. The latter compares the target SIR with the measured SIR measured by a SIR measurement unit 28 and creates a TPC command, which is transmitted to the base station 10, based upon the result of comparison.

In accordance with the first embodiment, if error has been detected in the TTI, a value that is the result of multiplying T by a coefficient (=$\alpha \times$Nerr) conforming to the number of errors is used instead of T as the observation interval up to detection of the next error. As a result, there is an increase in the number of blocks that must be observed until the target SIR is reduced and an increase in time until target SIR is reduced. That is, the time during which target SIR is increasing is prolonged. Consequently, the intervals at which errors occur can be prolonged and, as a result, the target BLER can be attained.

Figure 5:
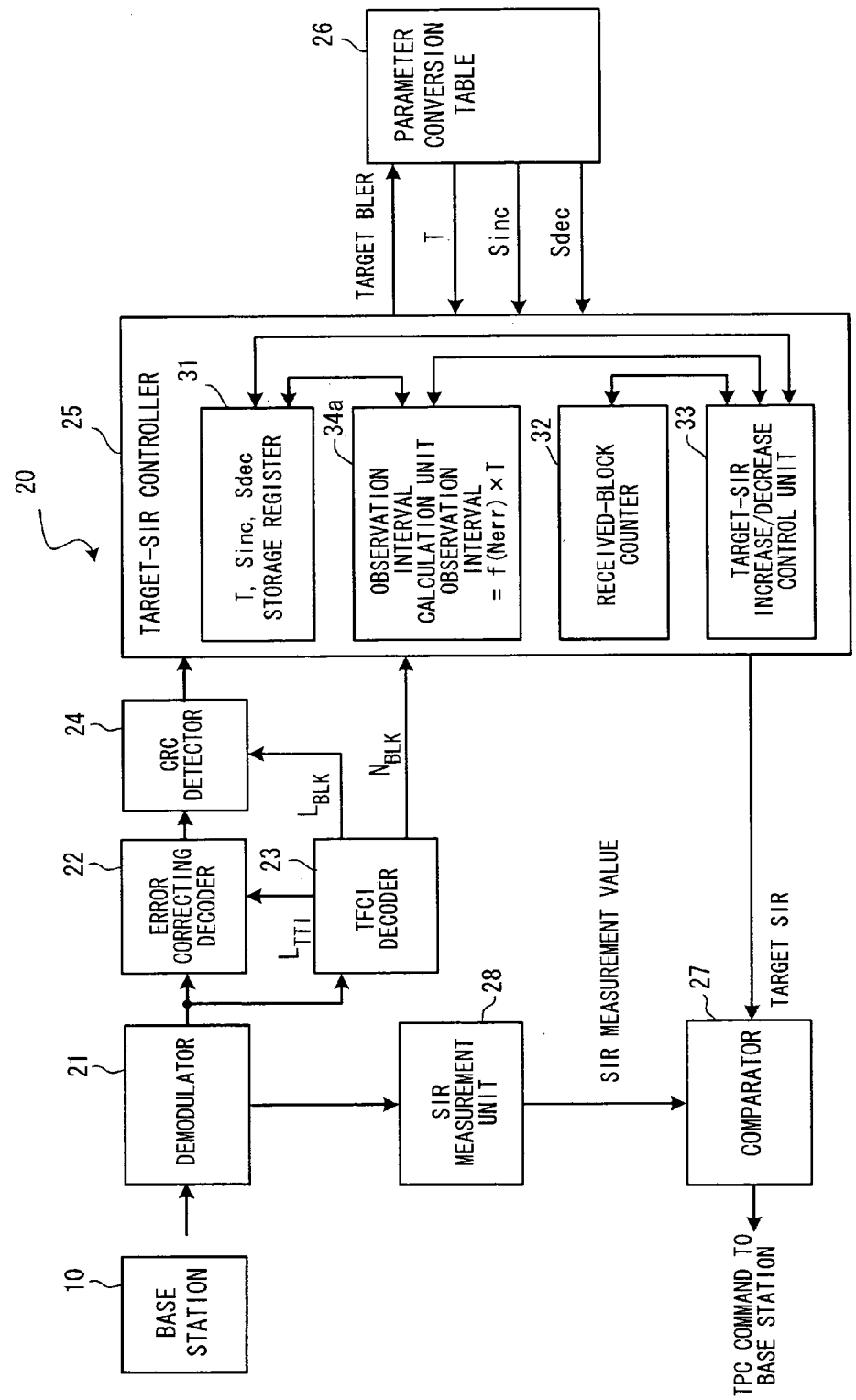
FIG. 5 illustrates a modification of the first embodiment.

FIG. 5 illustrates a modification of the first embodiment, and FIG. 6 is a flowchart of processing for controlling target SIR according to this modification. Components identical with those of the first embodiment of FIGS. 1 and 2 are designated by like reference characters. This modification differs in that whereas the coefficient used to multiply T is $\alpha \times$Nerr in the first embodiment, here the coefficient is made a function f(Nerr) of the error-block count Nerr (see a observation interval calculation unit 34a and step 107a). The coefficient used to multiply T need not necessarily be a value proportional to the error count and may be a value that has been weighted in dependence upon the block count. FIG. 4(B) is a diagram for describing the operation of this modification. Here the observation interval is extended from T to f(Nerr)×T.

(B) Arrangement for Obtaining Transport Block Count $N_{BLK}$ and Block Bit Length $L_{BLK}$ of TTI from TFCI When encoded data of each of the transport channels TrCH is multiplexed and transmitted, the transmitting side creates and transmits a parameter, which indicates how the encoded data of the transport channels TrCH has been multiplexed, in order that demultiplexing can be performed correctly on the receiving side. This parameter is the TFCI (Transport Format Combination Indicator). The TFCI is uniquely decided by a combination of transport formats that specify the bit length (block count $N_{BLK}$ and block bit length $L_{BLK}$), per TTI, of the data transmitted by each transport channel TrCH.

A transport format is assigned a number and is referred to as a TFI (Transport Format Indicator). For instance, FIGS. 7(A), (B) illustrate examples of TFI tables in a case where a downlink 384-kbps packet standardized in 3GPP and DCCH data for the control channel are multiplexed and transmitted on a transport channel TrCH#1 and a transport channel TrCH#2, respectively. There are six types of 384-kbps (TrCh#1) transport formats of which the bit lengths per TTI are 0×336 bits, 1×336 bits, 2×336 bits, 4×336 bits, 8×336 bits and 12×336 bits; the TFIs are 0, 1, 2, 3, 4 and 5, respectively. There are two types of transport formats of DCCH data (TrCH#2) for the control channel. The bit lengths per TTI are 0×148 bits and 1×148 bits, and the TFIs are 0 and 1, respectively.

If we assume that the transport channels are just of the two types TrCh#1 and TrCh#2, combinations of the TFIs of TrCh#1, TrCh#2 will be 12 in all, as illustrated in FIG. 7(C). For each combination, a CTFC (Calculated Transport Format Combination) is calculated using a CTFC calculation formula (described later). The CTFC is appended to the right side of FIG. 7(C). The transmitting and receiving sides have a TFCI—CTFC correspondence table shown in FIG. 7(D)

and therefore the transmitting side converts the calculated CTFC to a TFCI using the correspondence table, encodes the TFCI and transmits the encoded signal. For example, if 20 ms of data in which the number of bits per TTI is 2×336 bits and 20 ms of data in which the number of bits per TTI is 1×336 bits is transmitted successively from TrCH#1 and 40 ms of data in which the number of bits per TTI is 1×148 bits is transmitted from TrCH#2, then four frames of multiplexed data every 10 ms become combinations of TFIs of the kind shown in FIG. 7(E). Accordingly, the CTFC of each combination is calculated, this CTFC is converted to a TFCI using the correspondence table of FIG. 7(D) and TFCI is subjected to encoding processing to create a TFCI code word (30-bit data). This TFCI code word is transmitted.

The TFCI code word is decoded on the receiving side to obtain the TFCI. The receiving side finds the CTFC from the obtained TFCI by referring to the conversion table, calculates the transport format (TFI) of each TrCH from this CTFC, obtains the block count and block bit length per TTI on a per-TrCH basis from the TFI table, obtains the bit length of the TTI and executes decoding processing.

It should be noted that the CTFC is calculated on the transmitting side from the combination of TFIs of each TrCH using the following equation:

$$CTFC(TFI_1, TFI_2, \ldots, TFI_I) = \Sigma_i TFI_i \cdot P_i (i=1 \text{ to } I)$$

where $P_i = \Pi_j L_j$ (j=0 to i−1), i=1, 2, ..., I, $L_0$=1. Further, $TFI_i$ is the TFI of $TrCH_i$, I is the number of TrCH multiplexed, and $L_j$ is the number of transport formats of $TrCH_j$. In the example above, the TrCH count is two, the TF count of TrCH#1 (the 384-kbps packet) is six, and the TF count of TrCH#2 (DCCH) is two, and therefore we have I=2, $L_1$=6 and $L_2$=2. If CTFC is calculated according to the equation cited above, then the following is obtained:

$$P_1 = L_0 = 1, \ P_2 = L_0 \times L_1 = 6$$

$$CTFC(0,0) = 0 \times 1 + 0 \times 6 = 0, \ CTFC(0,1) = 0 \times 1 + 1 \times 6 = 6,$$

$$CTFC(1,0) = 1 \times 1 + 0 \times 6 = 1, \ CTFC(1,1) = 1 \times 1 + 1 \times 6 = 7,$$

$$CTFC(2,0) = 2 \times 1 + 0 \times 6 = 2, \ CTFC(2,1) = 2 \times 1 + 1 \times 6 = 8,$$

$$CTFC(3,0) = 3 \times 1 + 0 \times 6 = 3, \ CTFC(3,1) = 3 \times 1 + 1 \times 6 = 9,$$

$$CTFC(4,0) = 4 \times 1 + 0 \times 6 = 4, \ CTFC(4,1) = 4 \times 1 + 1 \times 6 = 10,$$

$$CTFC(5,0) = 5 \times 1 + 0 \times 6 = 5, \ CTFC(5,1) = 5 \times 1 + 1 \times 6 = 11,$$

Thus the CTFC values indicated on the right side of FIG. 7(C) are obtained.

Figure 8:
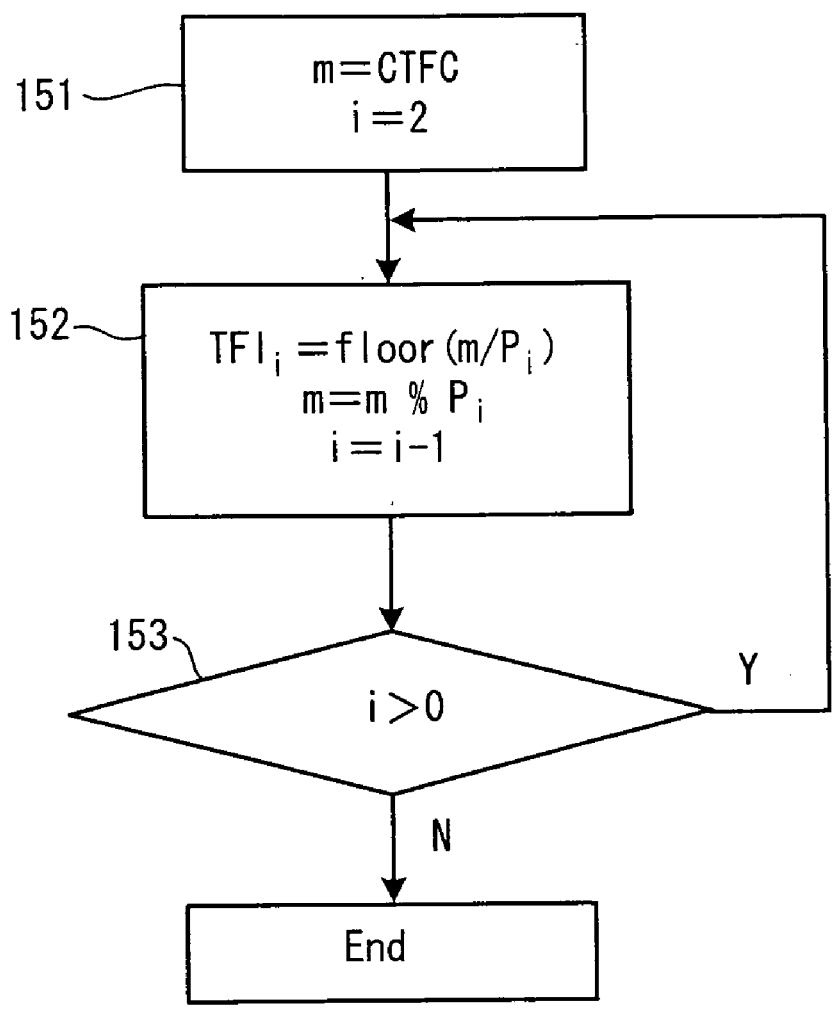
FIG. 8 is a TFI calculation flowchart.

Calculation of TFI of each TrCH from the CTFC on the receiving side is performed in accordance with the flowchart shown in FIG. 8. For example, assume that TFI prevailing when CTFC=9 holds is to be found. First, at step 151, we have the following:

m=CFTC=9, i=number of multiplexed transport channels=2

Next, $TFI_i$, m, i are calculated according to the following equation (step 152):

$$TFI_i = \text{floor}(m/P_i)$$

$$m = m \ \% \ P_i$$

$$i = i−1$$

where floor(m/$P_i$) represents quotient that results when m is divided by $P_i$ (digits to the right of the decimal point are discarded), and m=m % $P_i$ is the remainder that results when m is divided by $P_i$. Since i=2 holds initially, the following is found at step 152:

$$TFI_2 = \text{floor}(m/P_2) = \text{floor}(9/6) = 1,$$

$$i \ m = m \ \% \ P_2 = 9 \% 6 = 3, \ i = 1$$

Next, it is determined whether i>0 holds (step 153). Since i=0 holds, a "NO" decision is rendered, processing for TFI combination calculation ends and CTFC (3,1) is obtained. The CTFC value of CTFC (3,1) is 9 from FIG. 7(C). Combinations of TFIs obtained by the flowchart of FIG. 8 coincide with the corresponding relationships of FIG. 7(C). This means that the combination of TFIs has been obtained from the CTFC value correctly.

(C) Second Embodiment

Figure 9:
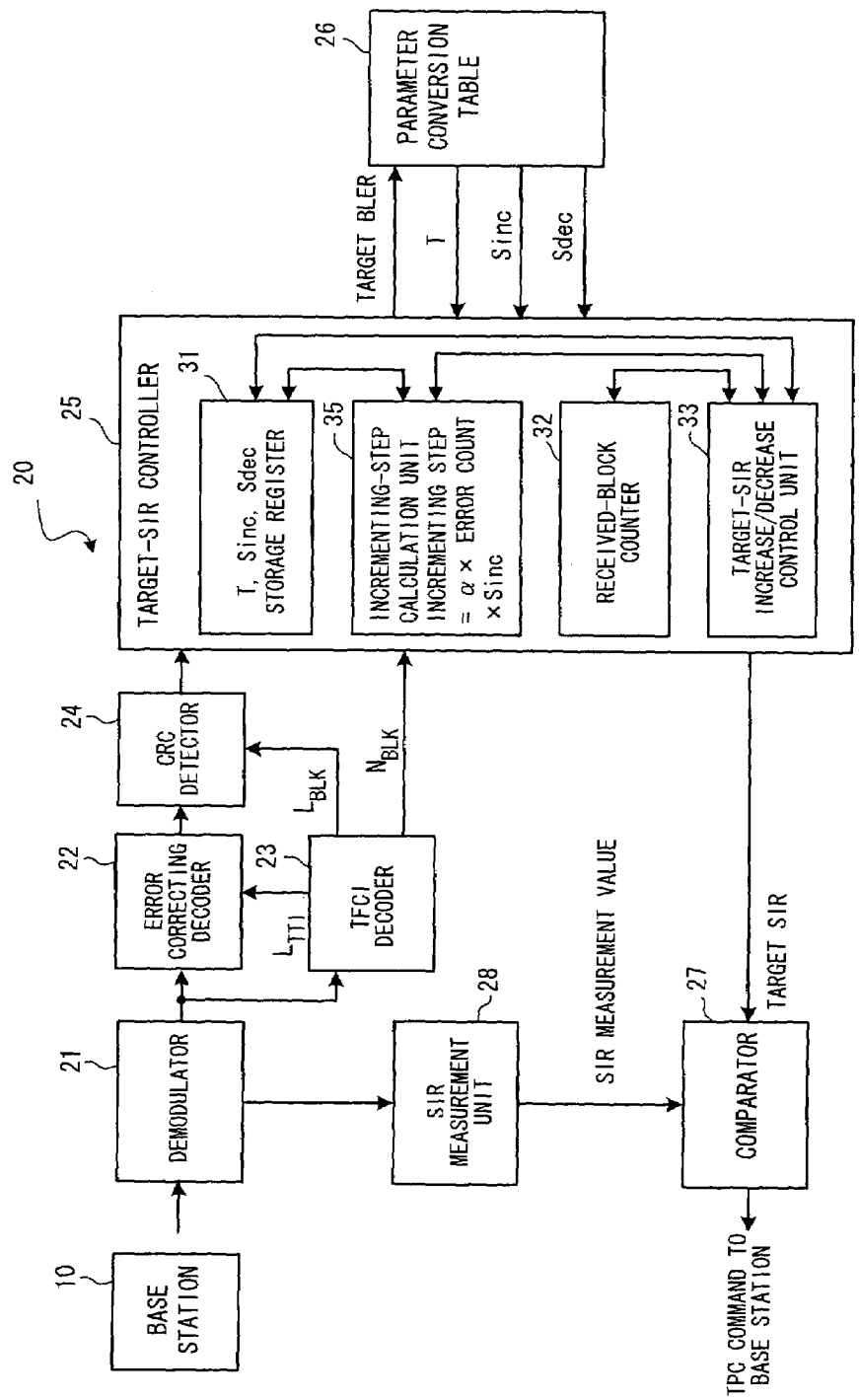
FIG. 9 is a block diagram of a second embodiment of the present invention.
Figure 10:
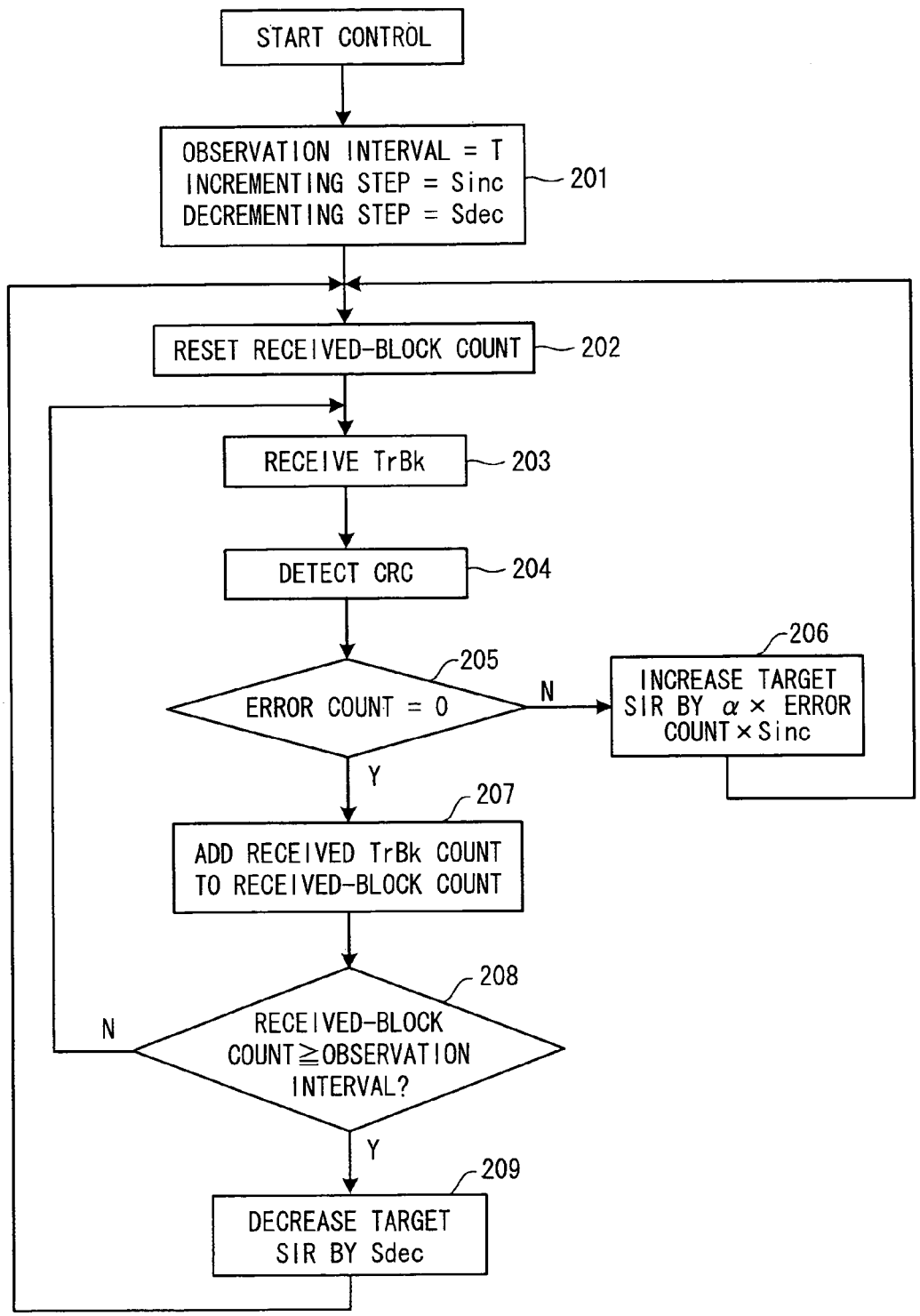
FIG. 10 is a flowchart of processing for controlling target SIR according to the second embodiment.

FIG. 9 is a block diagram of a second embodiment of the present invention and illustrates in detail the part of a mobile station that is for outer-loop power control. Components identical with those of the first embodiment are designated by like reference characters. FIG. 10 is a flowchart of processing for controlling target SIR according to the second embodiment. The second embodiment is such that if error has been detected, a value (=α×Nerr×Sin c) that is the result of multiplying an initially set value Sin c by the coefficient (=α×Nerr) that conforms to the error count Nerr is used instead of the initially set value Sin c as the incrementing step (amount of increase) of the target SIR.

In FIG. 9, the CRC detector 24 performs CRC error detection every transport block TrBk and the operation thereof until the error-detection result of each TrBk is input to the target-SIR controller 25 is similar to that of the first embodiment.

The target-SIR controller 25 controls the target SIR in accordance with the flowchart of FIG. 10. Specifically, at the start of control of the target SIR, the target-SIR controller 25 reads in parameters (observation interval T, incrementing step Sin c and decrementing step Sdec), which conform to the target BLER, from the parameter conversion table 26, stores the parameters in the internal storage register 31 and resets the content (received-block count N) of the receive-block counter 32 (steps 201, 202).

If the CRC detector 24 receives a decoded result (consisting of one or more transport block TrBks) from the error correcting decoder 22 under these conditions (step 203), it subjects the decoded result to CRC error detection every transport block TrBk and inputs the result of CRC error detection to the target-SIR controller 25 (step 204). Upon receiving the result of CRC error detection, the target-SIR controller 25 discriminates the error-block count Nerr on a per-TTI basis (step 205).

Figure 11:
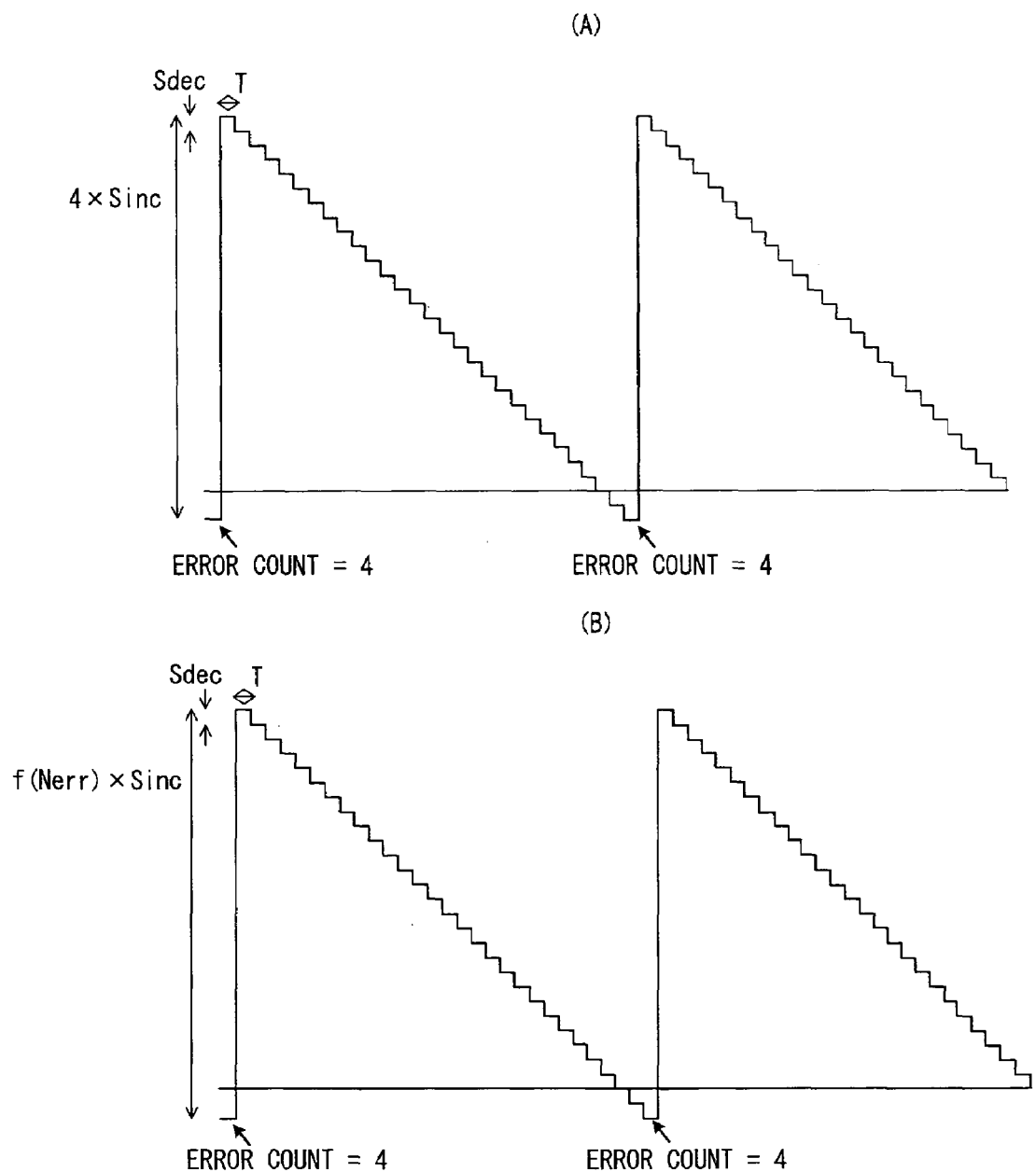
FIG. 11 is a diagram useful in describing operation of the second embodiment.

If the error-block count Nerr in one TTI is one or more, then an incrementing-step calculation unit 35 of the target-SIR controller 25 calculates the incrementing step according to the following equation:

$$\text{incrementing step} = \alpha \times \text{Nerr} \times \text{Sin } c \qquad (2)$$

and inputs the calculated value to the target-SIR increase/decrease control unit 33. The target-SIR increase/decrease control unit 33 increases the target SIR by the amount of the incrementing step input thereto (step 206). It should be noted that in Equation (2), α is a constant, e.g., 1, and Sin c is an initially set incrementing step. FIG. 11A is a diagram useful in describing operation in a case where α=1, Nerr=4 holds. Here the target SIR is raised to 4×Sin c at a stroke owing to occurrence of an error.

After the target SIR is increased, the target-SIR controller 25 returns control to step 202 and resets the number N of received blocks to zero, after which processing from step 203 onward is repeated.

On the other hand, if it is found at step 205 that the error count in CRC detection is zero, then the target-SIR controller 25 adds the TrBk count $N_{BLK}$ received in this TTI to the received-block count N (N=N+$N_{BLK}$; step 207). Next, the target-SIR controller 25 determines whether the received-block count N has become equal to or greater than the block count $N_{OBS}$ that conforms to the observation interval T (step 208).

If the received-block count N has become equal to or greater than the block count $N_{OBS}$ conforming to the observation interval T, then this means that not a single error was detected in this observation interval. Accordingly, the target-SIR increase/decrease control unit 33 of the target-SIR controller 25 decreases the target SIR by Sdec (step 209). The target-SIR controller 25 then returns control to step 202 and resets the received-block count N to zero, after which processing from step 203 onward is repeated. Further, if it is found at step 208 that the received-block count N is less than the observation interval $N_{OBS}$, then control returns to step 203 and processing from this step onward is executed.

The target-SIR controller 25 outputs the target SIR updated at steps 206, 209 to the comparator 27. The latter compares the target SIR with the measured SIR measured by the SIR measurement unit 28 and creates a TPC command, which is transmitted to the base station 10, based upon the result of comparison.

In accordance with the second embodiment, if error has been detected, a value that is the result of multiplying Sin c by a coefficient (=α×Nerr) conforming to the number of errors is used instead of the initially set Sin c as the incrementing step (amount of increase) of target SIR. As a result, the target SIR is increased by a step larger than that of the prior art and therefore the length of time until the target SIR decreases to the level at which error occurs is increased. Consequently, the intervals at which errors occur can be prolonged and, as a result, the target BLER can be attained.

Figure 12:
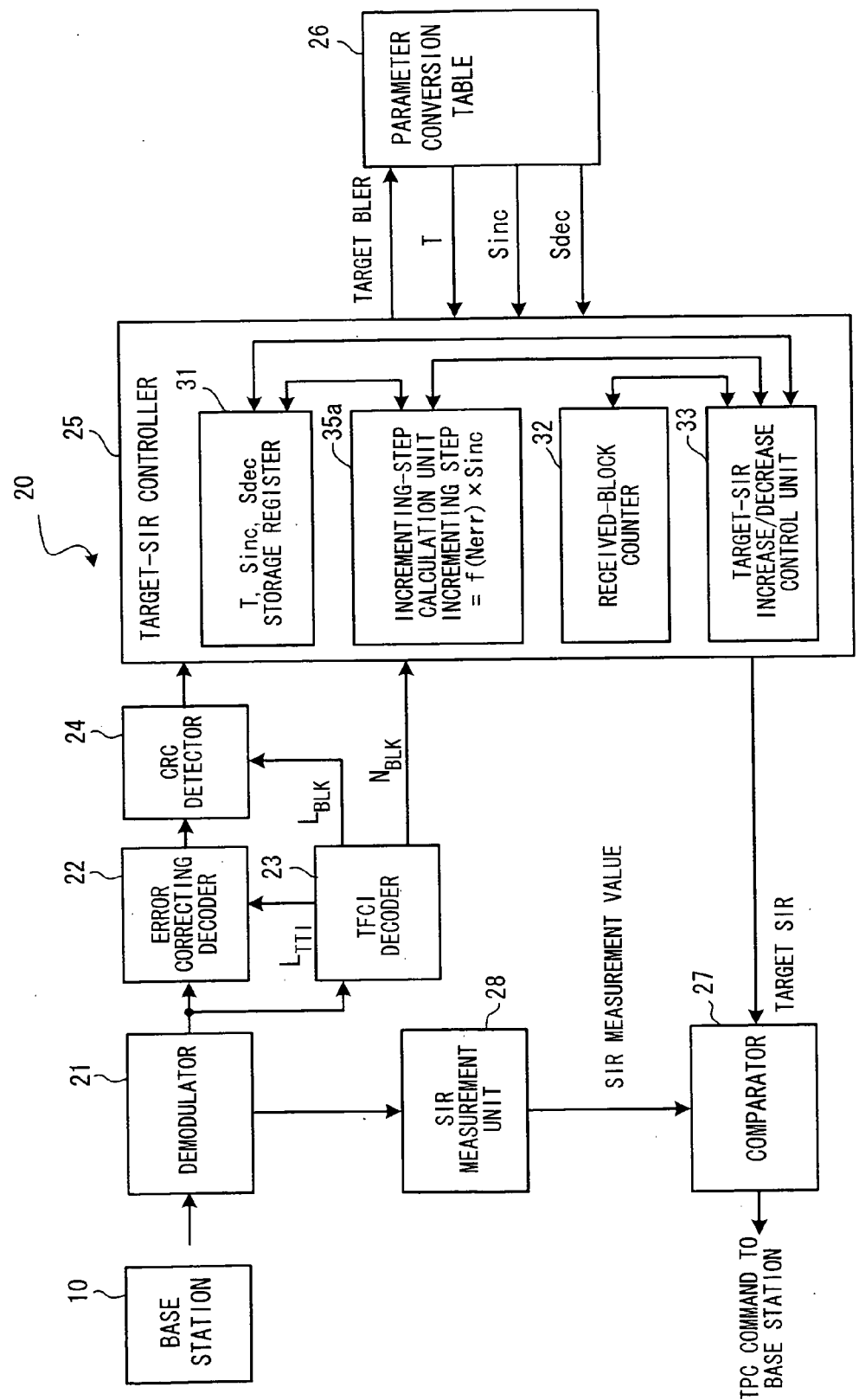
FIG. 12 illustrates a modification of the second embodiment.
Figure 13:
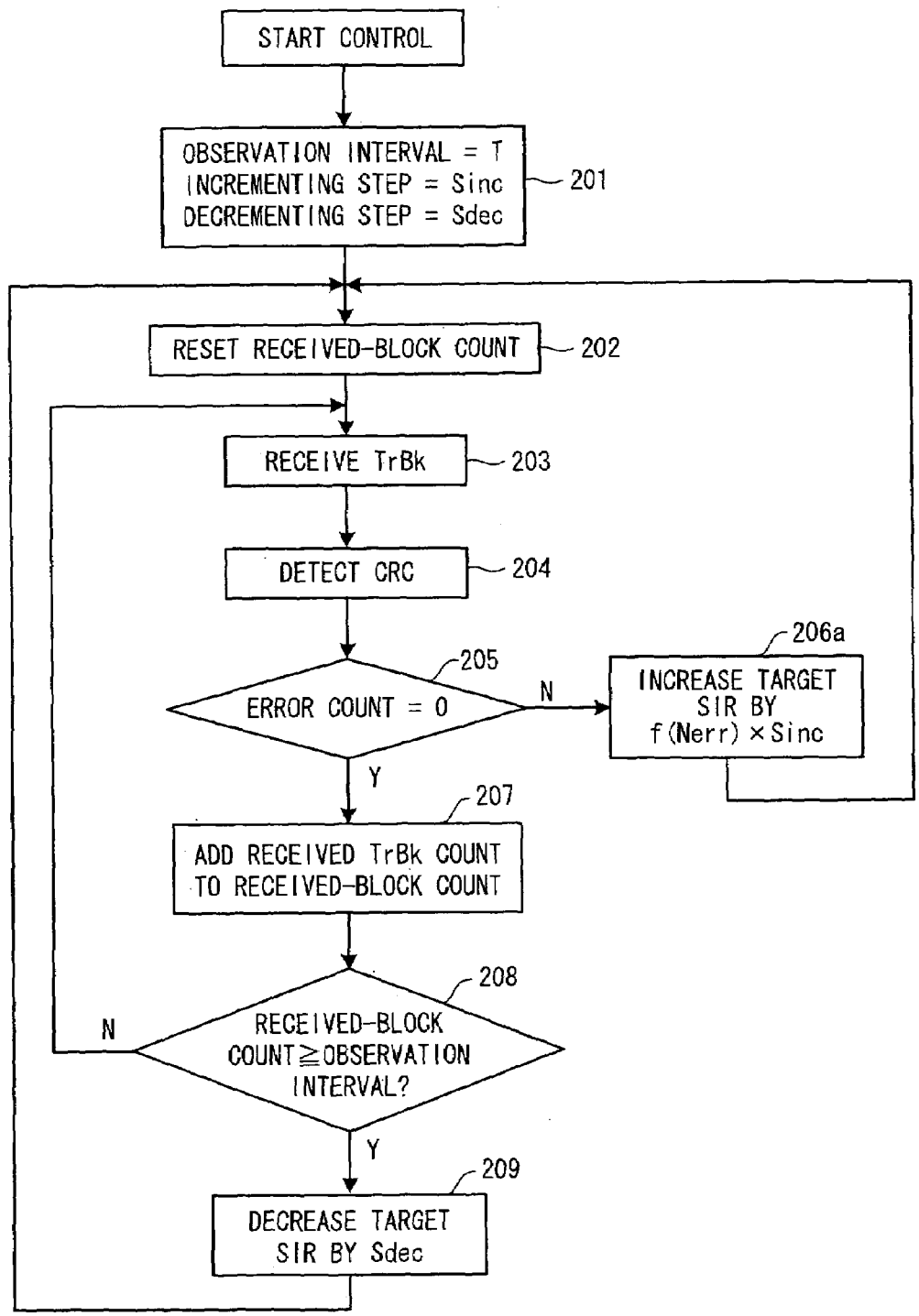
FIG. 13 is a flowchart of processing for controlling target SIR according to this modification.

FIG. 12 illustrates a modification of the second embodiment, and FIG. 13 is a flowchart of processing for controlling target SIR according to this modification. Components identical with those of the second embodiment of FIGS. 9 and 10 are designated by like reference characters. This modification differs in that whereas the coefficient used to multiply the incrementing step Sin c is α×Nerr in the second embodiment, here the coefficient is made a function f(Nerr) of the error-block count Nerr (see an incrementing-step calculation unit 35a and step 206a).

The coefficient used to multiply the incrementing step Sin c need not necessarily be a value proportional to the error count Nerr and may be a value that has been weighted in dependence upon the block count. FIG. 11(B) is a diagram for describing the operation of this modification. Here the incrementing step is f(Nerr)×Sin c.

(C) Third Embodiment

Figure 14:
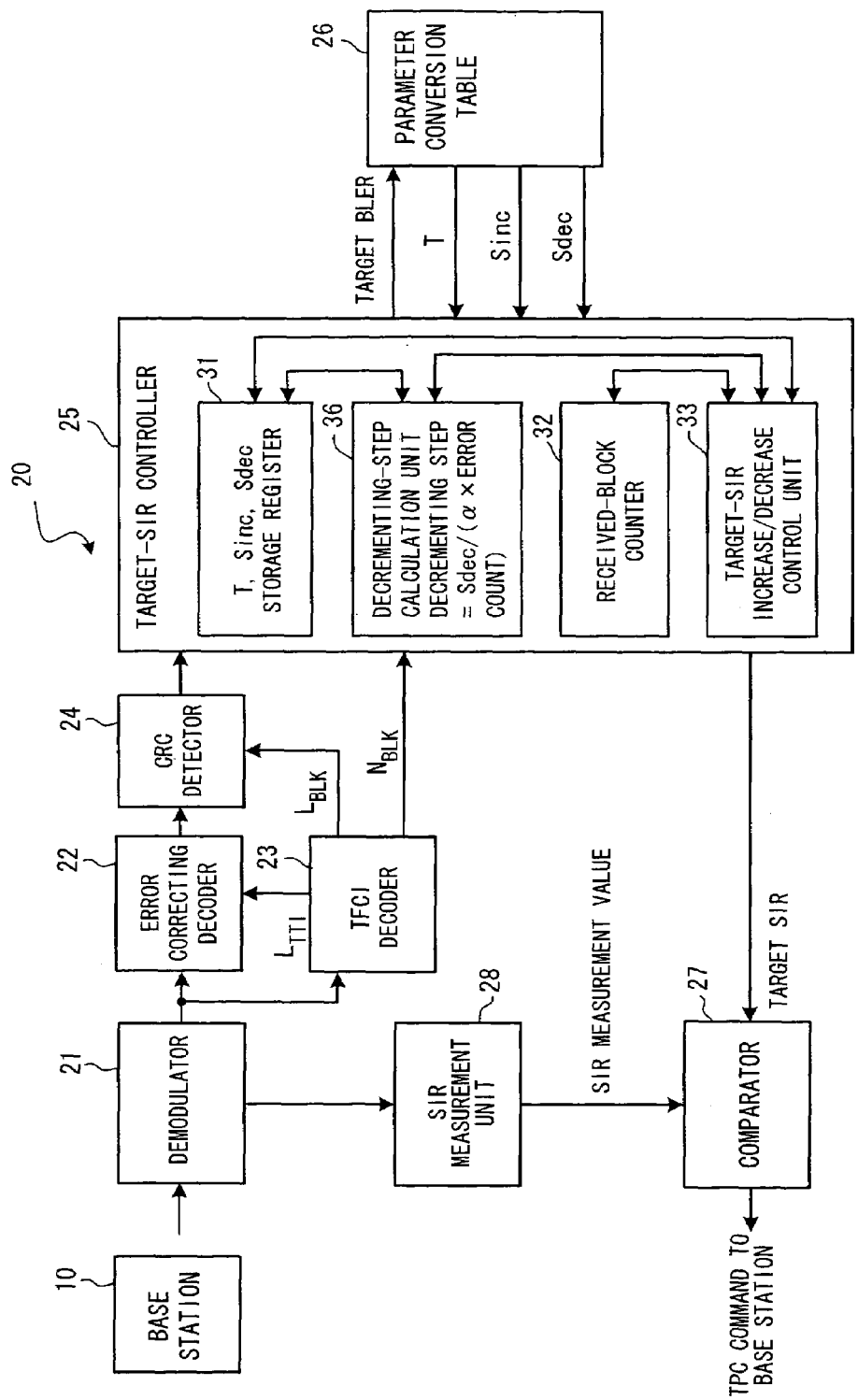
FIG. 14 is a block diagram of a third embodiment of the present invention.
Figure 15:
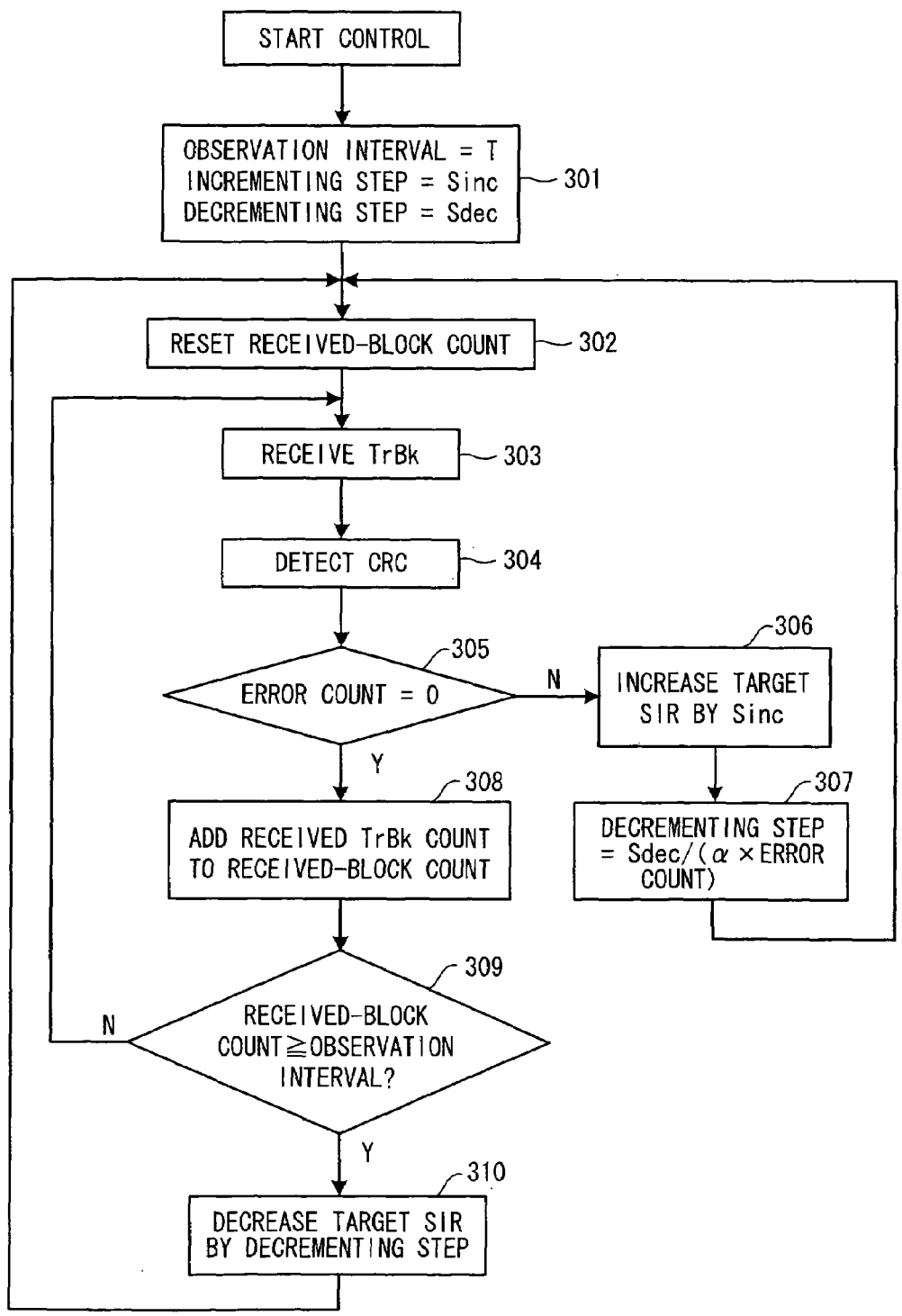
FIG. 15 is a flowchart of processing for controlling target SIR according to the third embodiment.

FIG. 14 is a block diagram of a third embodiment of the present invention and illustrates in detail the part of a mobile station that is for outer-loop power control. Components identical with those of the first embodiment are designated by like reference characters. FIG. 15 is a flowchart of processing for controlling target SIR according to the third embodiment. According to the third embodiment, a value resulting from division of the initially set Sdec by the coefficient (=α×Nerr) conforming to the error count Nerr that prevailed the last time an error was detected is used instead of Sdec as the decrementing step (amount of decrease) of the target SIR that prevails if a single error has not been detected during the time of the observation interval.

In FIG. 14, the CRC detector 24 performs CRC error detection every transport block TrBk and the operation thereof until the error-detection result of each TrBk is input to the target-SIR controller 25 is similar to that of the first embodiment.

The target-SIR controller 25 controls the target SIR in accordance with the flowchart of FIG. 15. Specifically, at the start of control of the target SIR, the target-SIR controller 25 reads in parameters (observation interval T, incrementing step Sin c and decrementing step Sdec), which conform to the target BLER, from the parameter conversion table 26, stores the parameters in the internal storage register 31 and resets the content (received-block count N) of the receive-block counter 32 (steps 301, 302).

If the CRC detector 24 receives a decoded result (consisting of one or more transport block TrBks) from the error correcting decoder 22 under these conditions (step 303), it subjects the decoded result to CRC error detection every transport block TrBk and inputs the result of CRC error detection to the target-SIR controller 25 (step 304). Upon receiving the result of CRC error detection, the target-SIR controller 25 discriminates the error-block count Nerr on a per-TTI basis (step 305).

If the error-block count Nerr in one TTI is one or more, then the target-SIR increase/decrease control unit 33 of the target-SIR controller 25 increases the target SIR by Sin c (step 306). Further, a decrementing-step calculation unit 36 of the target-SIR controller 25 updates the decrementing step according to the following equation (step 307):

$$\text{decrementing step} = Sdec/[\alpha \times \text{Nerr}] \quad (3)$$

In Equation (3), α is a constant, e.g., 1, and Sdec is an initially set decrementing step.

After the decrementing step is updated, the target-SIR controller 25 returns control to step 302 and resets the number of received blocks to zero, after which processing from step 203 onward is repeated.

On the other hand, if it is found at step 305 that the error count Nerr in one TTI is zero, then the target-SIR controller 25 adds the TrBk count (=$N_{BLK}$) received in this TTI to the received-block count N (N=N+$N_{BLK}$; step 308). Next, the target-SIR controller 25 determines whether the received-block count N has become equal to or greater than a block count $N_{OBS}$ that conforms the observation interval T (step 309).

Figure 16:
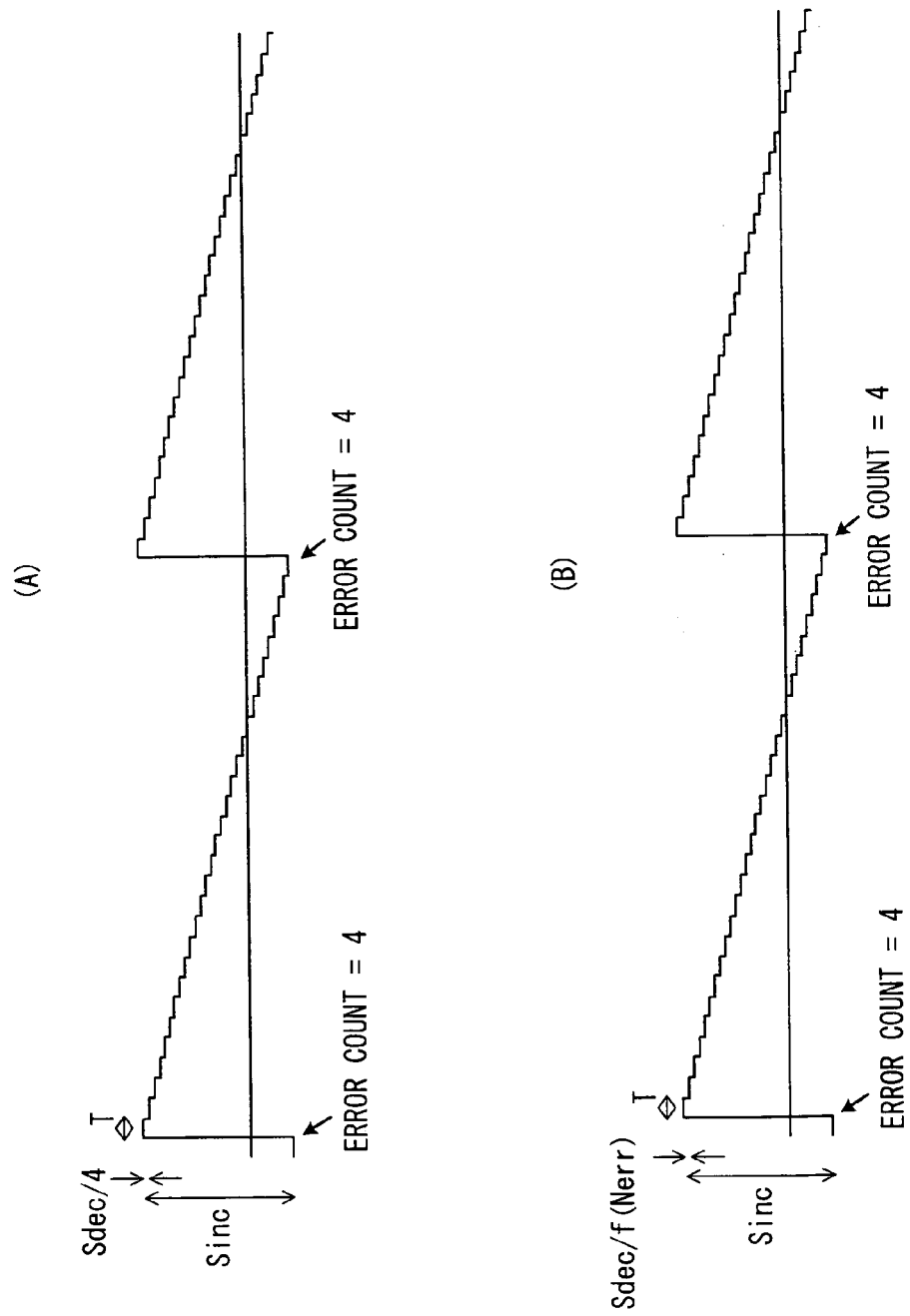
FIG. 16 is a diagram useful in describing operation of the third embodiment.

If the received-block count N has become equal to or greater than the block count $N_{OBS}$ conforming to the observation interval T, then this means that not a single error was detected in this observation interval T. Accordingly, the target-SIR increase/decrease control unit 33 of the target-SIR controller 25 decreases the target SIR by the amount of a decrementing step found using Equation (3) (step 310). FIG. 16(A) is a diagram for describing operation in a case where α=1, Nerr=4 holds. The target SIR is reduced by Sdec/4 unless an error occurs during the time of the observation interval.

Thereafter, the target-SIR controller 25 returns control to step 302 and resets the received-block count N to zero, after which processing from step 303 onward is repeated. Further, if it is found at step 309 that the received-block count N is less than the observation interval $N_{OBS}$, then control returns to step 303 and processing from this step onward is executed.

The target-SIR controller 25 outputs the target SIR updated at steps 306, 310 to the comparator 27. The latter compares the target SIR with the measured SIR measured by a SIR measurement unit 28 and creates a TPC command, which is transmitted to the base station 10, based upon the result of comparison.

In accordance with the third embodiment, a value resulting from division of the initially set Sdec by the coefficient (=α×Nerr) that conforms to the error count Nerr that prevailed the last time an error was detected is used instead of Sdec as the decrementing step (amount of decrease) of the target SIR. If this arrangement is adopted, there is a reduction in the amount of decrease of the target SIR per time when the observation interval ends without the occurrence of an error, and time until the target SIR decreases to a level at which an error occurs is prolonged. Consequently, the intervals at which errors occur can be prolonged and, as a result, the target BLER can be attained.

Figure 17:
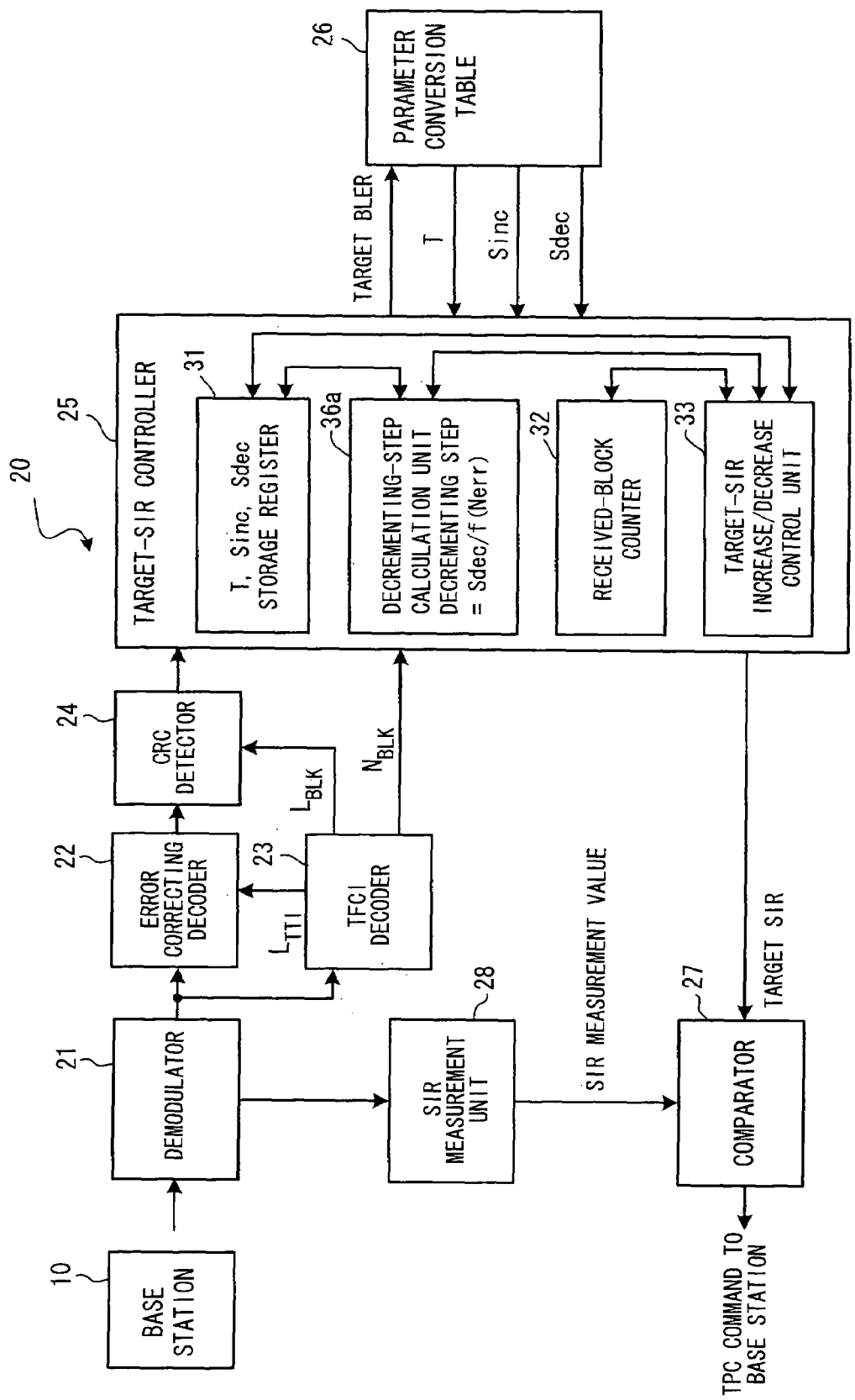
FIG. 17 illustrates a modification of the third embodiment.
Figure 18:
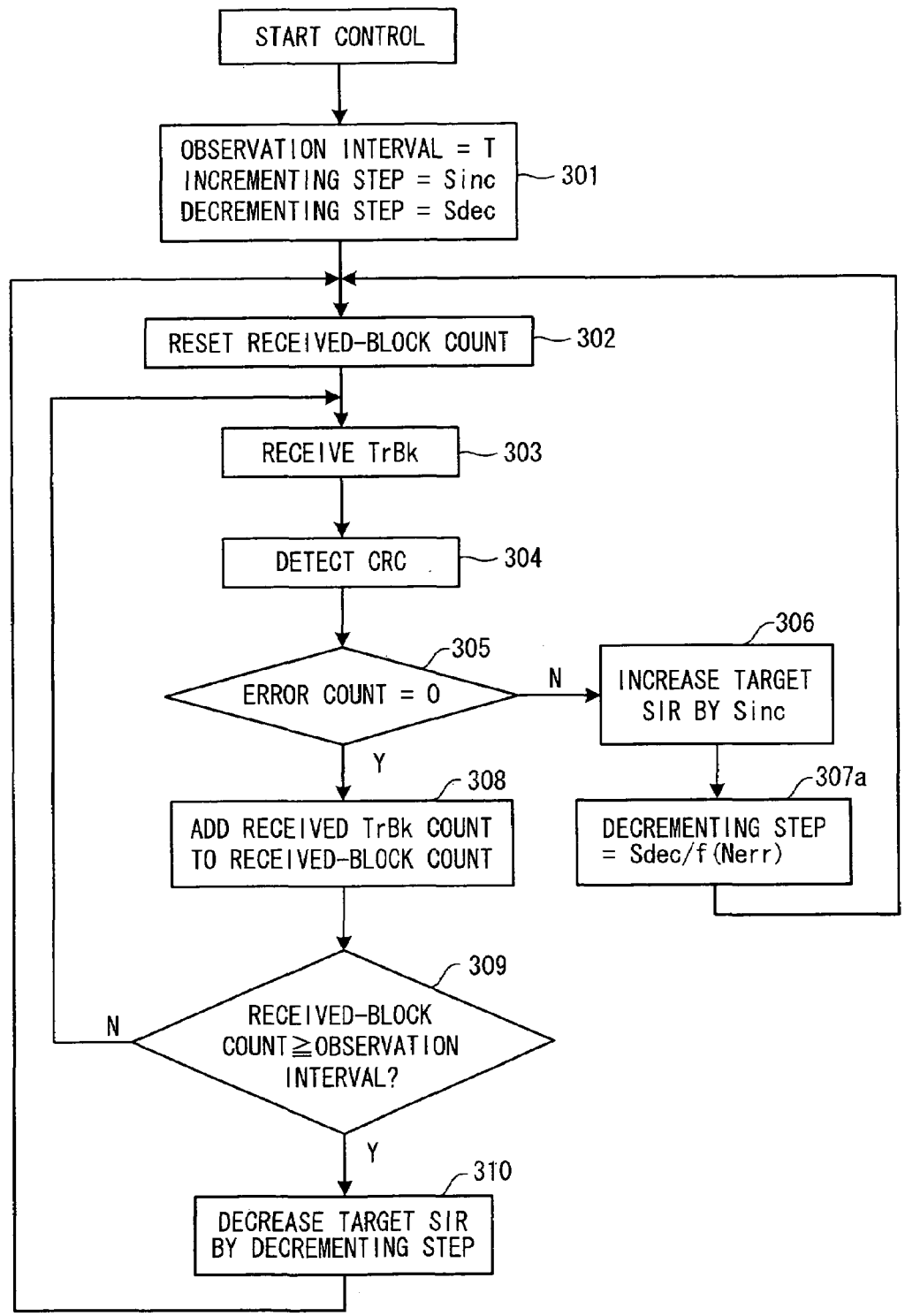
FIG. 18 is a flowchart of processing for controlling target SIR according to this modification.

FIG. 17 illustrates a modification of the third embodiment, and FIG. 18 is a flowchart of processing for controlling target SIR according to this modification. Components identical with those of the third embodiment of FIGS. 14 and 15 are designated by like reference characters. This modification differs in that whereas the coefficient used to divide the decrementing step Sdec in the third embodiment is [α×Nerr], here the coefficient is made a function f(Nerr) of the error-block count Nerr (see a decrementing-step calculation unit 36a and step 307a).

The coefficient used to divide the decrementing step Sdec need not necessarily be a value proportional to the error count and may be a value that has been weighted in dependence upon the block count. FIG. 16(B) is a diagram for describing the operation of this modification. Here the decrementing step is Sin c/f(Nerr).

(E) Fourth Embodiment

Figure 19:
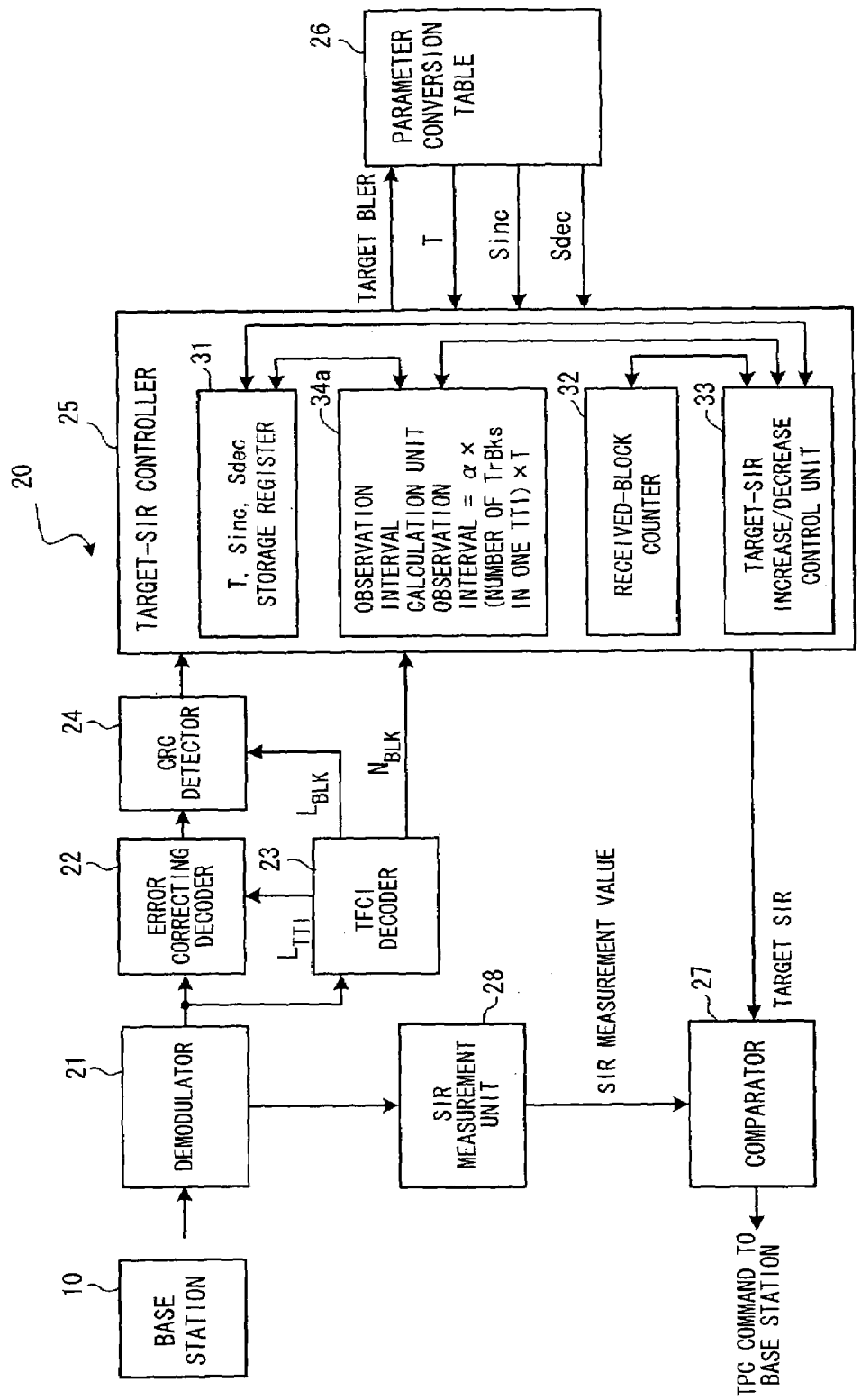
FIG. 19 is a block diagram of a fourth embodiment of the present invention.
Figure 20:
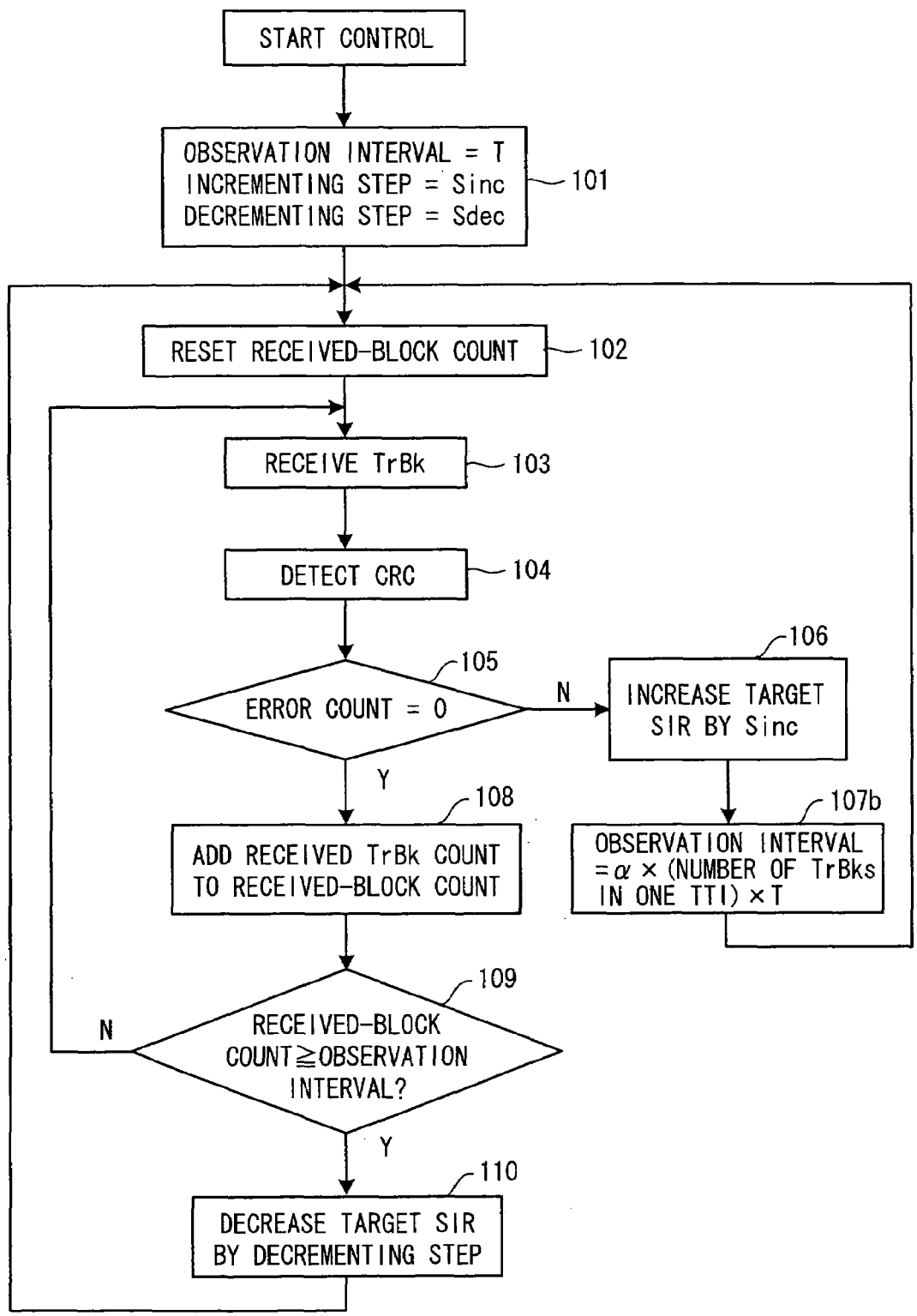
FIG. 20 is a flowchart of processing for controlling target SIR according to the fourth embodiment.

FIG. 19 is a block diagram of a fourth embodiment of the present invention and illustrates in detail the part of a mobile station that is for outer-loop power control. Components identical with those of the first embodiment are designated by like reference characters. FIG. 20 is a flowchart of processing for controlling target SIR according to the fourth embodiment.

The first embodiment is such that if error has been detected, a value [α×Nerr×T] that is the result of multiplying T by the coefficient (=α×Nerr) conforming to the error count Nerr is used instead of the initially set T as the observation interval up to detection of the next error. In the fourth embodiment, on the other hand, if error has been detected, a value [α×TrBk count×T] that is the result of multiplying the initially set T by a coefficient (=α×TrBk count] that conforms to the number of TrBks contained in one TTI is used instead of T as the observation interval up to detection of the next error. The reason for this is that if error is detected in one transport block TrBk, often the error is contained in all transport blocks in the TTI.

Thus, the fourth embodiment resembles the first embodiment. In FIGS. 19, 20 of the fourth embodiment, this embodiment differs from FIGS. 1 and 2 of the first embodiment in that when the error-block count Nerr in one TTI is one or greater, an observation-interval calculation unit 34b of the target-SIR controller 25 updates the observation interval according to the following equation (step 107b):

$$\text{observation interval} = \alpha \times (\text{number of } TrBks \text{ contained in one } TTI) \times T \qquad (4)$$

The target-SIR controller 25 controls the target SIR in accordance with the flowchart of FIG. 20. Specifically, at the start of control of the target SIR, the target-SIR controller 25 reads in parameters (observation interval T, incrementing step Sin c and decrementing step Sdec), which conform to the target BLER, from the parameter conversion table 26, stores the parameters in the internal storage register 31 and resets the content (received-block count N) of the received-block counter 32 (steps 101, 102).

If the CRC detector 24 receives a decoded result (consisting of one or more transport block TrBks) from the error correcting decoder 22 under these conditions (step 103), it demultiplexes the results of decoding in units of the transport blocks TrBk, performs CRC error detection and inputs the result of CRC error detection to the target-SIR controller 25 (step 104). Upon receiving the result of CRC error detection, the target-SIR controller 25 discriminates the error-block count Nerr on a per-TTI basis (step 105).

Figure 21:
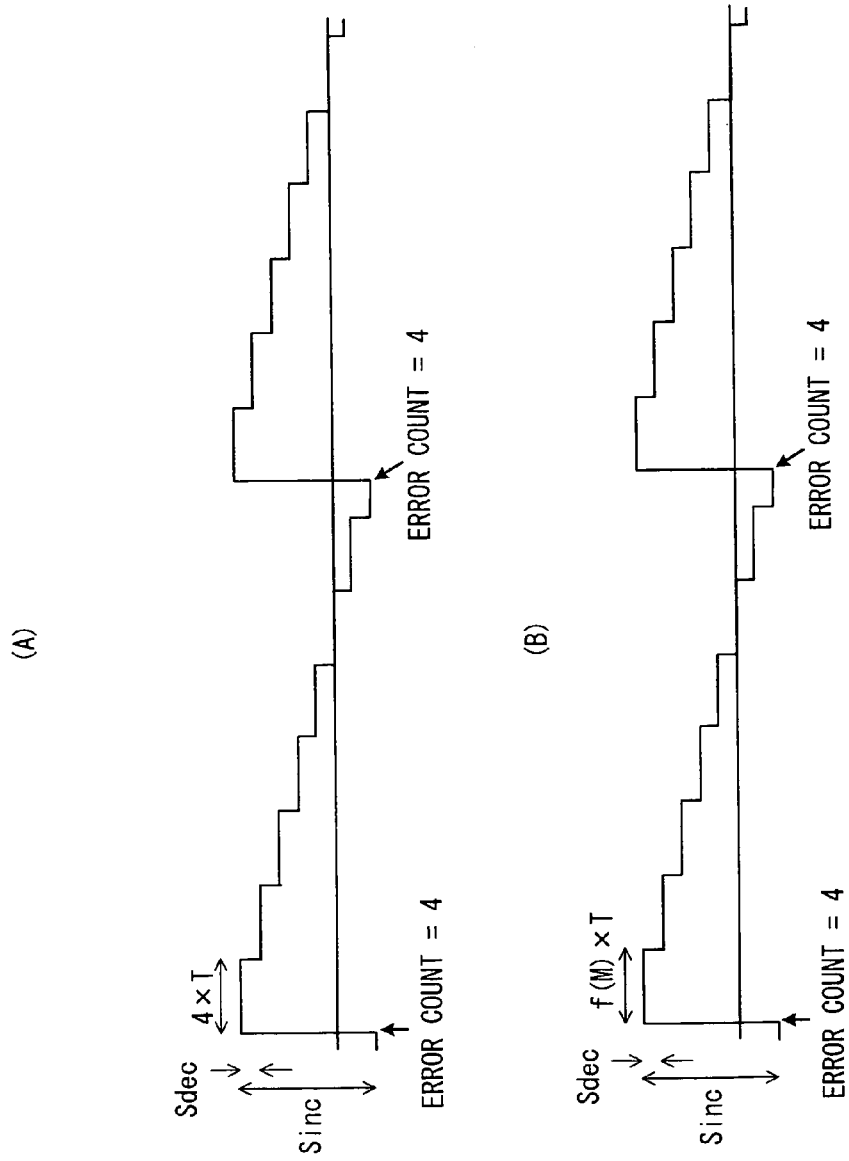
FIG. 21 is a diagram useful in describing operation of the fourth embodiment.

If the error-block count Nerr in one TTI is one or more, then a target-SIR increase/decrease control unit 33 of the target-SIR controller 25 increases the target SIR by Sin c (step 106). Further, the observation-interval calculation unit 34b of the target-SIR controller 25 updates the observation interval according to Equation (4) (step 107b). FIG. 21(A) is a diagram for describing operation in a case where α=1, Nerr=4 holds. The observation interval is extended from T to 4×T.

After the observation interval is updated, the target-SIR controller 25 returns control to step 102 and resets the number of received blocks to zero, after which processing from step 103 onward is repeated.

On the other hand, if it is found at step 105 that the error count in CRC detection is zero, then the target-SIR controller 25 adds the TrBk count $N_{BLK}$ received in this TTI to the received-block count N (N=N+$N_{BLK}$; step 108). Next, the target-SIR controller 25 determines whether the received-block count N has become equal to or greater than the block count $N_{OBS}$ that conforms to the observation interval (step 109).

If the received-block count N has become equal to or greater than the block count $N_{OBS}$ conforming to the observation interval, then this means that not a single error was detected in this observation interval. Accordingly, the target-SIR increase/decrease control unit 33 decreases the target SIR by Sdec (step 110). Thereafter, the target-SIR controller 25 returns control to step 102 and resets the received-block count N to zero, after which processing from step 103 onward is repeated. Further, if it is found at step 109 that the received-block count N is less than the observation interval $N_{OBS}$, then control returns to step 103 and processing from this step onward is executed.

The target-SIR controller 25 outputs the target SIR updated at steps 106, 110 to the comparator 27. The latter compares the target SIR with the measured SIR measured by a SIR measurement unit 28 and creates a TPC command, which is transmitted to the base station 10, based upon the result of comparison.

In accordance with the fourth embodiment, if error has been detected in the TTI, a value (=α×M×T) that is the result of multiplying T by a coefficient (=α×M) conforming to the number of TrBks (=M) contained in the TTI is used instead of T as the observation interval up to detection of the next error. As a result, there is an increase in the number of blocks that must be observed until the target SIR is reduced and an increase in time until target SIR is reduced. That is, the time during which target SIR is increasing is prolonged. Consequently, the intervals at which errors occur can be prolonged and, as a result, the target BLER can be attained.

Figure 22:
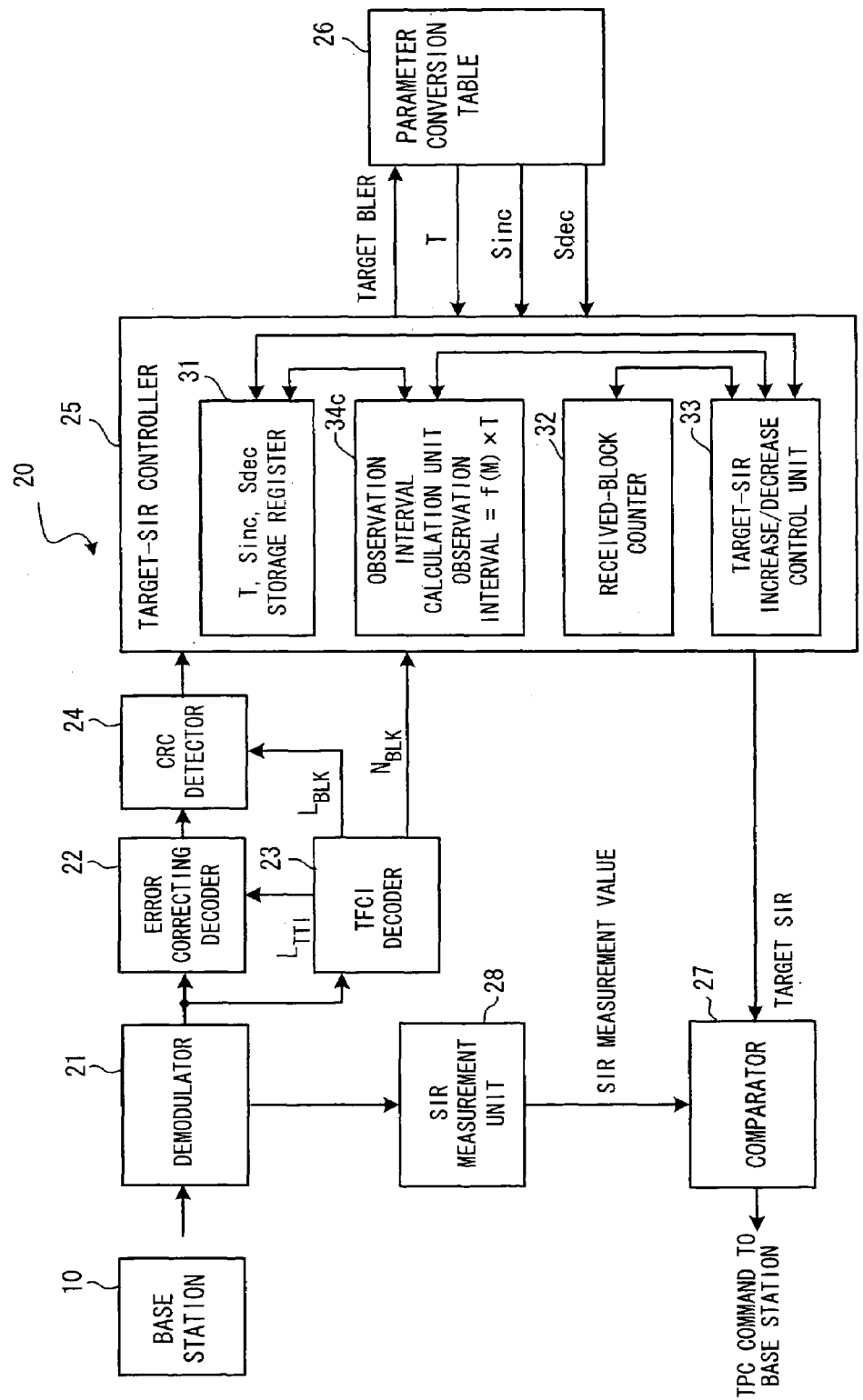
FIG. 22 illustrates a modification of the fourth embodiment.
Figure 23:
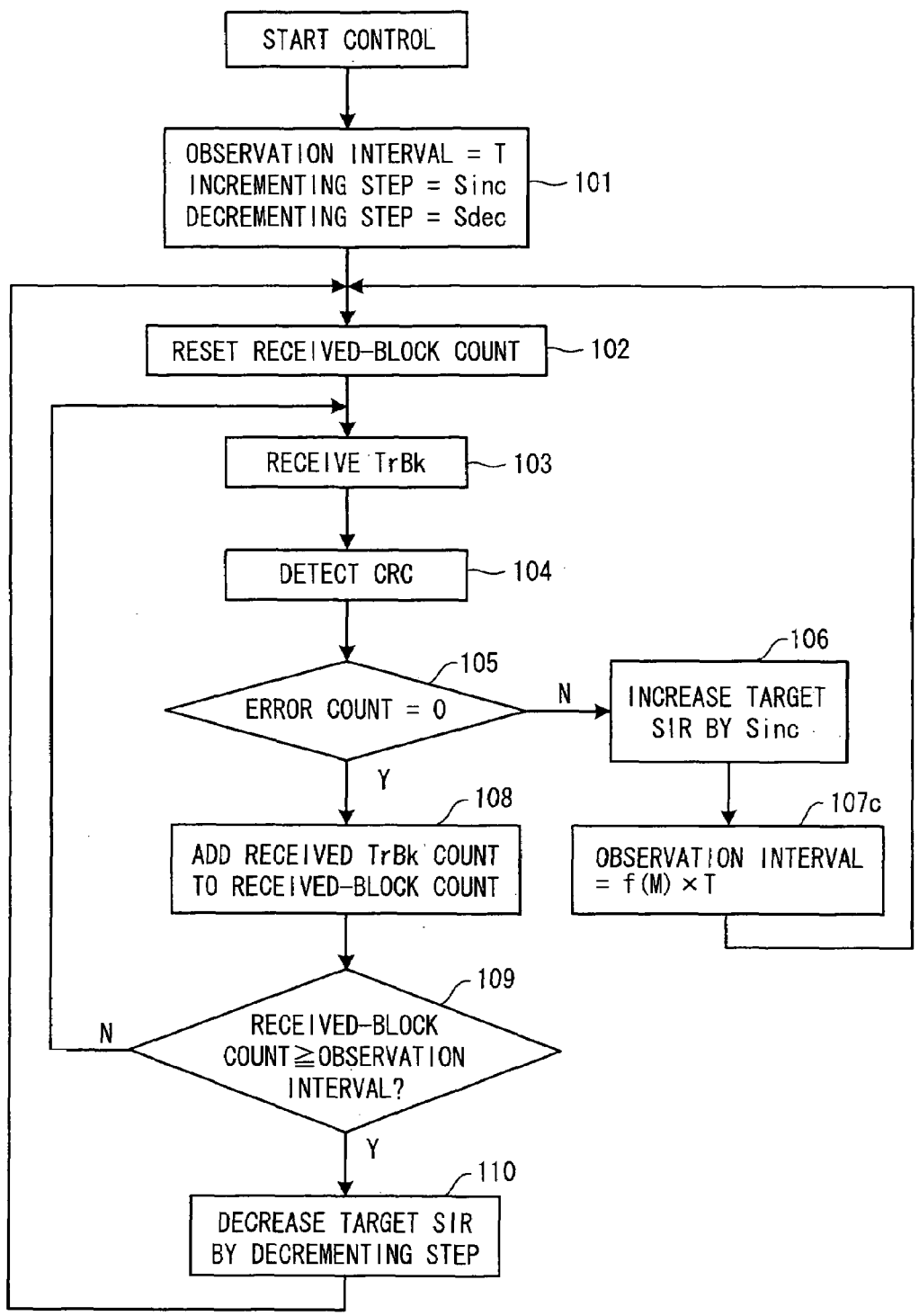
FIG. 23 is a flowchart of processing for controlling target SIR according to this modification.

FIG. 22 illustrates a modification of the fourth embodiment, and FIG. 23 is a flowchart of processing for controlling target SIR according to this modification. Components identical with those of the fourth embodiment of FIGS. 19 and 20 are designated by like reference characters. This modification differs in that whereas the coefficient used to multiply T is [α×number of TrBks contained in one TTI] in the fourth embodiment, here the coefficient is made a function f(M) of the number of TrBks (=M) (see a observation interval calculation unit 34c and step 107c). The coefficient used to multiply T need not necessarily be a value proportional to the TrBk count and may be a value that has been weighted in dependence upon the TrBk count. FIG. 21(B) is a diagram for describing the operation of this modification. Here the observation interval is extended from T to f(M)×T.

(F) Fifth Embodiment

Figure 24:
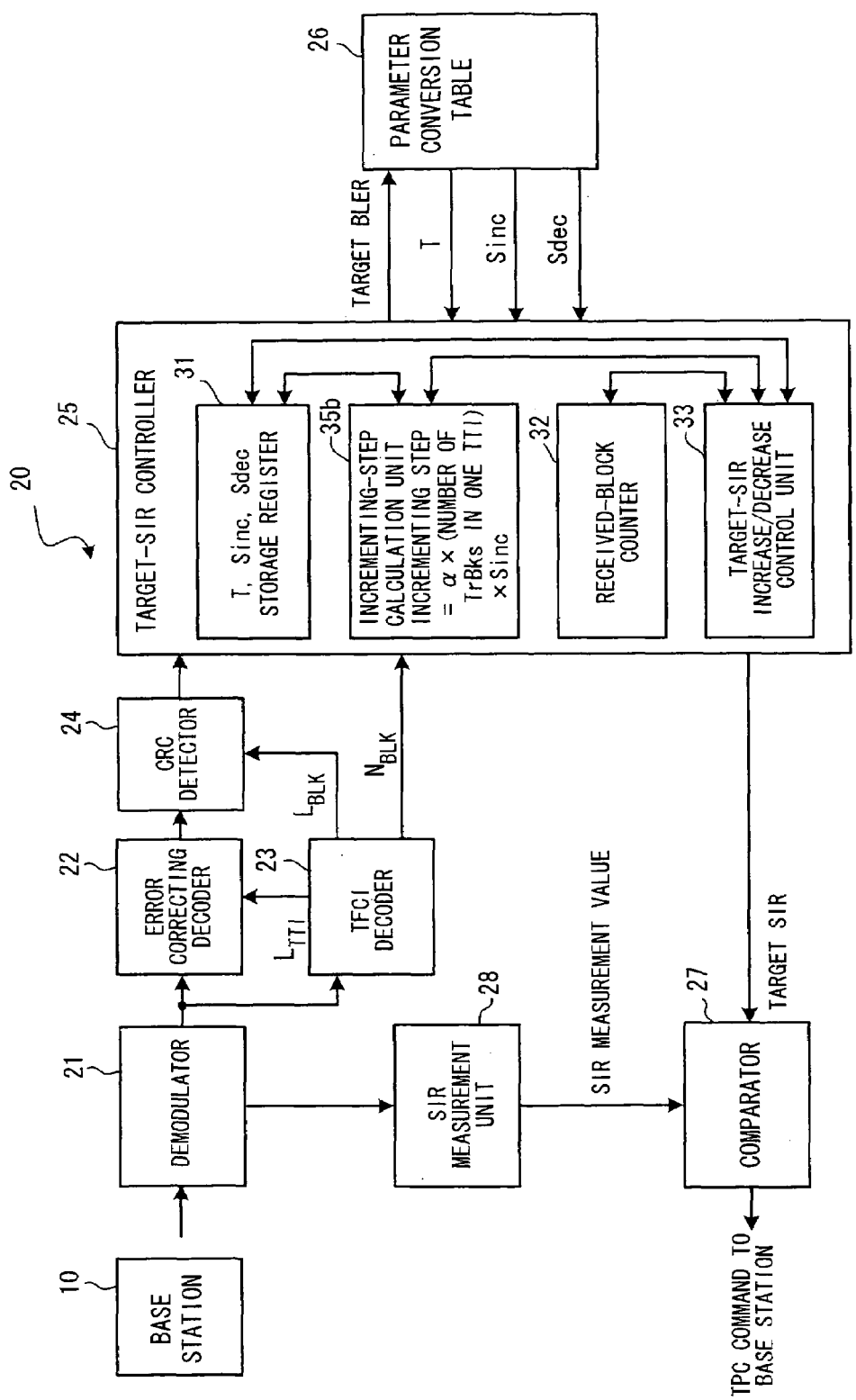
FIG. 24 is a block diagram of a fifth embodiment of the present invention.
Figure 25:
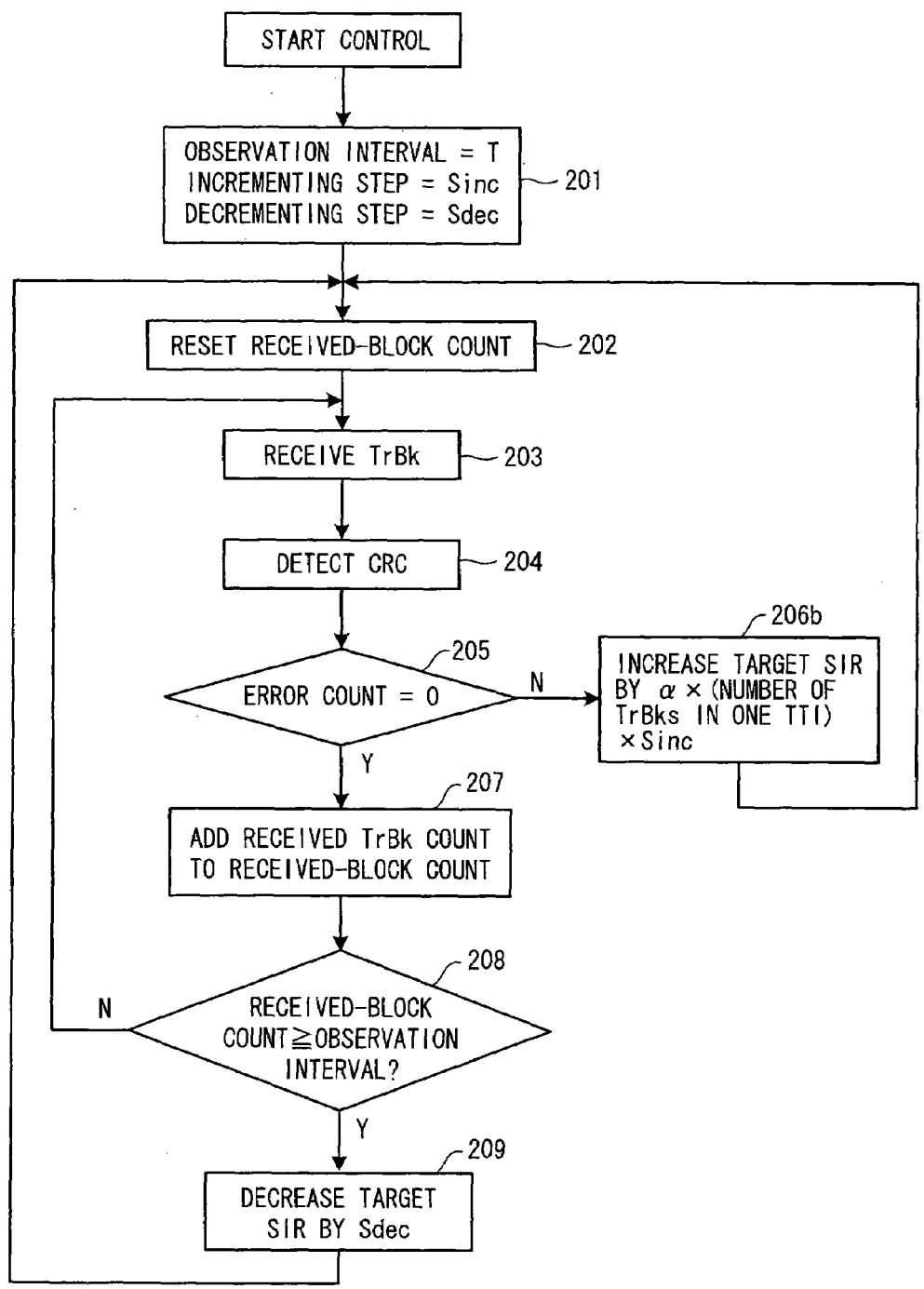
FIG. 25 is a flowchart of processing for controlling target SIR according to the fifth embodiment.

FIG. 24 is a block diagram of a fifth embodiment of the present invention and illustrates in detail the part of a mobile station that is for outer-loop power control. Components identical with those of the second embodiment are designated by like reference characters. FIG. 25 is a flowchart of processing for controlling target SIR according to the fifth embodiment.

The second embodiment is such that if error has been detected, a value (=α×Nerr×Sin c) that is the result of multiplying the initially set value Sin c by the coefficient (=α×Nerr) that conforms to the error count Nerr is used instead of Sin c as the incrementing step (amount of increase) of the target SIR. In the fifth embodiment, on the other hand, if error has been detected, a value [α×TrBk count×Sin c] that is the result of multiplying the initially set Sin c by a coefficient (=α×TrBk count) that conforms to the number of TrBks contained in one TTI is used instead of Sin c as the incrementing step of target SIR. The reason for this is that if error is detected in one transport block TrBk, often the error is contained in all transport blocks in the TTI.

Thus, the fifth embodiment resembles the second embodiment. In FIGS. 24, 25 of the fifth embodiment, this embodiment differs from FIGS. 9 and 10 of the second embodiment in that when the error-block count Nerr in one TTI is one or greater, an incrementing-step calculation unit 35b of the target-SIR controller 25 updates the incrementing step according to the following equation (step 206b):

incrementing step=α×(number of *TrBks* contained in one *TTI*)×Sin *c*     (5)

The target-SIR controller 25 controls the target SIR in accordance with the flowchart of FIG. 25. Specifically, at the start of control of the target SIR, the target-SIR controller 25 reads in parameters (observation interval T, incrementing step Sin c and decrementing step Sdec), which conform to the target BLER, from the parameter conversion table 26, stores the parameters in the internal storage register 31 and resets the content (receive-block count N) of the received-block counter 32 (steps 201, 202).

If the CRC detector 24 receives a decoded result (consisting of one or more transport block TrBks) from the error correcting decoder 22 under these conditions (step 203), it demultiplexes the results of decoding in units of the transport blocks TrBk, performs CRC error detection and inputs the result of CRC error detection to the target-SIR controller 25 (step 204). Upon receiving the result of CRC error detection, the target-SIR controller 25 discriminates the error-block count Nerr on a per-TTI basis (step 205).

Figure 26:
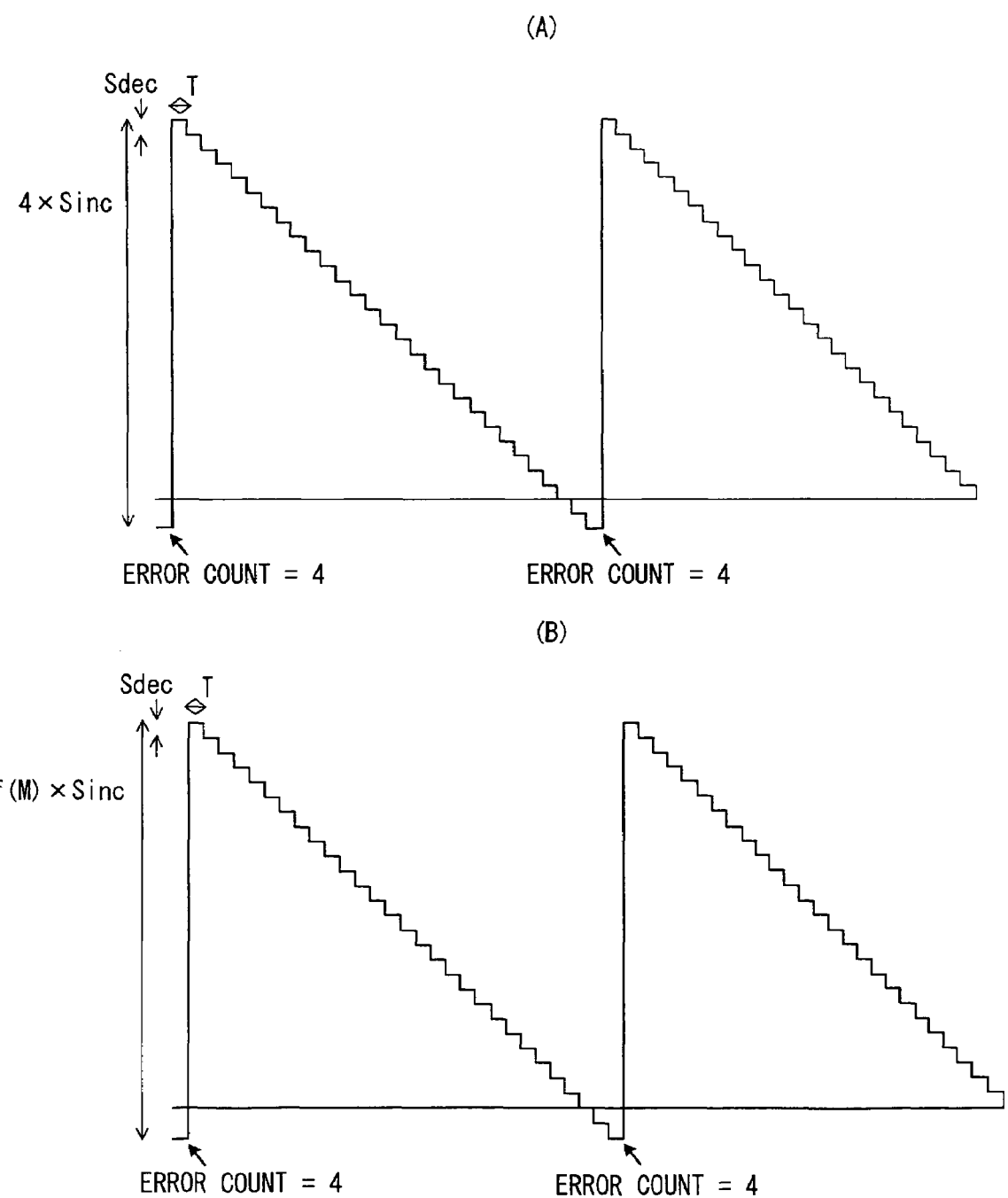
FIG. 26 is a diagram useful in describing operation of the fifth embodiment.

If the error-block count Nerr in one TTI is one or more, then the incrementing-step calculation unit 35b of the target-SIR controller 25 calculates the incrementing step according to Equation (5) and inputs the calculated value to the target-SIR increase/decrease control unit 33. The target-SIR increase/decrease control unit 33 increases the target SIR by the amount of the incrementing step input thereto (step 206b). FIG. 26A is a diagram useful in describing operation in a case where α=1, (number of TrBks contained in one TTI)=4 holds. Here the target SIR is raised to 4×Sin c at a stroke owing to occurrence of an error.

After the target SIR is increased, the target-SIR controller 25 returns control to step 202 and resets the number N of received blocks to zero, after which processing from step 203 onward is repeated.

On the other hand, if it is found at step 205 that the error count in CRC detection is zero, then the target-SIR controller 25 adds the TrBk count $N_{BLK}$ received in this TTI to the received-block count N (N=N+$N_{BLK}$; step 207). Next, the target-SIR controller 25 determines whether the received-block count N has become equal to or greater than the block count $N_{OBS}$ that conforms to the observation interval T (step 208).

If the received-block count N has become equal to or greater than the block count $N_{OBS}$ conforming to the observation interval T, then this means that not a single error was detected in this observation interval. Accordingly, the target-SIR increase/decrease control unit 33 of the target-SIR controller 25 decreases the target SIR by Sdec (step 209). The target-SIR controller 25 then returns control to step 202 and resets the received-block count N to zero, after which processing from step 203 onward is repeated. Further, if it is found at step 208 that the received-block count N is less than the observation interval $N_{OBS}$, then control returns to step 203 and processing from this step onward is executed.

The target-SIR controller 25 outputs the target SIR updated at steps 206b, 209 to the comparator 27. The latter compares the target SIR with the measured SIR measured by the SIR measurement unit 28 and creates a TPC command, which is transmitted to the base station 10, based upon the result of comparison.

In accordance with the fifth embodiment, if error has been detected, a value (=α×TrBK count×Sin c) that is the result of multiplying Sin c by a coefficient (=α×TrBk count) conforming to the number of TrBks contained in one TTI is used instead of Sin c as the incrementing step of target SIR. As a result, the target SIR is increased by a step larger than that of the prior art and therefore the length of time required for the target SIR to decrease to the level at which error occurs is increased. Consequently, the intervals at which errors occur can be prolonged and, as a result, the target BLER can be attained.

Figure 27:
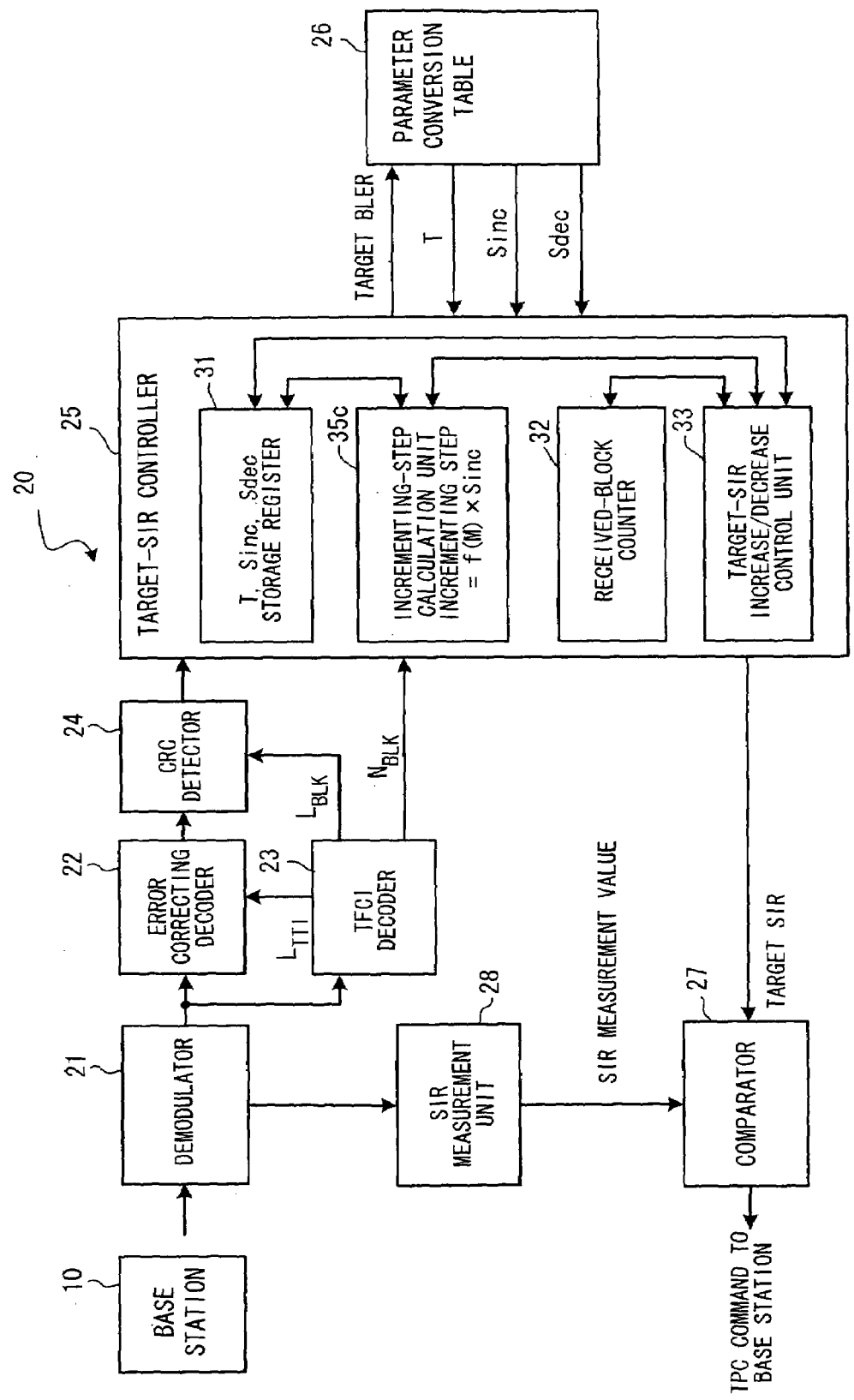
FIG. 27 illustrates a modification of the fifth embodiment.
Figure 28:
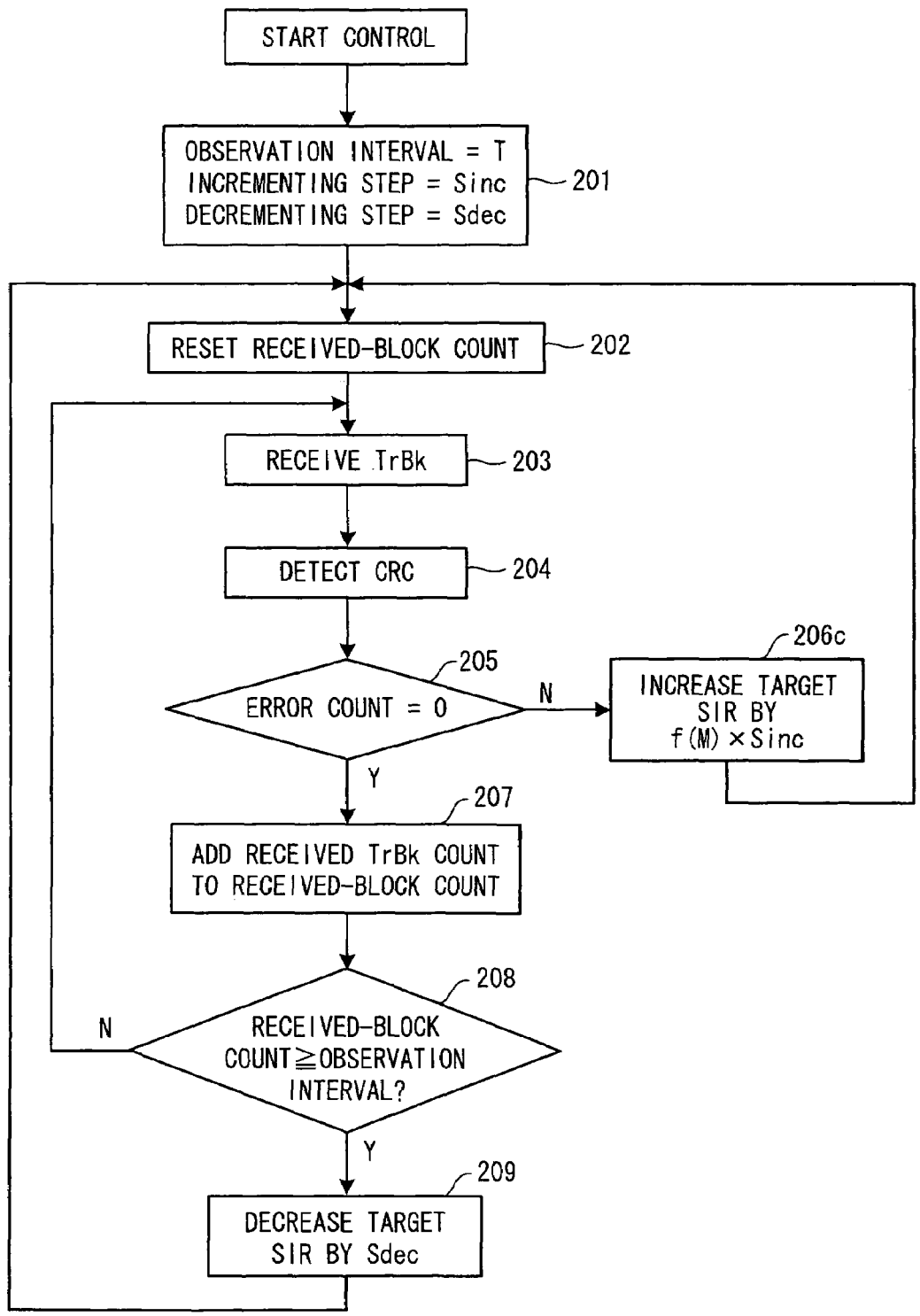
FIG. 28 is a flowchart of processing for controlling target SIR according to this modification.

FIG. 27 illustrates a modification of the fifth embodiment, and FIG. 28 is a flowchart of processing for controlling target SIR according to this modification. Components identical with those of the fifth embodiment of FIGS. 24 and 25 are designated by like reference characters. This modification differs in that whereas the coefficient used to multiply the incrementing step Sin c is [α×number of TrBks (=M) contained on one TTI] in the fifth embodiment, here the coefficient is made a function f(M) of the TrBk count (=M) (see an incrementing-step calculation unit 35c and step 206c).

The coefficient used to Sin c need not necessarily be a value proportional to the TrBk count and may be a value that has been weighted in dependence upon the TrBk count. FIG. 26(B) is a diagram for describing the operation of this modification. Here the incrementing step is f(M)×Sin c.

(G) Sixth Embodiment

Figure 30:
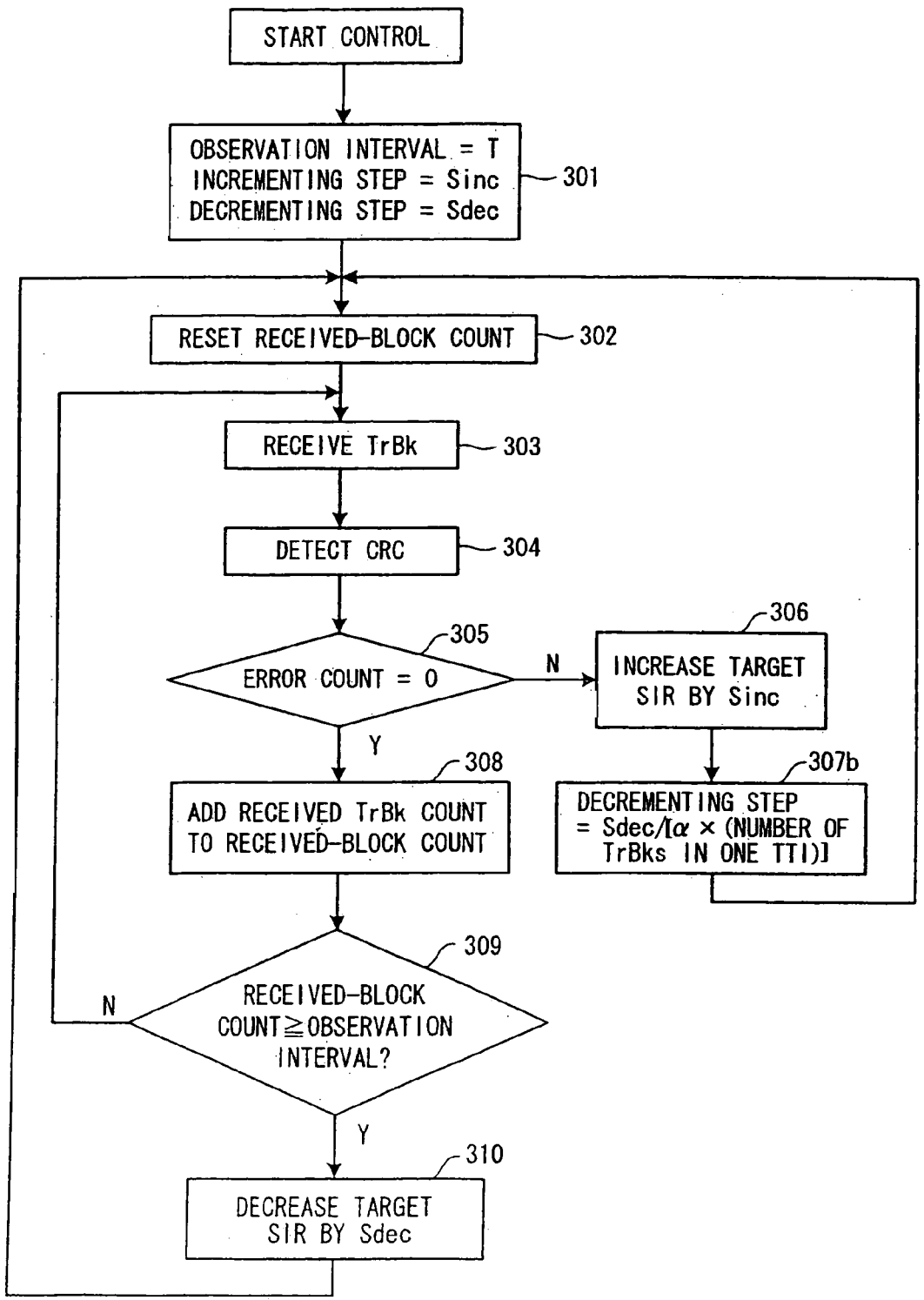
FIG. 30 is a flowchart of processing for controlling target SIR according to the sixth embodiment.

FIG. 24 is a block diagram of a sixth embodiment of the present invention and illustrates in detail the part of a mobile station that is for outer-loop power control. Components identical with those of the third embodiment are designated by like reference characters. FIG. 30 is a flowchart of processing for controlling target SIR according to the sixth embodiment.

The third embodiment is such that if error has been detected, a value Sdec/(=α×Nerr) that is the result of dividing the initially set Sdec by the coefficient (=α×Nerr) conforming to the error count Nerr that prevailed the last time an error was detected is used instead of Sdec as the decrementing step (amount of decrease) of the target SIR that prevails if a single error has not been detected during the time of the observation interval. In the sixth embodiment, on the other hand, if error has been detected, a value Sdec/(α× TrBk) that is the result of dividing the initially set Sdec by a coefficient (=α×TrBk count] that conforms to the number of TrBks contained in one TTI is used instead of Sdec as the incrementing step of target SIR. The reason for this is that if error is detected in one transport block TrBk, often the error is contained in all transport blocks in the TTI.

Thus, the sixth embodiment resembles the third embodiment. In FIGS. 14, 15 of the third embodiment, this embodiment differs from FIGS. 14 and 15 of the third embodiment in that when the error-block count Nerr in one TTI is one or greater, a decrementing-step calculation unit 36b updates the decrementing step according to the following equation (step 307b):

decrementing step=$Sdec$/(α×(number of $TrBks$ contained in one $TTI$))  (6)

The target-SIR controller 25 controls the target SIR in accordance with the flowchart of FIG. 30. Specifically, at the start of control of the target SIR, the target-SIR controller 25 reads in parameters (observation interval T, incrementing step Sin c and decrementing step Sdec), which conform to the target BLER, from the parameter conversion table 26, stores the parameters in the internal storage register 31 and resets the content (received-block count N) of the received-block counter 32 (steps 301, 302).

If the CRC detector 24 receives a decoded result (consisting of one or more transport block TrBks) from the error correcting decoder 22 under these conditions (step 303), it demultiplexes the results of decoding in units of the transport blocks TrBk, performs CRC error detection and inputs the result of CRC error detection to the target-SIR controller 25 (step 304). Upon receiving the result of CRC error detection, the target-SIR controller 25 discriminates the error-block count Nerr on a per-TTI basis (step 305).

If the error-block count Nerr in one TTI is one or more, then the target-SIR increase/decrease control unit 33 of the target-SIR controller 25 increases the target SIR by Sin c (step 306). Further, the decrementing-step calculation unit 36b of the target-SIR controller 25 updates the decrementing step according to Equation (6) (step 307b):

After the decrementing step is updated, the target-SIR controller 25 returns control to step 302 and resets the number of received blocks to zero, after which processing from step 303 onward is repeated.

On the other hand, if it is found at step 305 that the error count Nerr in one TTI is zero, then the target-SIR controller 25 adds the TrBk count (=$N_{BLK}$) received in this TTI to the received-block count N (N=N+$N_{BLK}$; step 308). Next, the target-SIR controller 25 determines whether the received-block count N has become equal to or greater than a block count $N_{OBS}$ that conforms the observation interval T (step 309).

Figure 31:
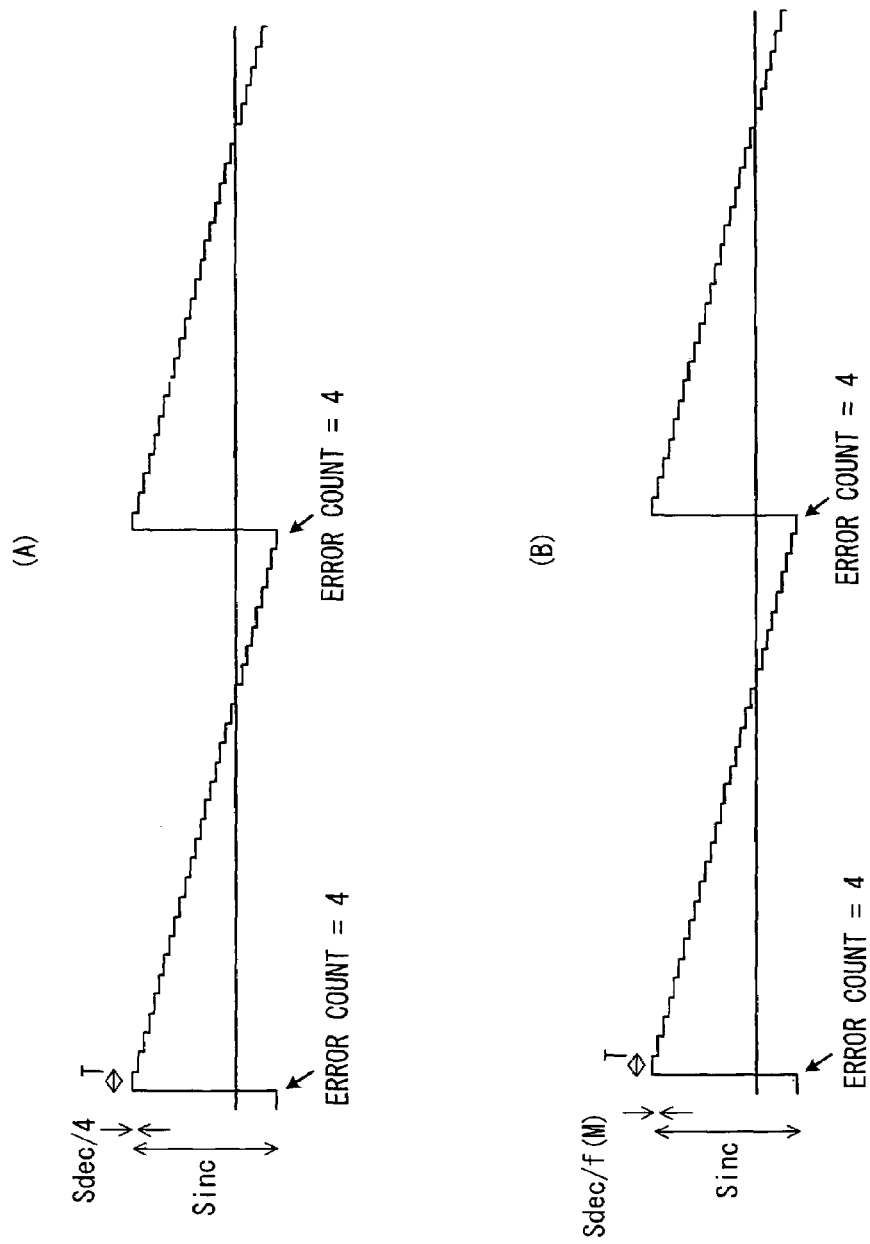
FIG. 31 is a diagram useful in describing operation of the sixth embodiment.

If the received-block count N has become equal to or greater than the block count $N_{OBS}$ conforming to the observation interval T, then this means that not a single error was detected in this observation interval T. Accordingly, the target-SIR increase/decrease control unit 33 of the target-SIR controller 25 decreases the target SIR by the amount of a decrementing step found using Equation (6) (step 310). FIG. 31(A) is a diagram for describing operation in a case where α=1, (number of TrBks contained in one TTI)=4 holds. The target SIR is reduced by Sdec/4 unless an error occurs during the time of the observation interval.

Thereafter, the target-SIR controller 25 returns control to step 302 and resets the received-block count N to zero, after which processing from step 303 onward is repeated. Further, if it is found at step 309 that the received-block count N is less than the observation interval $N_{OBS}$, then control returns to step 303 and processing from this step onward is executed.

The target-SIR controller 25 outputs the target SIR updated at steps 306, 310 to the comparator 27. The latter compares the target SIR with the measured SIR measured by the SIR measurement unit 28 and creates a TPC command, which is transmitted to the base station 10, based upon the result of comparison.

In accordance with the sixth embodiment, a value resulting from division of Sdec by the coefficient (=α×TrBk count) conforming to the TrBk count contained in the TTI that prevailed the last time an error was detected is used instead of Sdec as the decrementing step of the target SIR. As a result, there is a reduction in the amount of decrease of the target SIR per time when the observation interval ends, and time until the target SIR decreases to a level at which an error occurs is prolonged. Consequently, the intervals at which errors occur can be prolonged and, as a result, the target BLER can be attained.

Figure 29:
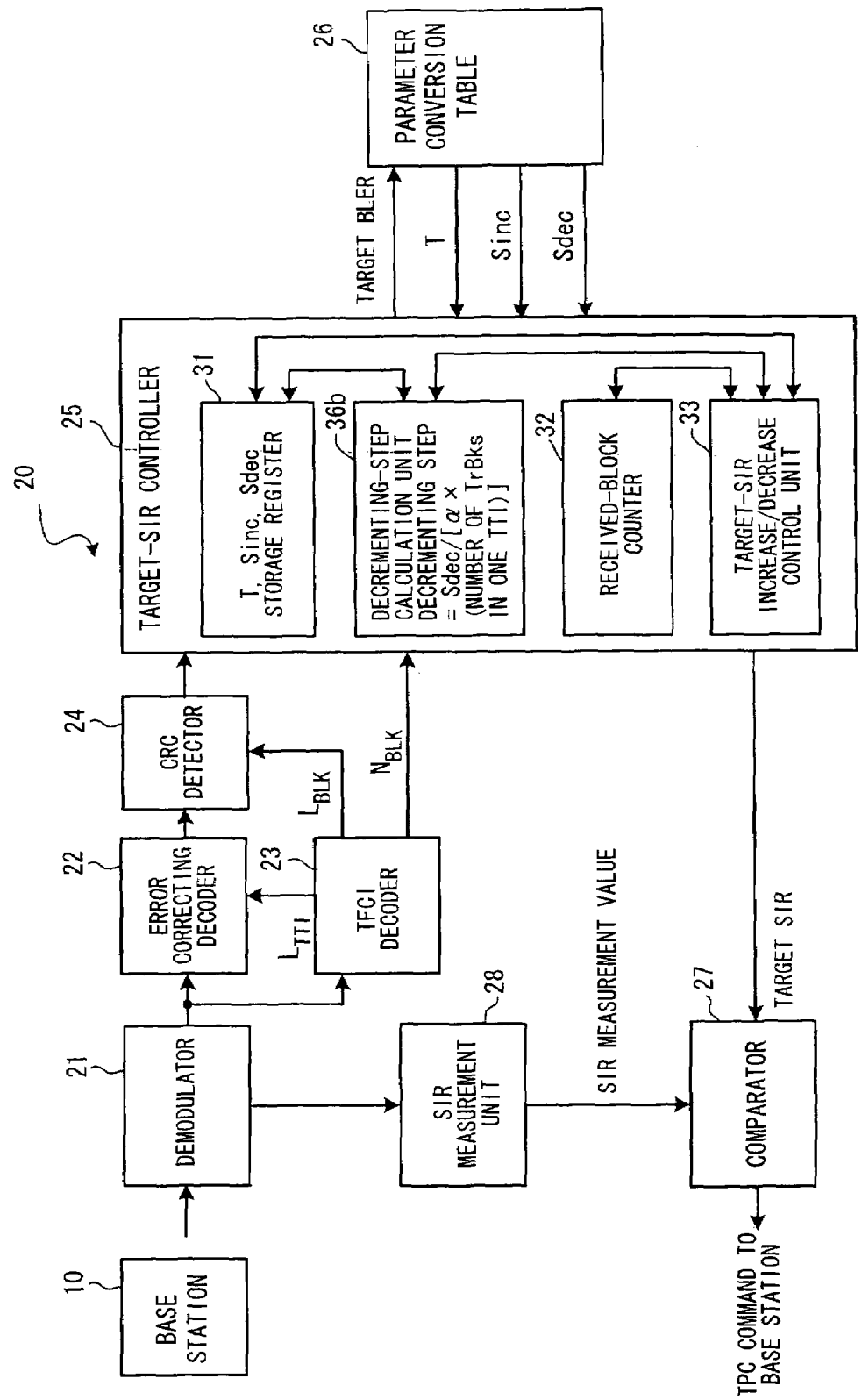
FIG. 29 is a block diagram of a sixth embodiment of the present invention.
Figure 32:
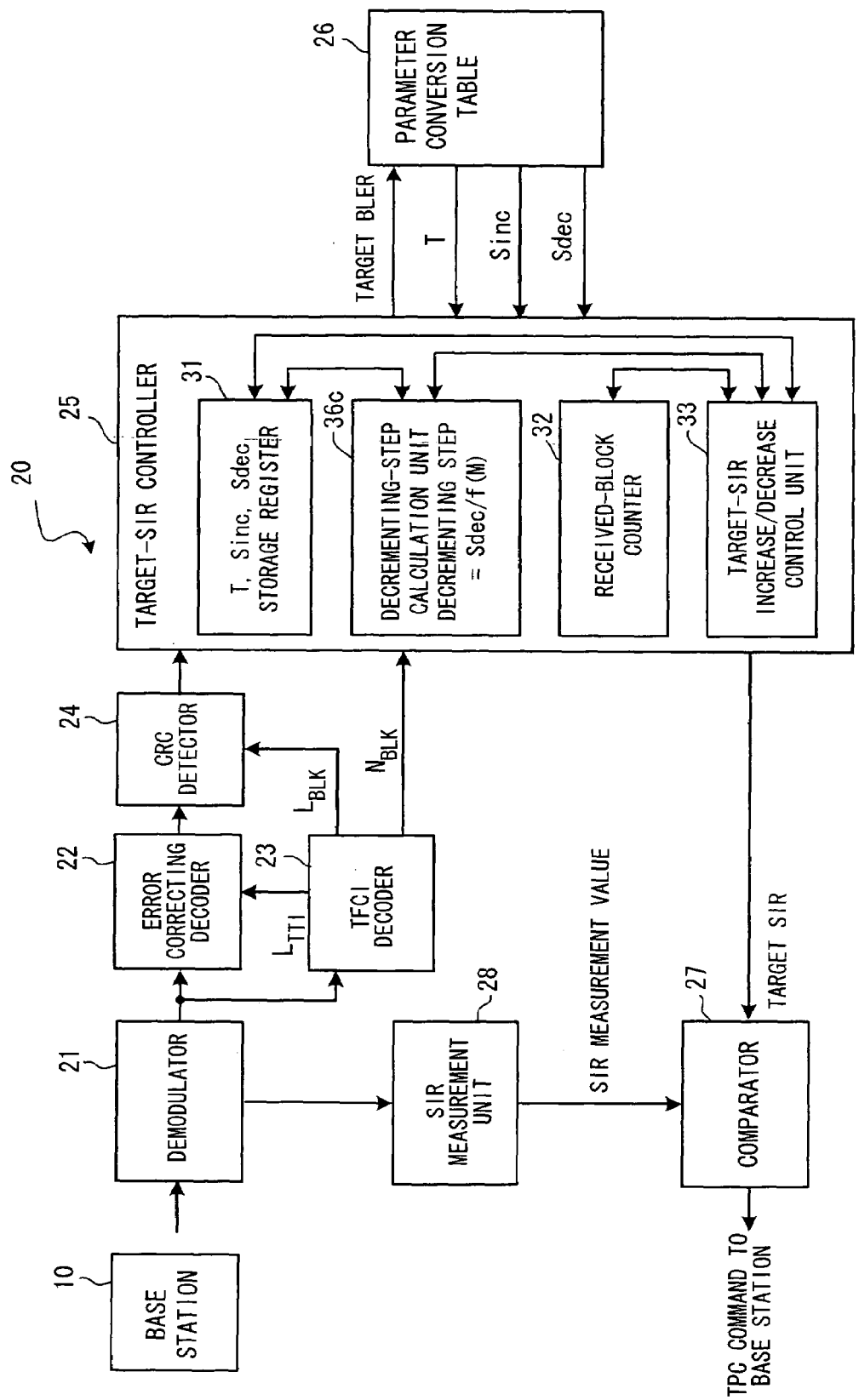
FIG. 32 illustrates a modification of the sixth embodiment.
Figure 33:
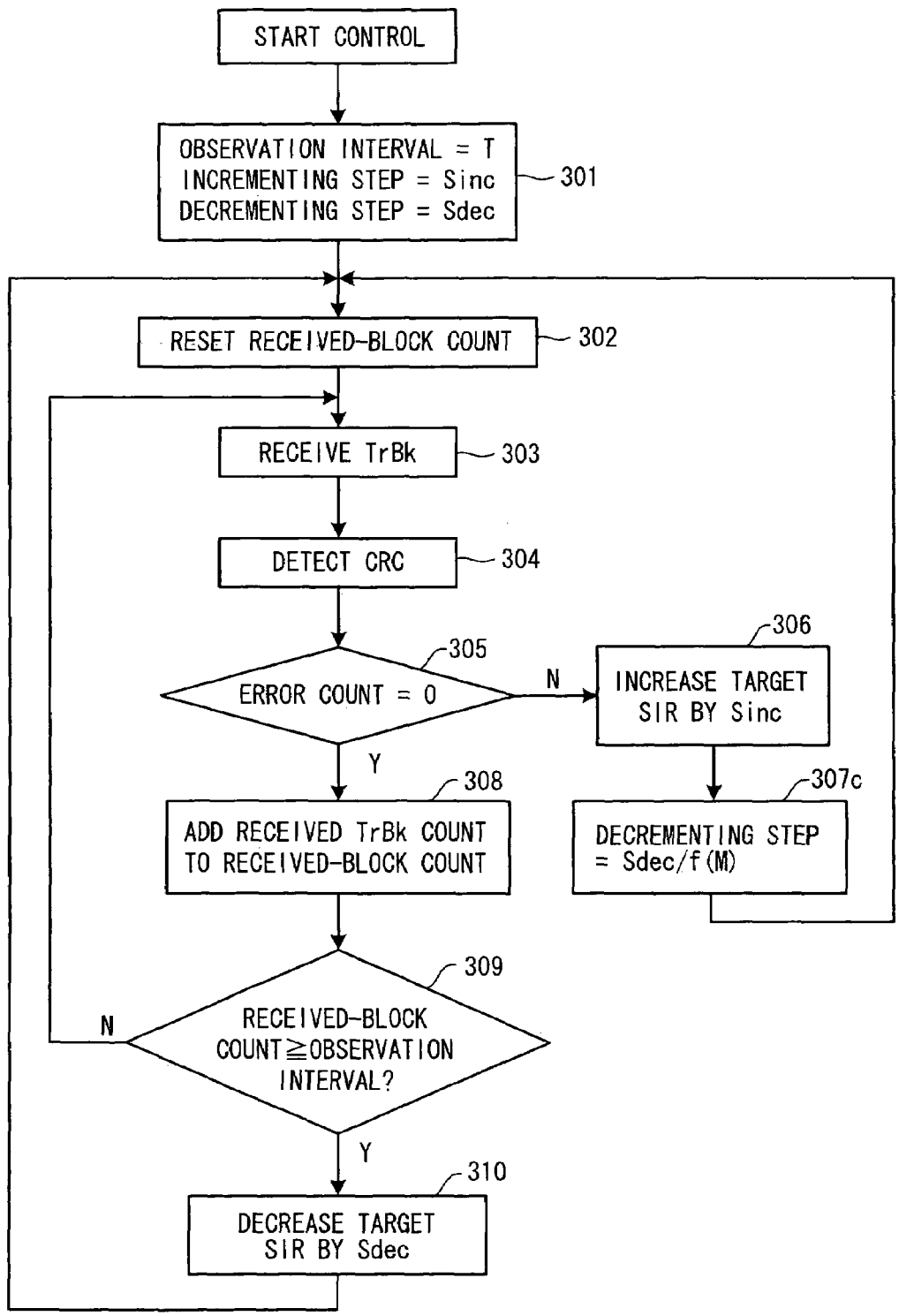
FIG. 33 is a flowchart of processing for controlling target SIR according to this modification.

FIG. 32 illustrates a modification of the sixth embodiment, and FIG. 33 is a flowchart of processing for controlling target SIR according to this modification. Components identical with those of the sixth embodiment of FIGS. 29 and 30 are designated by like reference characters. This modification differs in that whereas the coefficient used to divide the decrementing step Sdec in the sixth embodiment is [α×TrBk count], here the coefficient is made a function f(M) of the number of TrBks (=M) contained in one TTI (see a decrementing-step calculation unit 36c and step 307c).

The coefficient used to divide the decrementing step Sdec need not necessarily be a value proportional to the TrBk count and may be a value that has been weighted in dependence upon the TrBK count. FIG. 31(B) is a diagram for describing the operation of this modification. Here the decrementing step is Sdec/f(M).

(H) Seventh Embodiment

Figure 34:
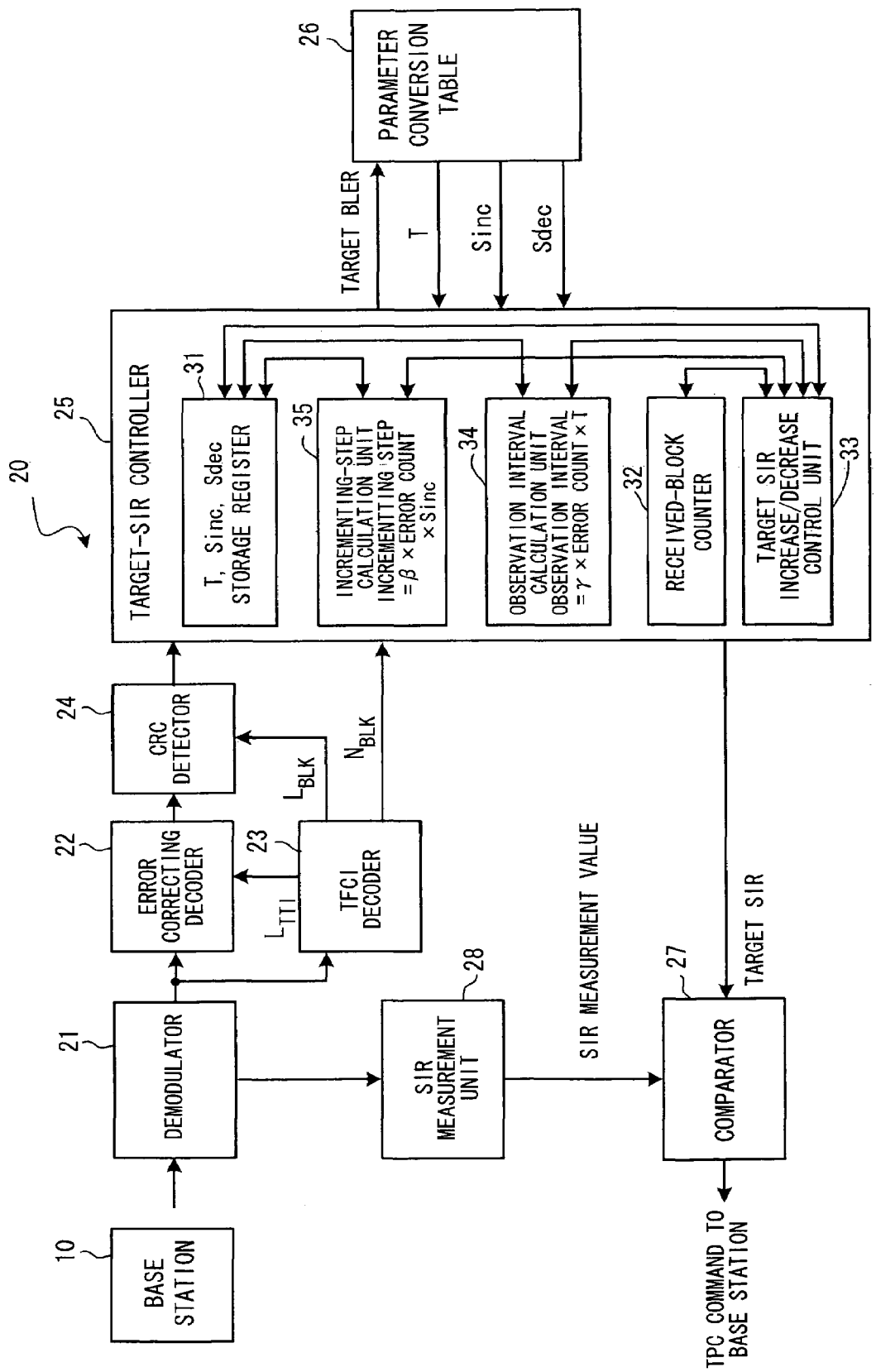
FIG. 34 is a block diagram of a seventh embodiment of the present invention.
Figure 35:
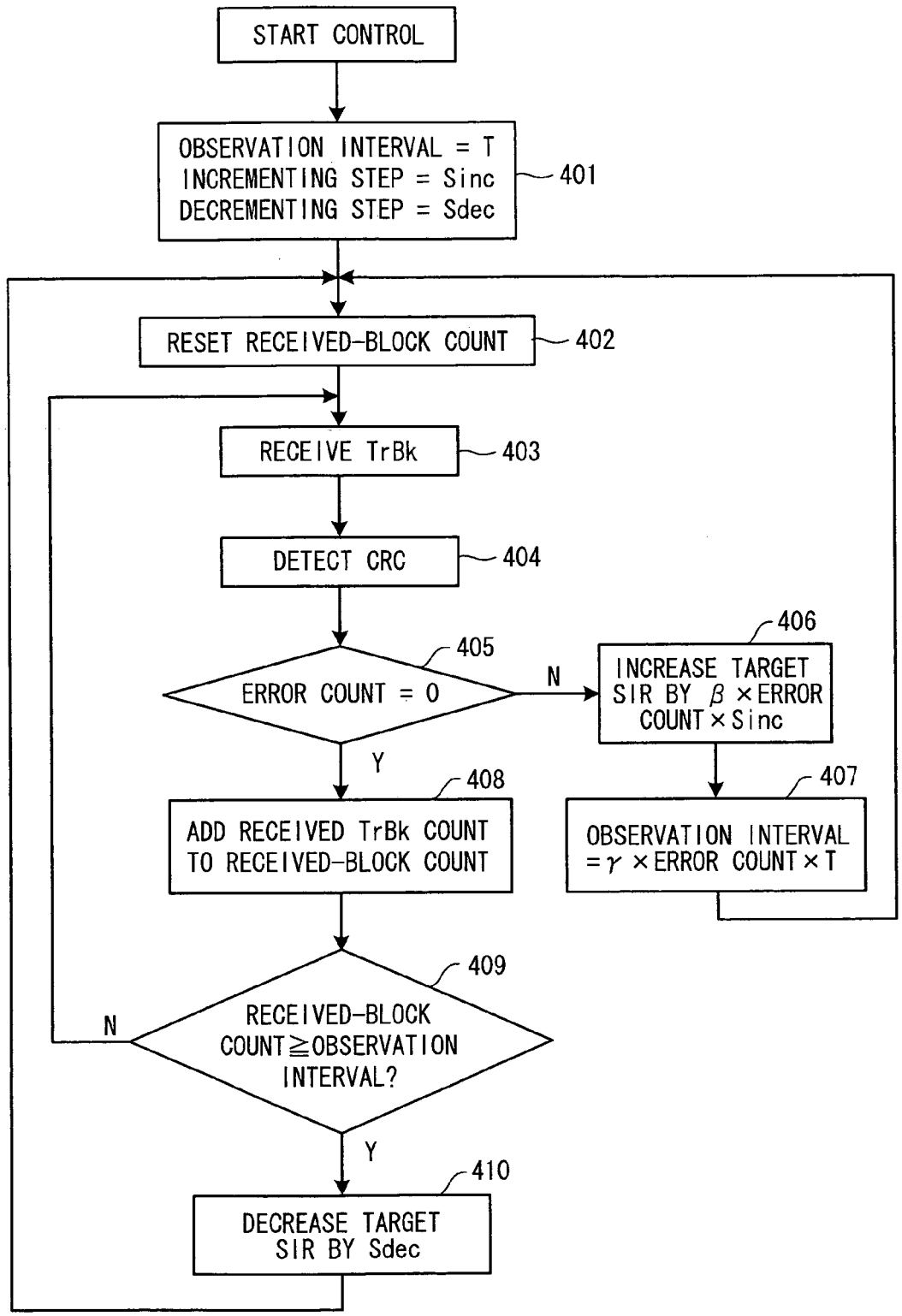
FIG. 35 is a flowchart of processing for controlling target SIR according to the seventh embodiment.

The target SIR can be controlled by combining the first to sixth embodiments. In the seventh embodiment, target SIR is controlled by applying a correction to both the observation interval and target-SIR incrementing step Sin c based upon the error count Nerr. FIG. 34 is a block diagram of a seventh embodiment of the present invention and illustrates in detail the part of a mobile station that is for outer-loop power control. Components identical with those of the first embodiment are designated by like reference characters. FIG. 35 is a flowchart of processing for controlling target SIR according to the seventh embodiment.

The seventh embodiment is such that if error has been detected, a value [γ×Nerr×T] that is the result of multiplying the initially set T by a coefficient (=γ×Nerr) conforming to the error count Nerr is used instead of T as the observation interval up to detection of the next error. Further, a value β×Nerr×Sin c that is the result of multiplying Sin c by a coefficient (=β×Nerr) conforming to the error count is used instead of the Sin c as the incrementing step of the target SIR.

The target-SIR controller 25 controls the target SIR in accordance with the flowchart of FIG. 35. Specifically, at the start of control of the target SIR, the target-SIR controller 25 reads in parameters (observation interval T, incrementing step Sin c and decrementing step Sdec), which conform to the target BLER, from the parameter conversion table 26, stores the parameters in the internal storage register 31 and resets the content (received-block count N) of the received-block counter 32 (steps 401, 402).

If the CRC detector 24 receives a decoded result (consisting of one or more transport block TrBks) from the error correcting decoder 22 under these conditions (step 403), it demultiplexes the results of decoding in units of the transport blocks TrBk, performs CRC error detection and inputs the result of CRC error detection to the target-SIR controller 25 (step 404). Upon receiving the result of CRC error detection, the target-SIR controller 25 discriminates the error-block count Nerr on a per-TTI basis (step 405).

If the error-block count Nerr in one TTI is one or more, then the incrementing-step calculation unit 35 of the target-SIR controller 25 calculates the incrementing step according to the following equation:

$$\text{incrementing step} = \beta \times Nerr \times Sin\ c \quad (7)$$

and inputs the result to the target-SIR increase/decrease control unit 33. The latter increases the target SIR by the amount of the incrementing step input thereto (step 406).

Next, the observation interval calculation unit 34 of the target-SIR controller 25 updates the observation interval according to the following equation (step 407):

$$\text{observation interval} = \gamma \times Nerr \times T \quad (8)$$

Figure 36:
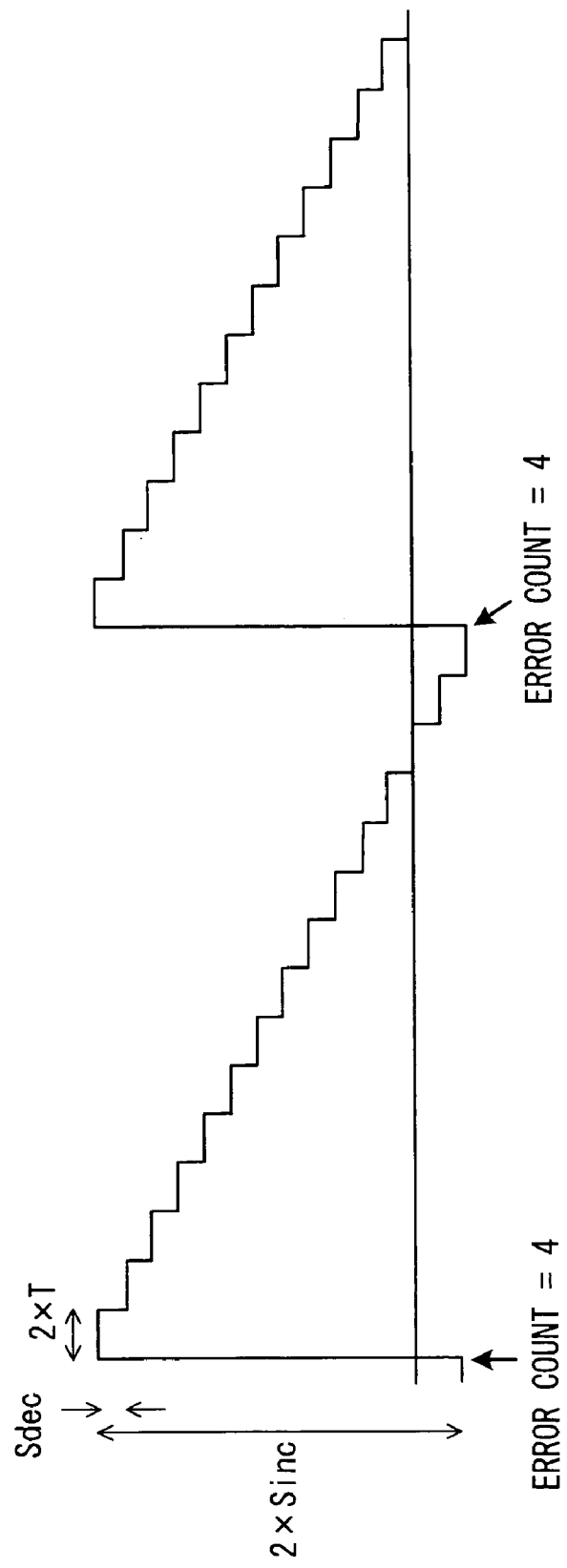
FIG. 36 is a diagram useful in describing operation of the seventh embodiment.
Figure 37:
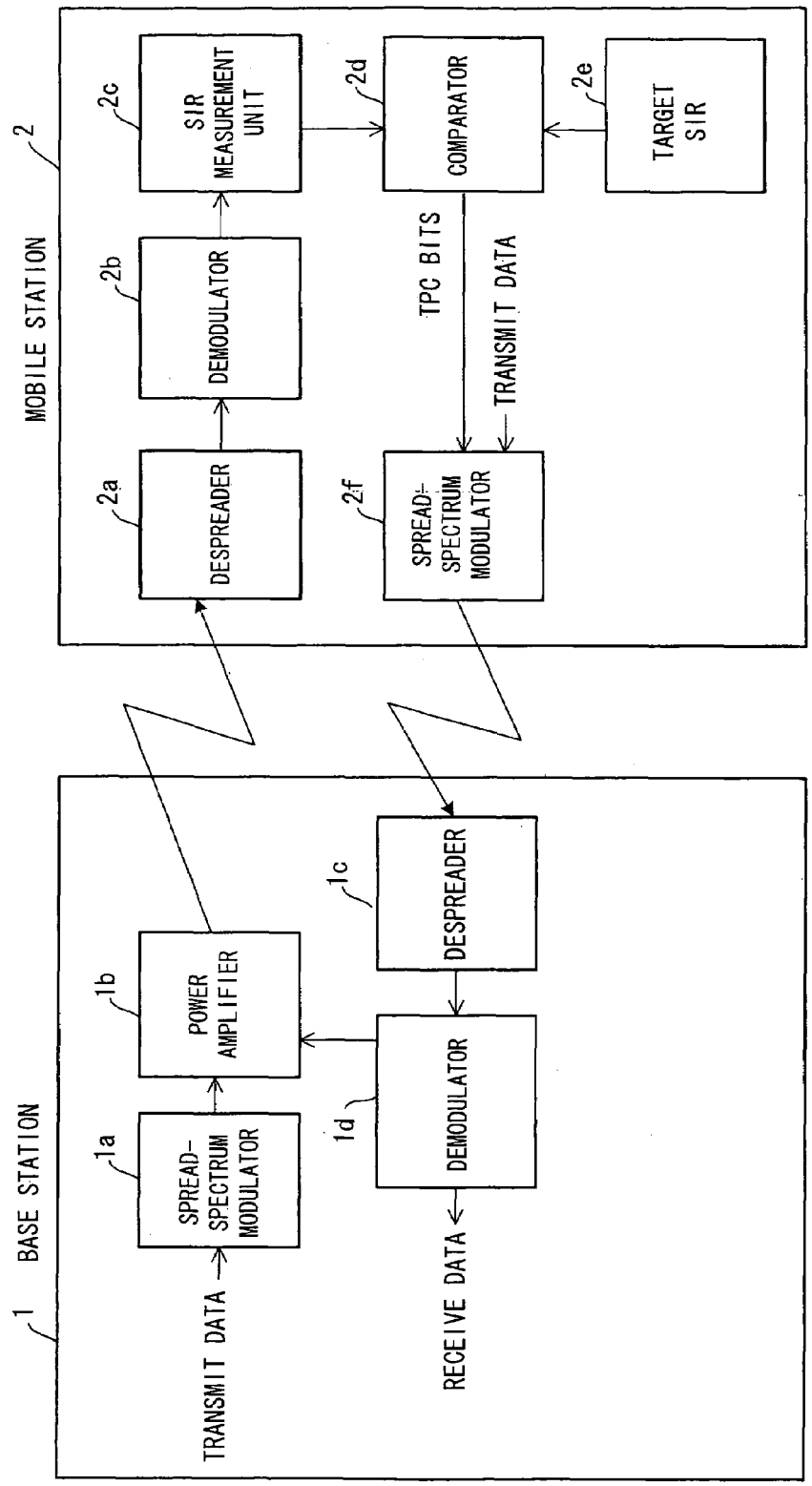
FIG. 37 is a diagram for describing inner-loop transmission power control.
Figure 38:
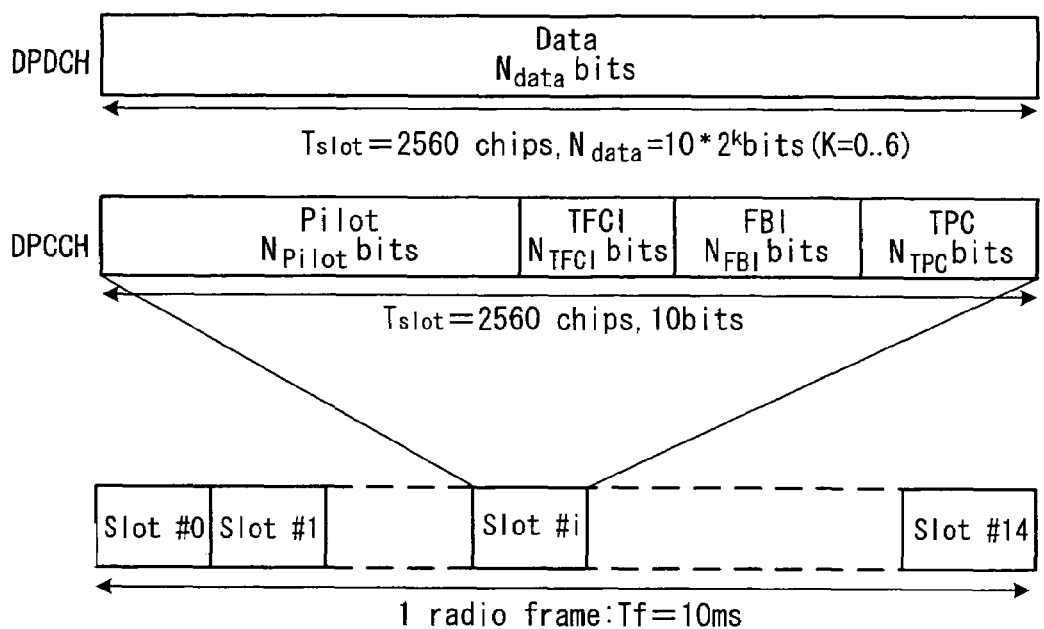
FIG. 38 is a diagram showing an uplink frame structure.
Figure 39:
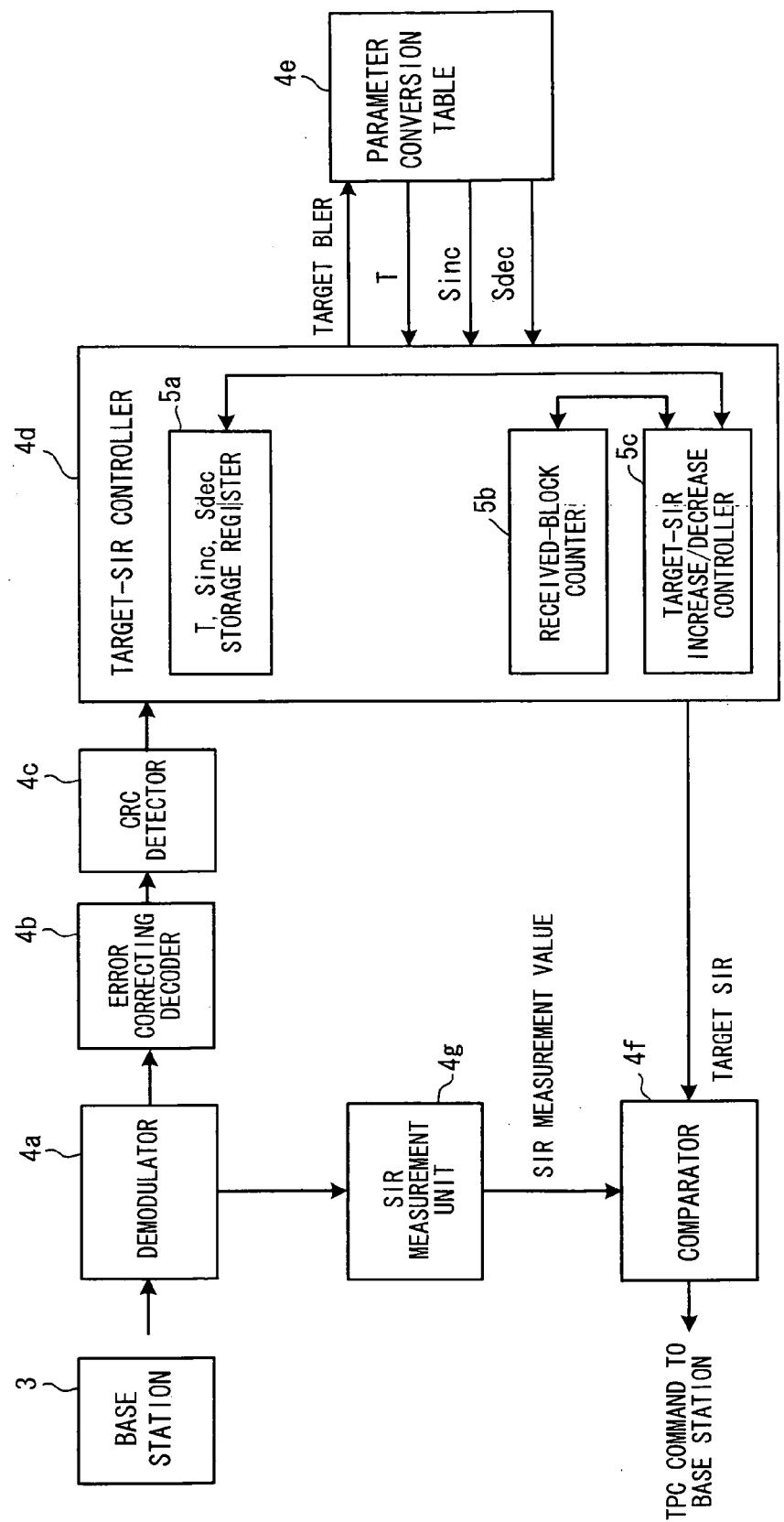
FIG. 39 is a block diagram of outer-loop control according to the prior art.
Figure 40:
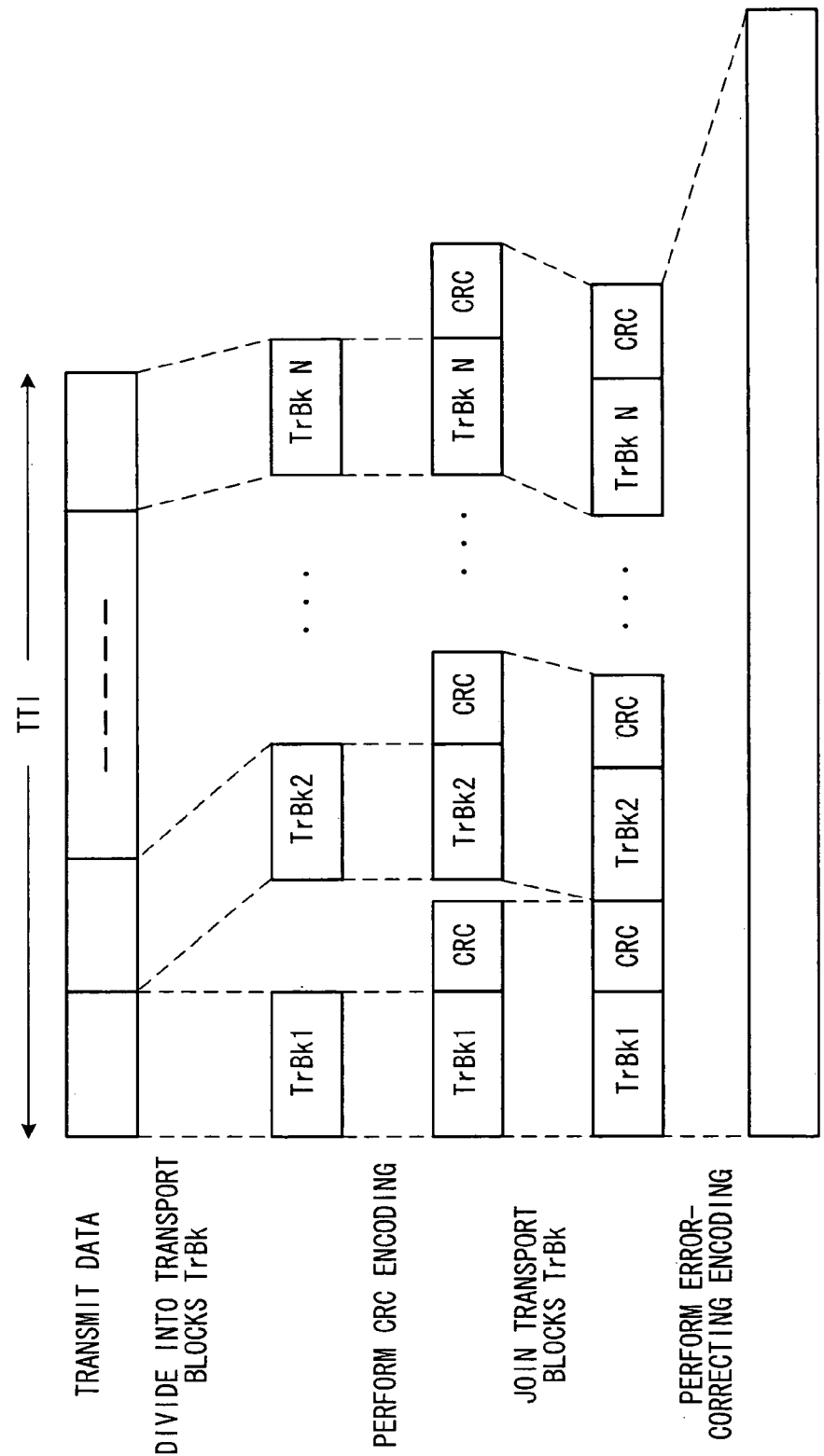
FIG. 40 is a diagram useful in describing processing of transmit data.
Figure 41:
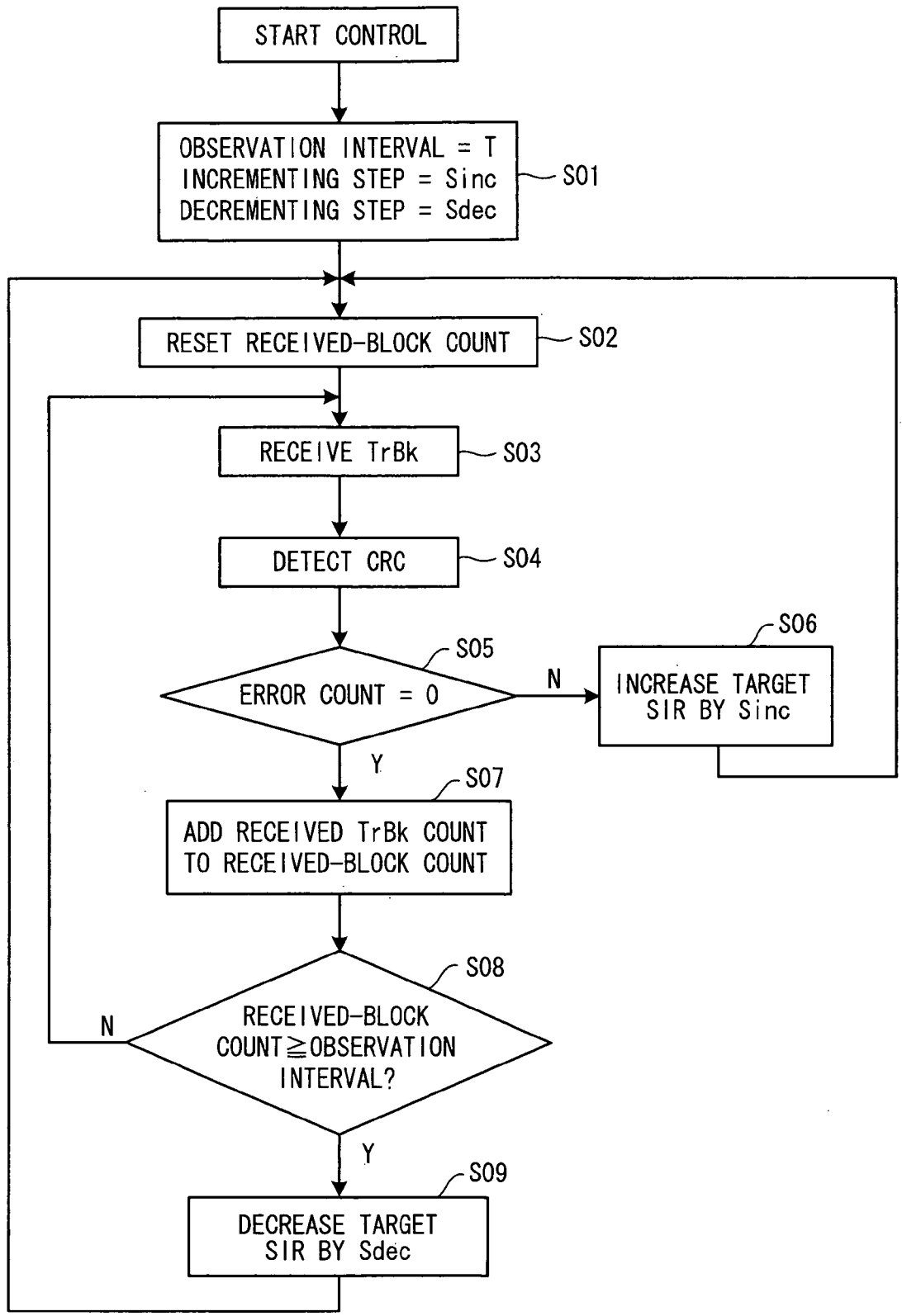
FIG. 41 is a flowchart of processing for controlling target SIR in an example of the prior art.
Figure 42:
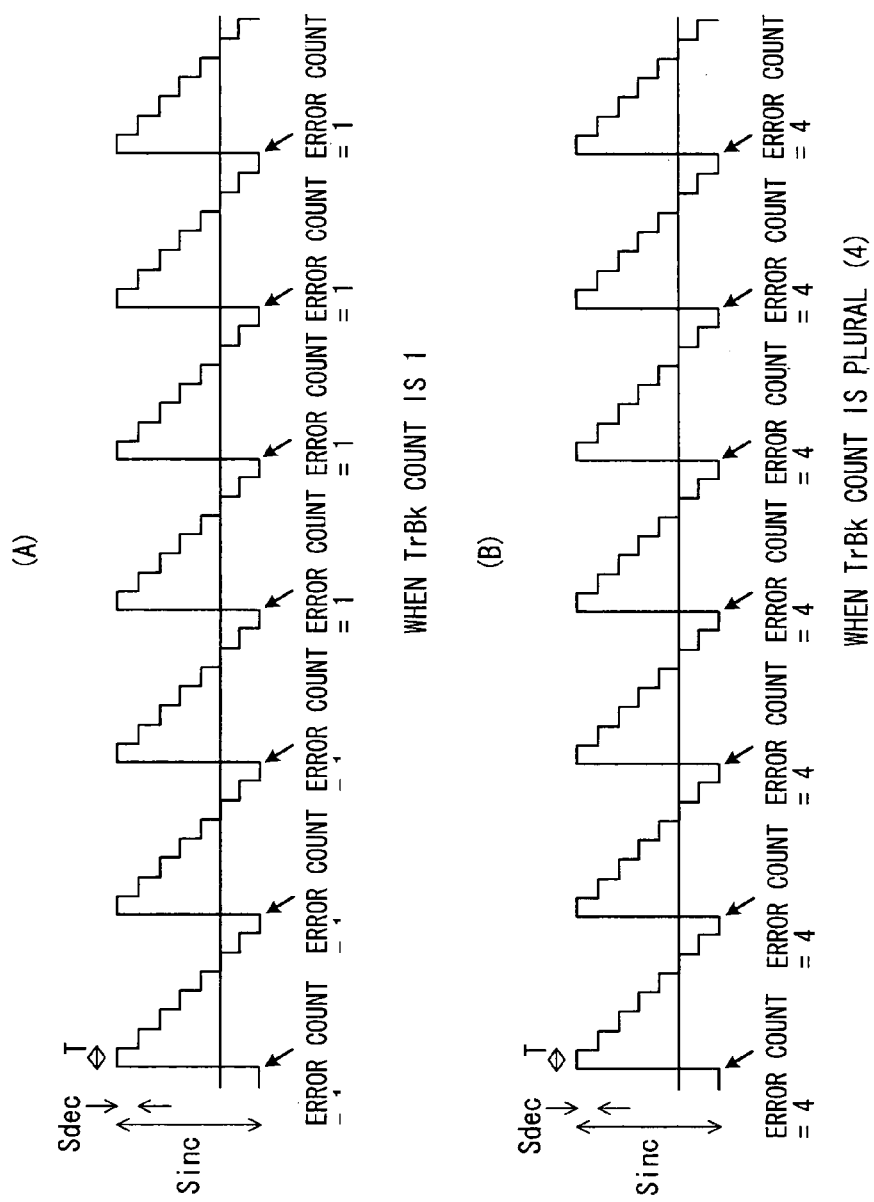
FIG. 42 is a diagram useful in describing increase and decrease of target SIR.

FIG. 36 is a diagram for describing operation in a case where β=γ=½, Nerr=4 holds. The incrementing step is 2×Sin c and the observation interval is 2×T.

After the observation interval is updated, the target-SIR controller 25 returns control to step 402 and resets the number of received blocks to zero, after which processing from step 403 onward is repeated.

On the other hand, if it is found at step 405 that the error count in CRC detection is zero, then the target-SIR controller 25 adds the TrBk count (=$N_{BLK}$) received in this TTI to the received-block count N (N=N+$N_{BLK}$; step 408). Next, the target-SIR controller 25 determines whether the received-block count N has become equal to or greater than a block count $N_{OBS}$ that conforms the observation interval T (step 409).

If the received-block count N has become equal to or greater than the block count $N_{OBS}$ conforming to the observation interval, then this means that not a single error was detected in this observation interval T. Accordingly, the target-SIR increase/decrease control unit 33 decreases the target SIR by the amount of Sdec (step 410). Thereafter, the target-SIR controller 25 returns control to step 402 and resets the received-block count N to zero, after which processing from step 403 onward is repeated. Further, if it is found at step 409 that the receive-block count N is less than the observation interval $N_{OBS}$, then control returns to step 403 and processing from this step onward is executed.

The target-SIR controller 25 outputs the target SIR updated at steps 406, 410 to the comparator 27. The latter compares the target SIR with the measured SIR measured by the SIR measurement unit 28 and creates a TPC command, which is transmitted to the base station 10, based upon the result of comparison.

In accordance with the seventh embodiment, actions and effects similar to those of the first and second embodiments can be obtained, and the target BLER can be attained even if multiple errors occur in the TTI.

According to the seventh embodiment, target SIR is controlled by applying a correction to both the observation interval and target-SIR incrementing step Sin c based upon the error count Nerr. However, it can be so arranged that at least two among the block-error observation interval, the incrementing step for when the target SIR is increased and the decrementing step for when target SIR is decreased can be varied based upon the error-block count Nerr or detection block count $N_{BLK}$.

What is claimed is:

1. An outer-loop power control method in a communication apparatus for increasing a target SIR if an error is detected in a block-error observation interval and the decreasing target SIR if not a single error is detected in the block-error observation interval, comprising steps of:
    detecting a number of erroneous blocks among error-detecting blocks contained in each transmission time interval within the block-error observation interval;
    increasing the target SIR if an erroneous block is detected in each transmission time interval; and
    performing control to vary the block-error observation interval based upon said number of erroneous blocks.

2. An outer-loop power control method in a communication apparatus for increasing a target SIR if an error is detected in a block-error observation interval and decreasing the target SIR if not a single error is detected in the block-error observation interval, comprising steps of:
    detecting a number of erroneous blocks among error-detecting blocks contained in each transmission time interval within the block-error observation interval;
    increasing the target SIR if an erroneous block is detected in each transmission time interval; and
    performing control to vary an incrementing step for when the target SIR is increased, based upon said number of erroneous blocks.

3. An outer-loop power control method in a communication apparatus for increasing a target SIR if an error is detected in a block-error observation interval and decreasing the target SIR if not a single error is detected in the block-error observation interval, comprising steps of:

detecting a number of erroneous blocks among error-detecting blocks contained in each transmission time interval within the block-error observation interval;

increasing the target SIR if an erroneous block is detected in each transmission time interval; and performing control to vary a decrementing step for when the target SIR is decreased based upon said number of erroneous blocks; and if no error is detected in any of the transmission time intervals within the block-error observation interval, performing control to vary a decrementing step for when the target SIR is decreased, based upon said number of erroneous blocks detected last.

4. An outer-loop power control method in a communication apparatus for increasing a target SIR if an error is detected in a block-error observation interval and decreasing the target SIR if not a single error is detected in the block-error observation interval, comprising steps of:

detecting a number of error-detecting blocks contained in each transmission time interval within the block-error observation interval;

increasing the target SIR if an erroneous block is detected in each transmission time interval; and performing control to vary said block-error observation interval based upon said number of error-detecting blocks.

5. An outer-loop power control method in a communication apparatus for increasing a target SIR if an error is detected in a block-error observation interval and decreasing the target SIR if not a single error is detected in the block-error observation interval, comprising steps of:

detecting a number of error-detecting blocks contained in each transmission time interval within the block-error observation interval;

increasing the target SIR if an erroneous block is detected in each transmission time interval; and performing control to vary an incrementing step for when the target SIR is increased, based upon said number of error detecting blacks.

6. An outer-loop power control method in a communication apparatus for increasing a target SIR if an error is detected in a block-error observation interval and decreasing the target SIR if not a single error is detected in the block-error observation interval, comprising steps of:

detecting a number of error-detecting blocks contained in each transmission time interval within the block-error observation interval;

increasing the target SIR if an erroneous block is detected in each transmission time interval; and performing control to vary a decrementing step for when the target SIR is decreased, based upon said number of error detecting blocks.

7. An outer-loop power control method in a communication apparatus for increasing a target SIR if an error is detected in a block-error observation interval and decreasing the target SIR if not a single error is detected in the block-error observation interval, comprising steps of:

detecting number of erroneous blocks or number of said error-detecting blocks among error-detecting blocks contained in a transmission time interval; and performing control to vary at least two among said block-error observation interval, an incrementing step for when the target SIR is increased and a decrementing step for when the target SIR is decreased, based upon said number of erroneous blocks or said number of error-detecting blocks.

8. A communication apparatus having an outer-loop power control function, comprising:

an error detector for detecting error every error-detecting block;

a target-SIR controller for increasing a target SIR if error is detected in a block-error observation interval and decreasing the target SIR if not a single error is detected in the block-error observation interval;

a SIR measurement unit for measuring SIR of a received signal; and a power-control command creating unit for comparing the measured SIR and the target SIR in terms of magnitude and creating a power-control command, which is transmitted to an apparatus of another party, based upon result of the comparison;

said target-SIR controller including:

an observation-interval calculation unit for calculating said block-error observation interval based upon number of erroneous blocks among error-detecting blocks contained in a transmission time interval; and a target-SIR increasing/decreasing unit for increasing the target SIR if error is detected in said block-error observation interval and decreasing the target SIR if not a single error is detected in the block-error observation interval.

9. A communication apparatus having an outer-loop power control function, confining:

an error detector for detecting error every error-detecting block a target-SIR controller for increasing a target SIR if error is detected in a block-error observation interval and decreasing the target SIR if not a single error is detected in the block-error observation interval;

a SIR measurement unit for measuring SIR of a received signal; and a power-control command creating unit for comparing the measured SIR and the target SIR in terms of magnitude and creating a power-control command, which is transmitted to an apparatus of another party, based upon result of the comparison;

said target-SIR controller including:

a SIR incrementing-step calculation unit for calculating an incrementing step for when said target SIR is increased, based upon a number of erroneous blocks among error-detecting blocks contained in a transmission time interval; and a target-SIR increasing/decreasing unit for increasing the target SIR by the amount of said incrementing step if an error is detected in said block-error observation interval, and decreasing the target SIR by a prescribed amount if not a single error is detected in the block-error observation interval.

10. A communication apparatus having an outer-loop power control function, comprising:

an error detector for detecting error every error-detecting block;

a target-SIR controller for increasing a target SIR if error is detected in a block-error observation interval and decreasing the target SIR if not a single error is detected in the block-error observation interval;

a SIR measurement unit for measuring SIR of a received signal; and a power-control command creating unit for comparing the measured SIR and the target SIR in terms of magnitude and creating a power-control command, which is transmitted to an apparatus of another party, based upon result of the comparison;
said target-SIR controller including:
means for detecting number of erroneous blocks among error-detecting blocks contained in each transmission time interval within the block-error observation interval;
a SIR decrementing-step calculation unit for calculating a decrementing step for when said target SIR is decreased, based upon a number of erroneous blocks; and
a target-SIR increasing/decreasing unit for increasing the target SIR by a prescribed amount in a case where occurrence of an error is detected in a transmission lime interval within the block-error observation interval, and decreasing the target SIR by the amount of said decrementing step if no error is detected in any of the transmission time intervals within the block-error observation interval.

11. A communication apparatus having an outer-loop power control function, comprising:
an error detector for detecting error every error-detecting block;
a target-SIR controller for increasing a target SIR if error is detected in a block-error observation interval and decreasing the target SIR if not a single error is detected in the block-error observation interval;
a SIR measurement unit for measuring SIR of a received signal; and
a power-control command creating unit for comparing the measured SIR and the target SIR in terms of magnitude and creating a power-control command, which is transmitted to an apparatus of another party, based upon result of the comparison;
said target-SIR controller including:
means for detecting number of error-detecting blocks contained in a transmission time interval;
an observation-interval calculation unit for calculating said block-error observation interval based upon the number of said error-detecting blocks; and
a target-SIR increasing/decreasing unit for increasing the target SIR if error is detected in said block-error observation interval and decreasing the target SIR if nor a single error is detected in the black-error observation interval.

12. A communication apparatus having an outer-loop power control function, comprising:
an error detector for detecting error every error-detecting block;
a target-SIR controller for increasing a target SIR if error is detected in a block-error observation interval and decreasing the target SIR if not a single error is detected in the block-error observation interval;
a SIR measurement unit for measuring SIR of a received signal; and
a power-control command creating unit for comparing the measured SIR and the target SIR in terms of magnitude and creating a power-control command, which is transmitted to an apparatus of another party, based upon result of the comparison;
said target-SIR controller including:
means for detecting number of error-detecting blocks contained in a transmission time interval;
a SIR incrementing-step calculation unit for calculating an incrementing step for when said target SIR is increased, based upon the number of said error-detecting blocks; and
a target-SIR increasing/decreasing unit for increasing the target SIR by the amount of said incrementing step if an error is detected in said block-error observation interval, and decreasing the target SIR by a prescribed amount if not a single error is detected in the block-error observation interval.

13. A communication apparatus having an outer-loop power control function, comprising:
an error detector for detecting error every error-detecting block;
a target-SIR controller for increasing a target SIR if error is detected in a block-error observation interval and decreasing the target SIR if not a single error is detected in the block-error observation interval;
a SIR measurement unit for measuring SIR of a received signal; and
a power-control command creating unit for comparing the measured SIR and the target SIR in terms of magnitude and creating a power-control command, which is transmitted to an apparatus of another party, based upon result of the comparison;
said target-SIR controller including:
means for detecting number of error-detecting blocks contained in a transmission time interval;
a SIR decrementing-step calculation unit for calculating a decrementing step for when the target SIR is decreased, based upon said number of error-detecting block; and
a target-SIR increasing/decreasing unit for increasing the target SIR by a prescribed amount if an error is detected in said block-error observation interval, and decreasing the target SIR by the amount of said decrementing step if not a signal error is detected in the block-error observation interval.

* * * * *